(12) United States Patent
Yi et al.

(10) Patent No.: US 12,133,183 B2
(45) Date of Patent: Oct. 29, 2024

(54) PRIORITIZATION OF SIDELINK AND UPLINK TRANSMISSIONS

(71) Applicant: Ofinno, LLC, Reston, VA (US)

(72) Inventors: Yunjung Yi, Vienna, VA (US); Esmael Hejazi Dinan, McLean, VA (US); Hyukjin Chae, San Diego, CA (US); Kyungmin Park, Vienna, VA (US); Kai Xu, Great Falls, VA (US); Youngwoo Kwak, Woodbury, NY (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/222,072

(22) Filed: Jul. 14, 2023

(65) Prior Publication Data
US 2023/0362838 A1 Nov. 9, 2023

Related U.S. Application Data

(63) Continuation of application No. 16/904,128, filed on Jun. 17, 2020, now Pat. No. 11,706,721.
(Continued)

(51) Int. Cl.
*H04W 4/00* (2018.01)
*H04W 52/36* (2009.01)
*H04W 72/56* (2023.01)

(52) U.S. Cl.
CPC ......... *H04W 52/367* (2013.01); *H04W 72/56* (2023.01)

(58) Field of Classification Search
CPC .............. H04W 52/367; H04W 72/10; H04W 72/1242; H04W 52/383; H04W 52/265; H04W 92/18
See application file for complete search history.

(56) References Cited

U.S. PATENT DOCUMENTS 10,834,747 B2 * 11/2020 Lu ................ H04W 72/02
11,219,035 B2 * 1/2022 Lee .................... H04W 72/56
(Continued)

FOREIGN PATENT DOCUMENTS

CN 112469023 A * 3/2021 ........ H04W 28/0215
EP 4013147 A1 * 6/2022 ............ H04W 72/04
(Continued)

OTHER PUBLICATIONS

3GPP TS 38.211 V15.4.0 (Dec. 2018); Technical Specification; 3rd Generation Partnership Project; Technical Specification Group Radio Access Network; NR; Physical channels and modulation; (Release 15).
(Continued)

*Primary Examiner* — Thai D Hoang
(74) *Attorney, Agent, or Firm* — Matthew Fernandez; Kavon Nasabzadeh; Jacob L. Mangan

(57) ABSTRACT

A wireless device may determine whether a sidelink transmission has higher priority than an uplink transmission. The determination may be based on comparing a priority value of the sidelink transmission to a first priority threshold for ultra reliable low latency (URLLC) uplink transmissions in response to the uplink transmission being URLLC, and the determination may be based on comparing the priority value of the sidelink transmission to a second priority threshold for non-URLLC uplink transmissions in response to the uplink transmission being non-URLLC. Based on the determining, the wireless device may transmit at least one of the sidelink transmission or the uplink transmission.

20 Claims, 35 Drawing Sheets

Related U.S. Application Data

(60) Provisional application No. 62/862,347, filed on Jun. 17, 2019.

(56) References Cited

U.S. PATENT DOCUMENTS

| | | | | |
|---|---|---|---|---|
| 11,350,309 | B2* | 5/2022 | Lee | H04W 28/0247 |
| 11,432,318 | B2* | 8/2022 | Lu | H04W 72/569 |
| 2020/0396701 | A1* | 12/2020 | Yi | H04W 52/383 |
| 2021/0022170 | A1* | 1/2021 | Lu | H04W 72/569 |
| 2021/0029723 | A1* | 1/2021 | Wu | H04W 72/569 |
| 2021/0105790 | A1* | 4/2021 | Lin | H04W 72/56 |
| 2021/0136781 | A1* | 5/2021 | Hosseini | H04W 72/569 |
| 2021/0266928 | A1* | 8/2021 | Ryu | H04W 72/569 |
| 2021/0266929 | A1* | 8/2021 | Ryu | H04W 72/566 |

FOREIGN PATENT DOCUMENTS

| | | | | |
|---|---|---|---|---|
| WO | WO-2020030118 A1 * | 2/2020 | | H04W 28/02 |
| WO | WO-2021062820 A1 * | 4/2021 | | H04W 28/02 |
| WO | WO-2021087997 A1 * | 5/2021 | | H04L 5/0044 |
| WO | WO-2021088028 A1 * | 5/2021 | | H04L 5/0005 |
| WO | WO-2022026445 A1 * | 2/2022 | | H04W 72/02 |
| WO | WO-2022084948 A1 * | 4/2022 | | H04W 4/70 |

OTHER PUBLICATIONS

3GPP TS 38.212 V15.4.0 (Dec. 2018); Technical Specification; 3rd Generation Partnership Project; Technical Specification Group Radio Access Network; NR; Multiplexing and channel coding; (Release 15).
3GPP TS 38.213 V15.7.0 (Sep. 2019); Technical Specification; 3rd Generation Partnership Project; Technical Specification Group Radio Access Network; NR;Physical layer procedures for control (Release 15).
3GPP TS 38.214 V15.5.0 (Mar. 2019); Technical Specification; 3rd Generation Partnership Project; Technical Specification Group Radio Access Network; NR; Physical layer procedures for data; (Release 15).
R1-1808405; 3GPP TSG RAN WG1 Meeting #94; Gothenburg, Sweden, Aug. 20-24, 2018; Source: CATT; Title: On NR Uu control LTE sidelink in NR V2X; Agenda Item: 7.2.4.3.2; Document for: Discussion and Decision.
R1-1808526; 3GPP TSG RAN WG1 Meeting #94; Gothenburg, Sweden, Aug. 20-24, 2018; Agenda Item: 7.2.4.3.1; Source: LG Electronics; Title: Discussion on NR Uu enhancements to control LTE sidelink; Document for: Discussion and decision.
R1-1808607; 3GPP TSG RAN WG1 Meeting #94; Gothenburg, Sweden, Aug. 20-24, 2018; Title: Discussion on NR Uu based resource allocation/configuration for LTE sidelink; Source: ZTE; Agenda item: 7.2.4.3.2; Document for: Discussion and Decision.
R1-1808700; 3GPP TSG RAN WG1 Meeting #94; Gothenburg, Sweden, Aug. 20-24, 2018; Source: Intel Corporation; Title: Enhancements of NR Uu Link to Control LTE Sidelink; Agenda item: 7.2.4.3.2; Document for: Discussion and Decision.
R1-1808782; 3GPP TSG RAN WG1 #94; Gothenburg, Sweden, Aug. 20-24, 2018; Agenda item: 7.2.4.1.1; Source: Samsung; Title: Discussion on enhancements of NR Uu to control LTE sidelink; Document for: Discussion and Decision.
R1-1808839; 3GPP TSG RAN WG1 Meeting #94; Gothenburg, Sweden, Aug. 20-24, 2018; Source: CMCC; Title: Discussion on NR Uu control LTE sidelink; Agenda Item: 7.2.4.3.2; Document for: Discussion and Decision.
R1-1808907; 3GPP TSG-RAN WG1 Meeting #94; Gothenburg, Sweden, Aug. 20-24, 2018; Agenda item: 7.2.4.3.2; Title: Enhancement of NR Uu to control LTE sidelink; Source: OPPO; Document for: Discussion and Decision.
R1-1809071; 3GPP TSG RAN WG1 Meeting #94; Gothenburg, Sweden, Aug. 20-24, 2018; Agenda Item: 7.2.4.3.2; Source: AT&T; Title: Enhancements of NR Uu to control LTE sidelink; Document for: Discussion/Approval.
R1-1809097; 3GPP TSG RAN WG1 Meeting #94; Gothenburg, Sweden, Aug. 20-24, 2018; Agenda Item: 7.2.4.3.2; Source: InterDigital Inc.; Title: NR Uu Interface Enhancement for LTE Sidelink; Document for: Discussion and Decision.
R1-1809310; 3GPP TSG-RAN WG1 Meeting #94; Goteborg, Sweden, Aug. 20-24, 2018; Agenda Item: 7.2.4.3.2; Source: Ericsson; Title: On NR Uu controlling LTE sidelink; Document for: Discussion, Decision.
R1-1809452; 3GPP TSG-RAN WG1 Meeting #94; Gothenburg, Sweden, Aug. 20-24, 2018; Agenda Item: 7.2.4.3.2; Source: Qualcomm Incorporated; Title: Enhancements of NR Uu to control LTE sidelink; Document for: Discussion and Decision.
R1-1809600; 3GPP TSG RAN WG1 Meeting #94; Gothenburg, Sweden, Aug. 20-24, 2018; Agenda Item: 6.2.2.5; Source: Huawei, HiSilicon; Title: Feature lead summary on support of quality report in Msg3 for non-anchor access; Document for: Discussion and decision.
R1-1904079; 3GPP TSG RAN WG1 Meeting #96bis; Xi'an, China, Apr. 8-12, 2019; Source: vivo; Title: Support of NR Uu controlling LTE sidelink; Agenda Item: 7.2.4.7; Document for: Discussion and Decision.
R1-1906081; 3GPP TSG RAN WG1 #97; Reno, USA, May 13-17, 2019; Source: Nokia, Nokia Shanghai Bell; Title: Discussion of Support of NR Uu configuring LTE sidelink; Agenda item: 7.2.4.7; Document for: Discussion and Decision.
R1-1906144; 3GPP TSG RAN WG1 Meeting #97; Reno, USA, May 13-17, 2019; Source: vivo; Title: Support of NR Uu controlling LTE sidelink; Agenda Item: 7.2.4.7; Document for: Discussion and Decision.
R1-1906321; 3GPP TSG RAN WG1 Meeting #97; Reno, USA, May 13-17, 2019; Source: CATT; Title: On NR Uu controlling LTE sidelink; Agenda Item: 7.2.4.7; Document for: Discussion and Decision.
R1-1906480; 3GPP TSG-RAN WG1 Meeting #97; Reno, USA, May 13-17, 2019; Agenda item: 7.2.4.7; Title: Discussion on NR Uu controlling LTE sidelink; Source: OPPO; Document for: Discussion and Decision.
R1-1906517; 3GPP TSG RAN WG1 Meeting #97; Reno, USA, May 13-17, 2019; Agenda item: 7.2.4.7; Source: CMCC, Orange, China Telecom, China Unicom, Deusche Telekom; Title: Discussion on support of NR Uu controlling LTE sidelink; Document for: Discussion and Decision.
R1-1906559; 3GPP TSG RAN1 WG1 Meeting #97; Reno, USA, May 13-17, 2019; Agenda item: 7.2.4.7; Title: Discussion on NR Uu controlling LTE sidelink; Source: MediaTek Inc.; Document for: Discussion and Decision.
R1-1906593; 3GPP TSG RAN WG1 Meeting #97; Reno, USA, May 13-17, 2019; Agenda Item: 7.2.4.7; Source: Huawei, HiSilicon; Title: NR Uu control for LTE sidelink; Document for: Discussion and decision.
R1-1906801; 3GPP TSG RAN WG1 Meeting #97; Reno, USA, May 13-17, 2019; Source: Intel Corporation; Title: Design of NR Uu Controlling LTE Sidelink; Agenda item: 7.2.4.7; Document for: Discussion and Decision.
R1-1906943; 3GPP TSG RAN WG1 #97; Reno, USA, May 13-17, 2019; Agenda item: 7.2.4.7; Source: Samsung; Title: On NR Uu controlling LTE sidelink; Document for: Discussion and Decision.
R1-1907020; 3GPP TSG RAN WG1 #97; Reno, May 13-17, 2019; Agenda item: 7.2.4.7; Source: LG Electronics; Title: Discussion on NR Uu controlling LTE sidelink; Document for: Discussion and decision.
R1-1907099; 3GPP TSG RAN WG1 #97; Reno, USA, May 13-17, 2019; Agenda Item: 7.2.4.7; Source: InterDigital, Inc.; Title: On Support of NR Uu Controlling LTE Sidelink; Document for: Discussion and Decision.
R1-1907131; 3GPP TSG RAN WG1 #97; Reno, USA, May 13-17, 2019; Title: Discussion on NR Uu controlling LTE sidelink; Source: ZTE, Sanechips; Agenda item: 7.2.4.7; Document for: Discussion and decision.

(56) References Cited

OTHER PUBLICATIONS

R1-1907145; 3GPP TSG-RAN WG1 Meeting #97; Reno, US, May 13-17, 2019; Agenda Item: 7.2.4.7; Source: Ericsson; Title: NR Uu controlling LTE sidelink transmissions; Document for: Discussion, Decision.
R1-1907236; 3GPP TSG RAN WG1 #97; Reno, USA, May 13-17, 2019; Source: ITRI; Title: The discussions on NR-Uu controlling to LTE sidelink mode-3 and mode-4.; Agenda Item: 7.2.4.7; Document for: Discussion and Decision.
R1-1907276; 3GPP TSG RAN WG1 Meeting #97; Reno, USA, May 13-17, 2019; Agenda item: 7.2.4.7; Source: Qualcomm Incorporated; Title: NR Uu control of LTE sidelink; Document for: Discussion and Decision.
R1-1907480; 3GPP TSG RAN WG1 #97; Reno, USA, May 13-17, 2019; Agenda Item: 7.2.4.7; Source: Lenovo, Motorola Mobility, Deutsche Telekom; Title: NR Uu controlling LTE sidelink; Document for: Discussion.
R1-1907686; 3GPP TSG RAN WG1 Meeting #97; Reno, USA, May 13-17, 2019; Agenda Item: 7.2.4.7; Source: Huawei; Title: Feature lead summary for AI 7.2.4.7: NR control for LTE sidelink; Document for: Discussion and decision.
R1-1907801; 3GPP TSG RAN WG1 Meeting #97; Reno, USA, May 13-17, 2019; Agenda Item: 7.2.4.7; Source: Huawei; Title: Feature lead summary for AI 7.2.4.7: NR control for LTE sidelink; Document for: Discussion and decision.
R4-1712335; 3GPP TSG-RAN WG4 85; Reno, Nevada, Nov. 27-Dec. 1, 2017; Source: Intel Corporation; Title: On difficult band combination for a single or dual UL Transmission in LTE-NR DC; Agenda Item: 9.4.2; Document for: Discussion.

* cited by examiner

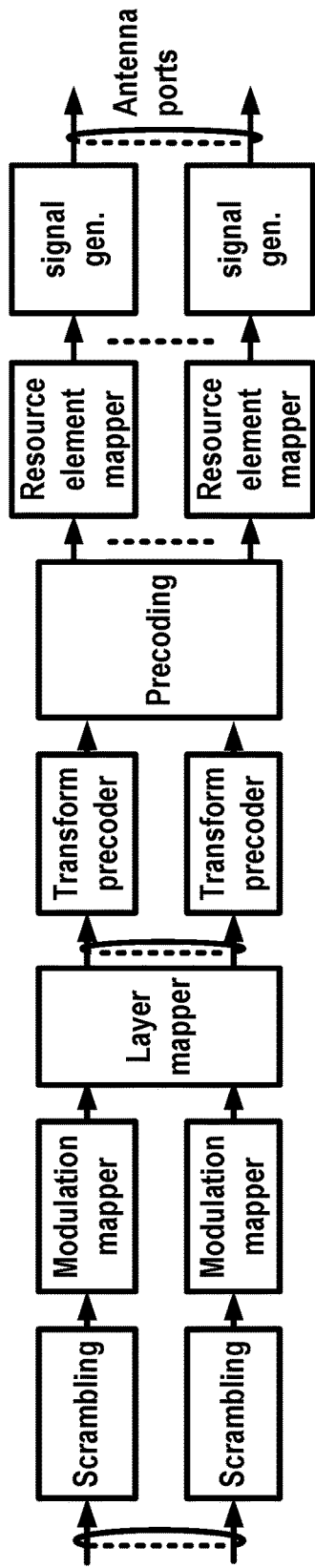
FIG. 4A
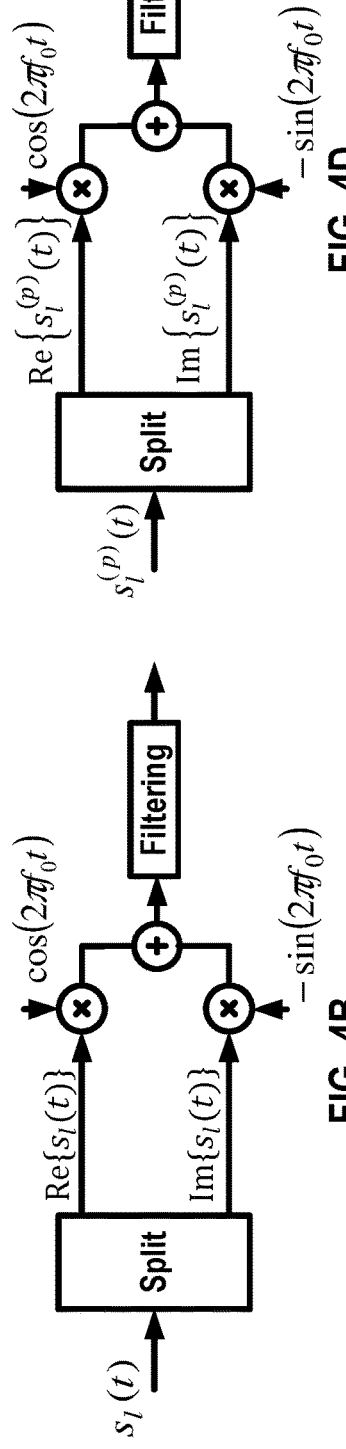
FIG. 4B
FIG. 4D
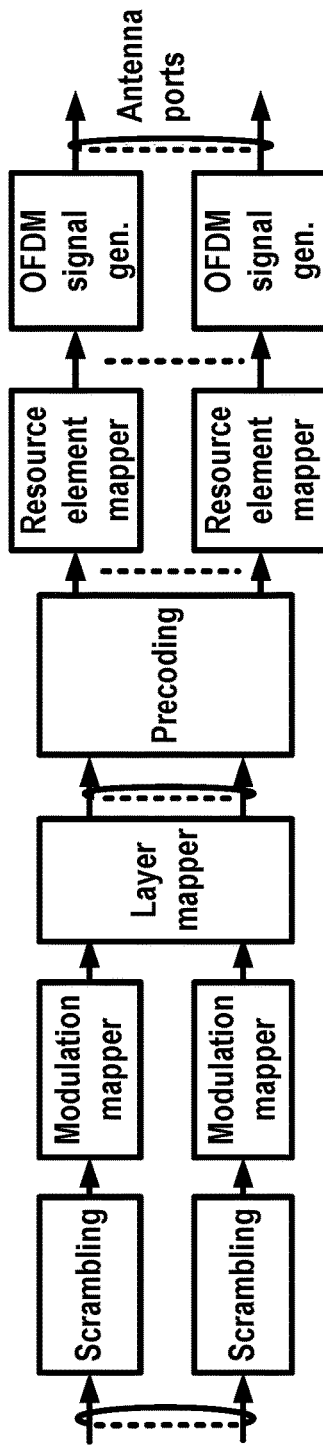
FIG. 4C

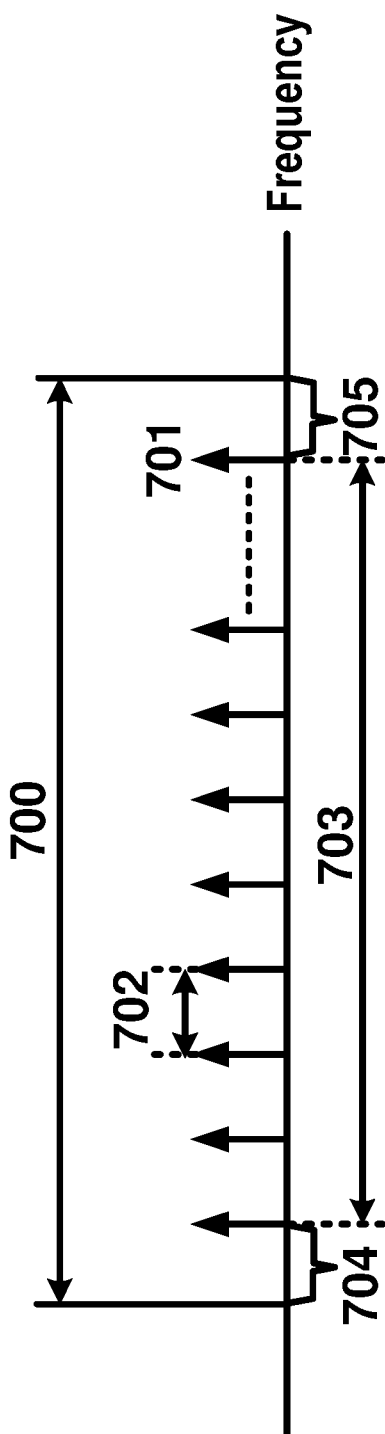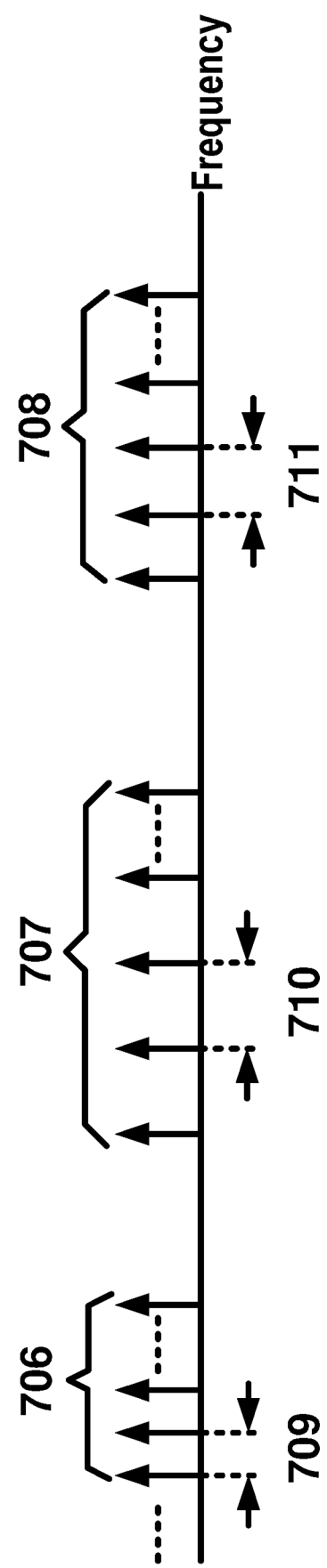

Receive message(s) comprising: a sidelink priority for a sidelink transmission via a sidelink resource pool; a 1st priority threshold for the sidelink resource pool; and a 2nd priority threshold for the sidelink resource pool
3410 configured uplink transmission a 1st priority class or a 2nd priority class?
3420

1st priority class →

2nd priority class →

Sidelink priority higher than the 1st priority threshold?
3430

Sidelink priority higher than the 2nd priority threshold?
3440

YES

YES

Transmit the sidelink transmission overlapping with a configured uplink transmission
3450

FIG. 34

PRIORITIZATION OF SIDELINK AND UPLINK TRANSMISSIONS

CROSS-REFERENCE TO RELATED APPLICATIONS

This application is a continuation of U.S. patent application Ser. No. 16/904,128, filed Jun. 17, 2020, which claims the benefit of U.S. Provisional Application No. 62/862,347, filed Jun. 17, 2019, all of which are hereby incorporated by reference in their entireties.

BRIEF DESCRIPTION OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 34 is a flow diagram of an aspect of an example embodiment of the present disclosure.

DETAILED DESCRIPTION OF EMBODIMENTS

Figure 1:
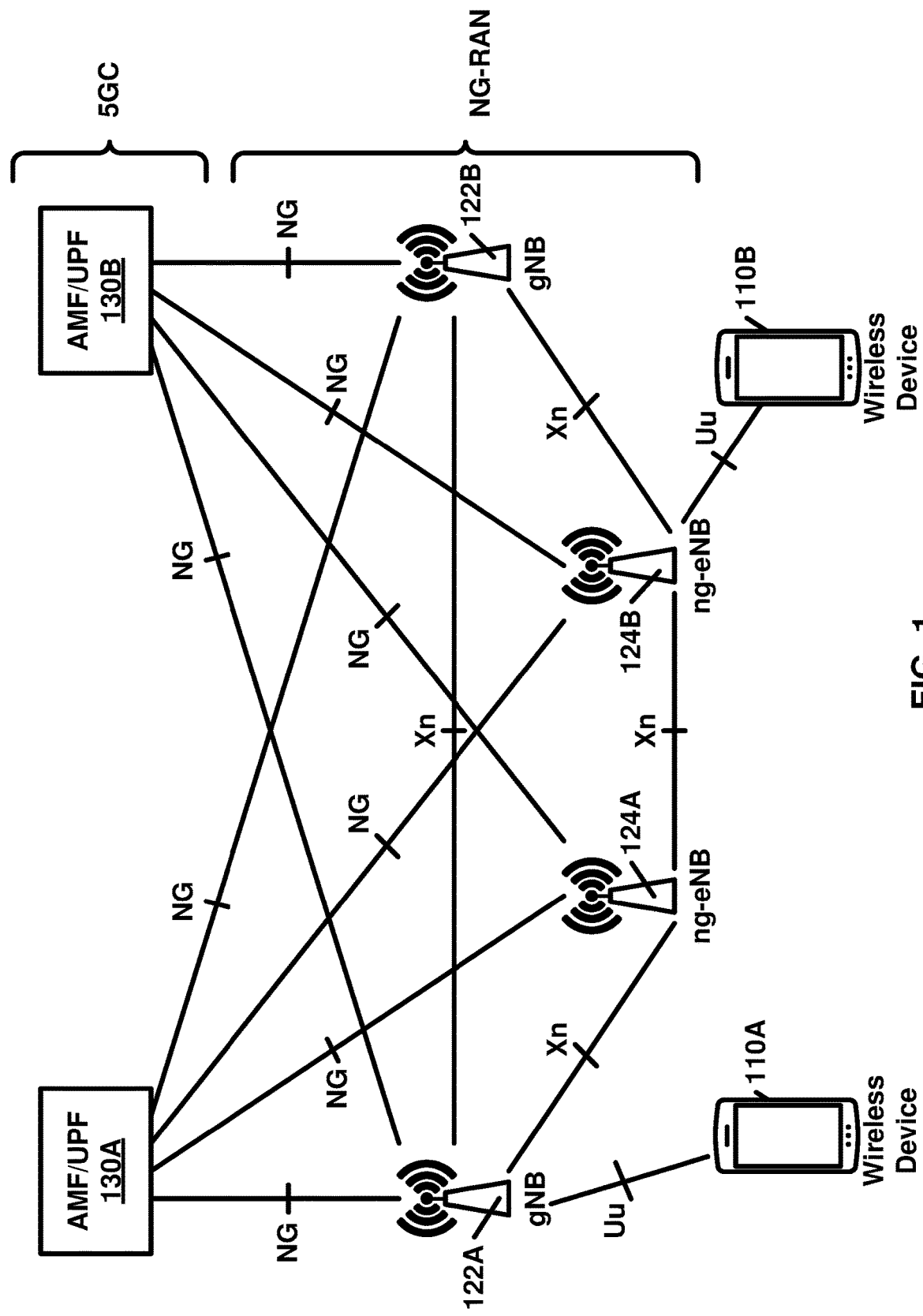
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of a sidelink, V2X, and/or multicarrier communication systems. More particularly, the embodiments of the technology disclosed herein may relate to radio access networks in vehicle to everything or vehicle to vehicle communications.

The following Acronyms are used throughout the present disclosure:

3GPP 3rd Generation Partnership Project
5GC 5G Core Network
ACK Acknowledgement
AMF Access and Mobility Management Function ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
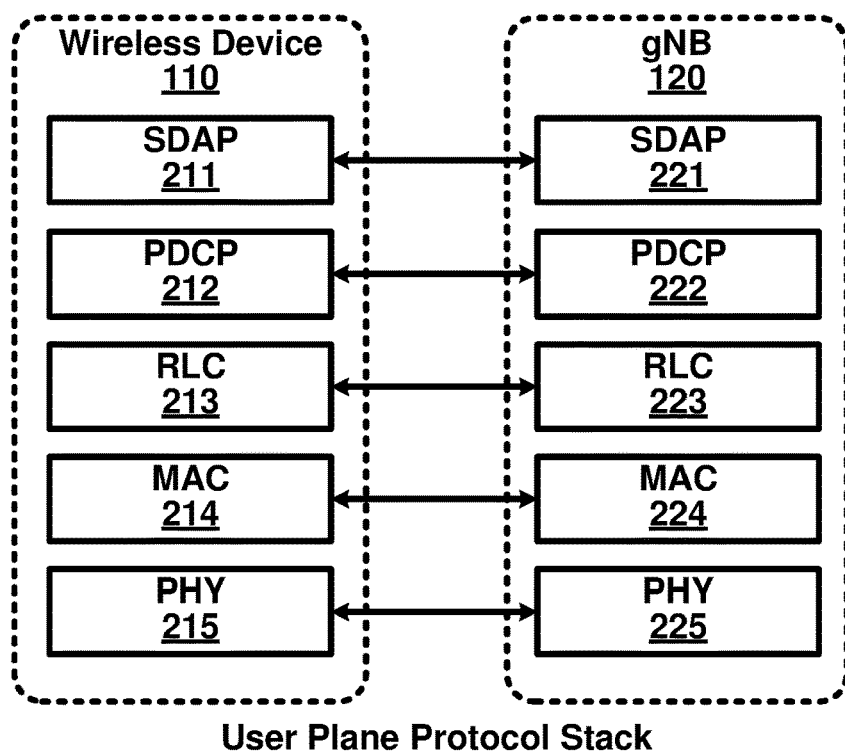
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings.

In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
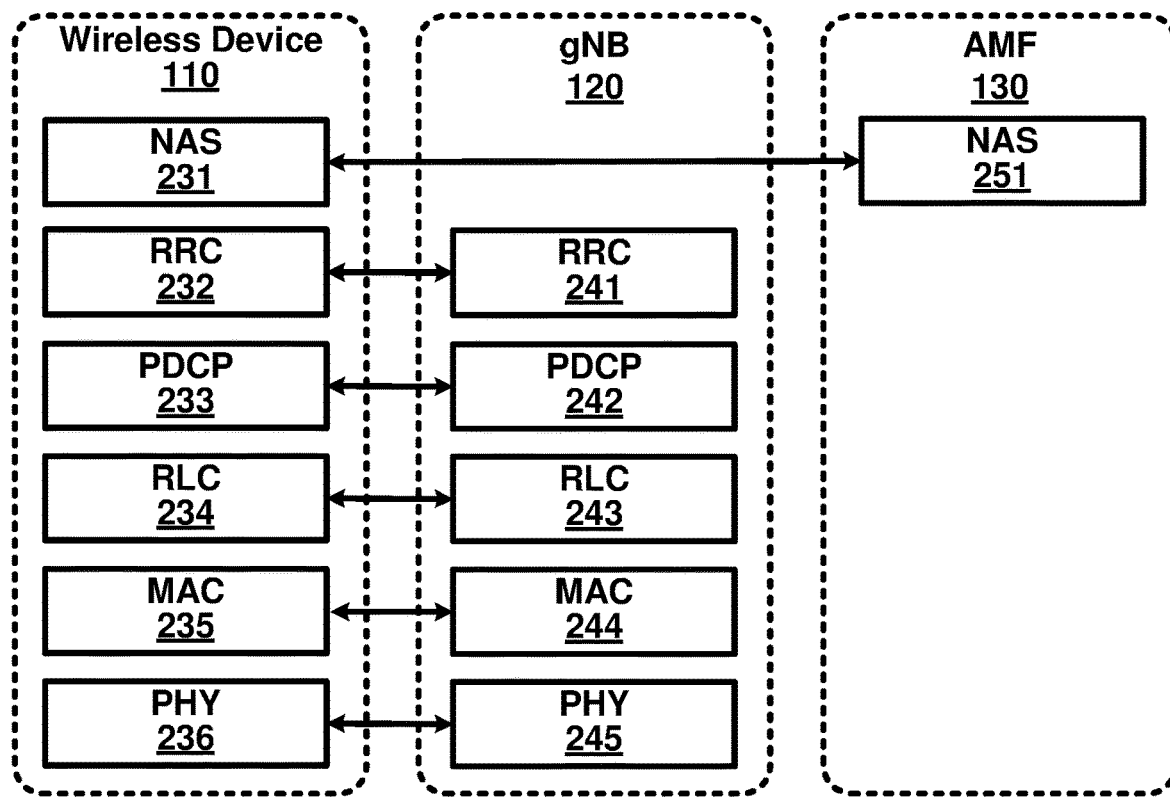
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
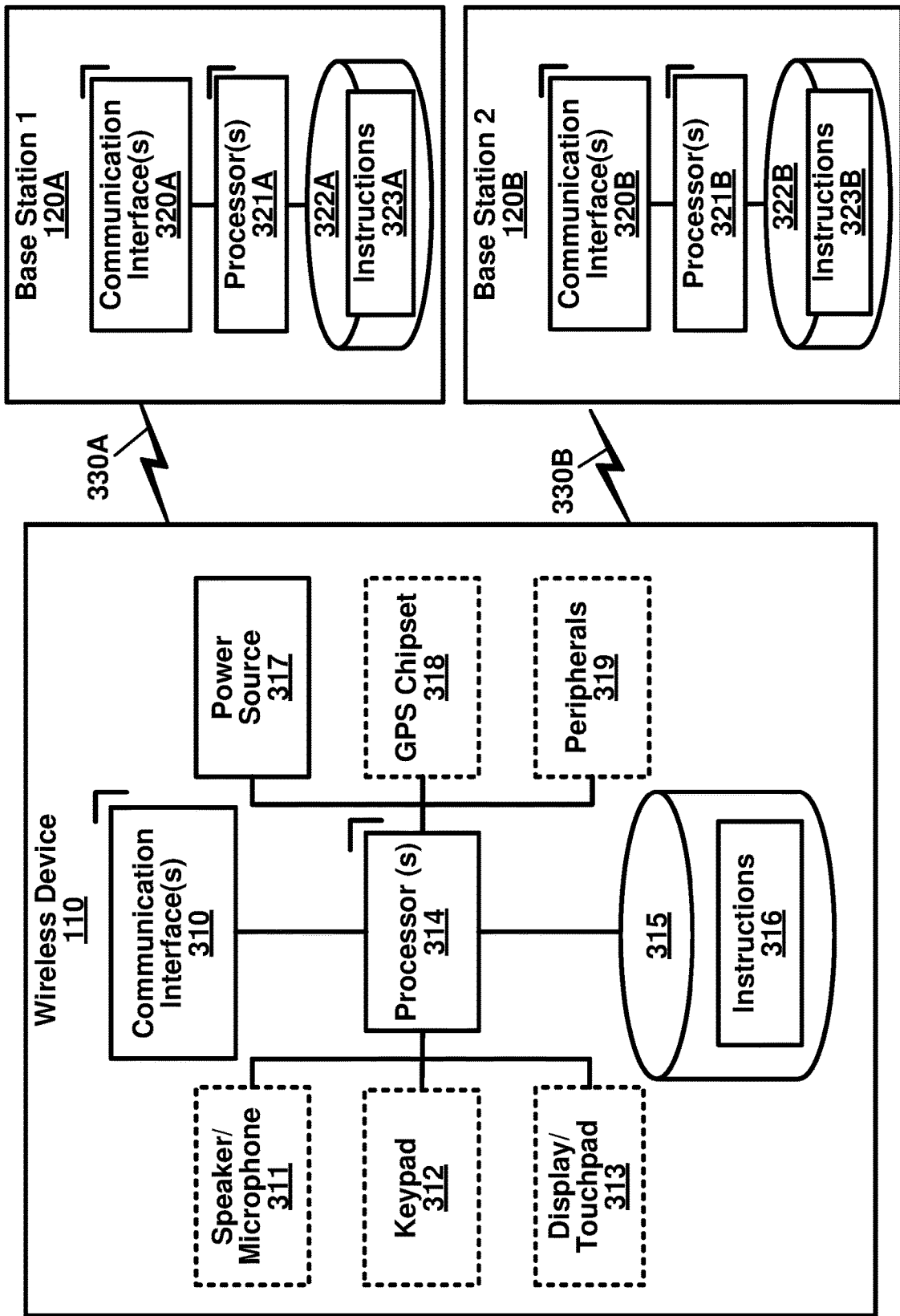
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
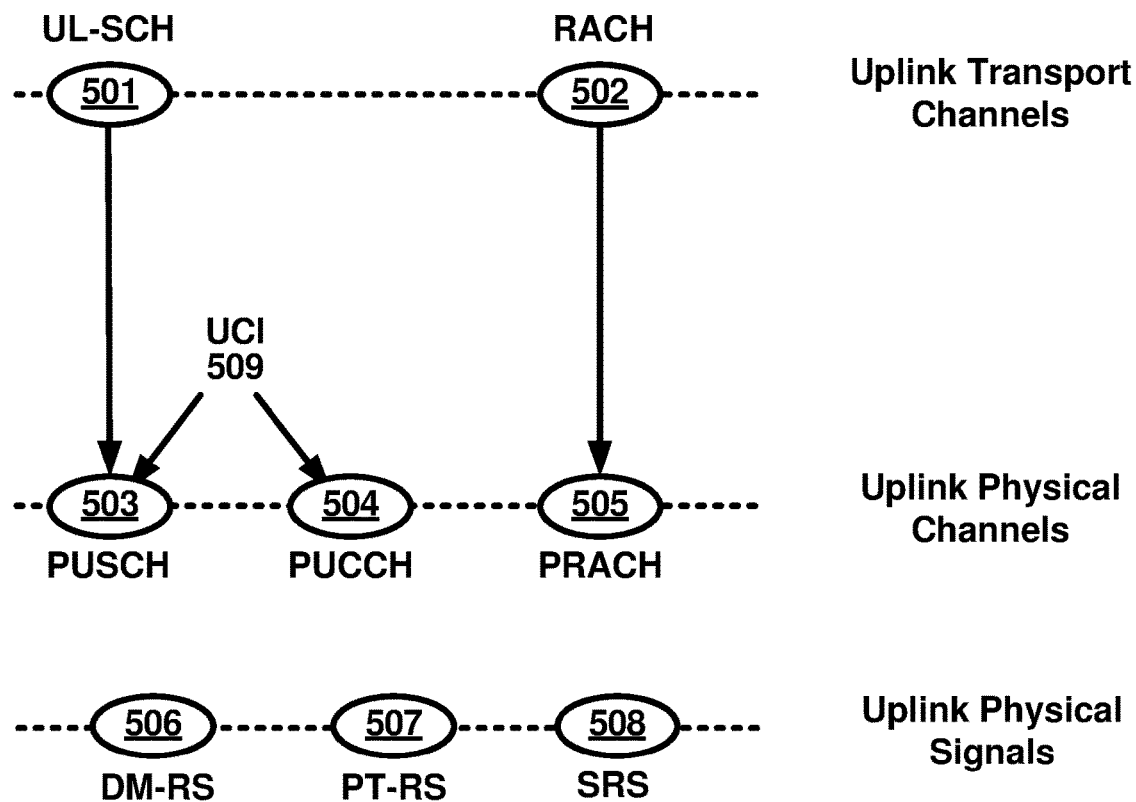
FIG. 5A is a diagram of an example uplink channel mapping and example uplink physical signals as per an aspect of an embodiment of the present disclosure.
Figure 5B:
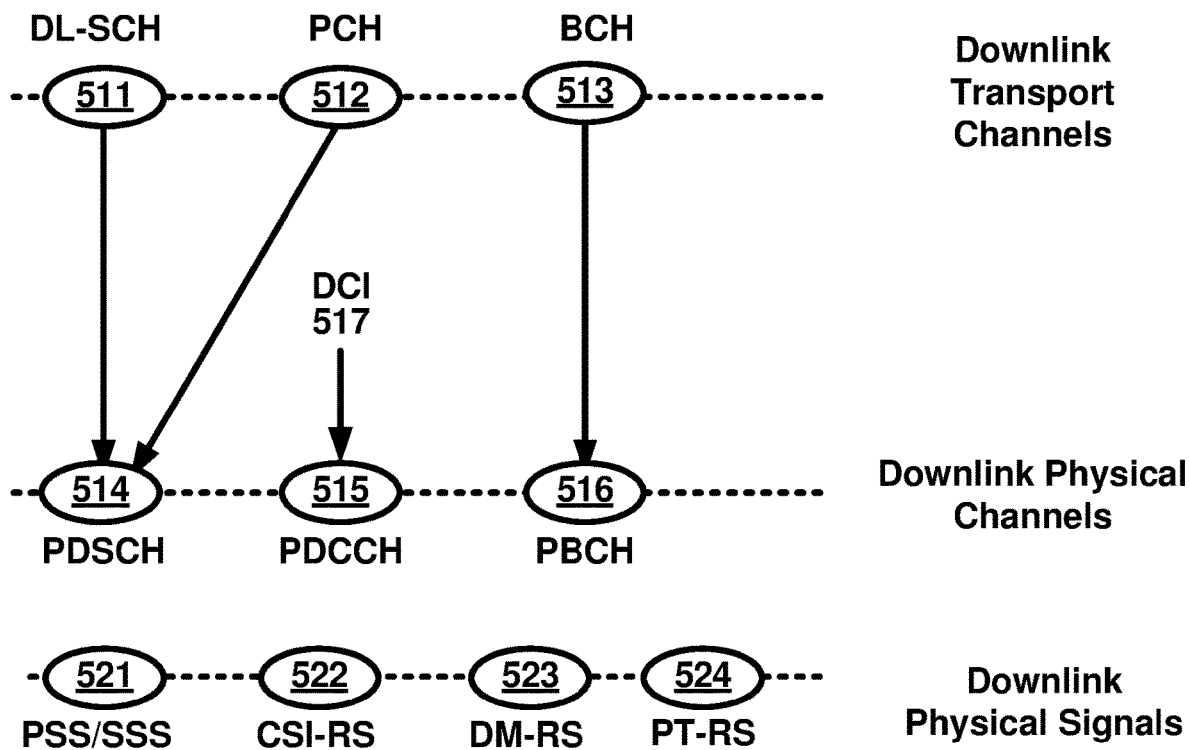
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
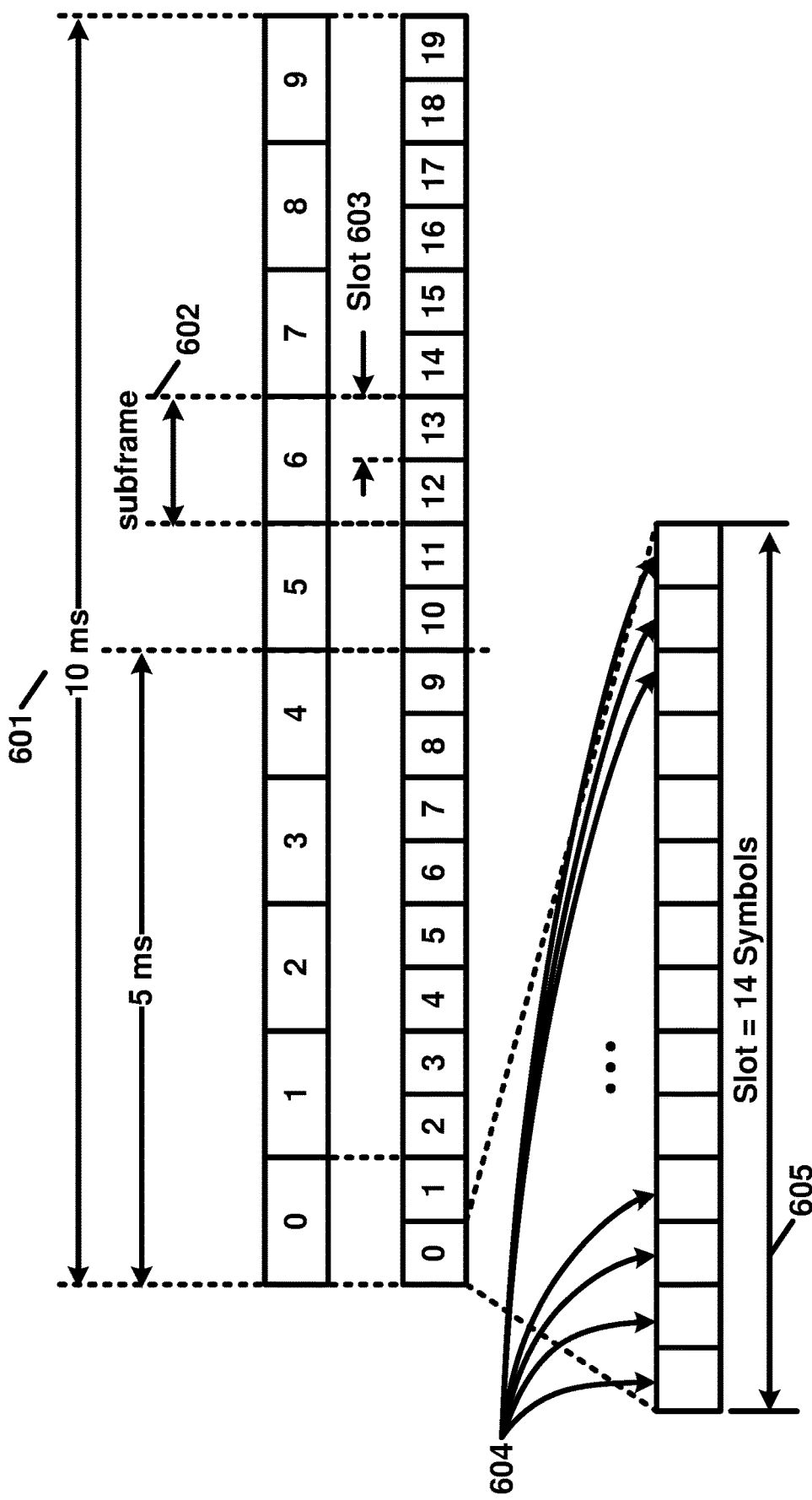
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
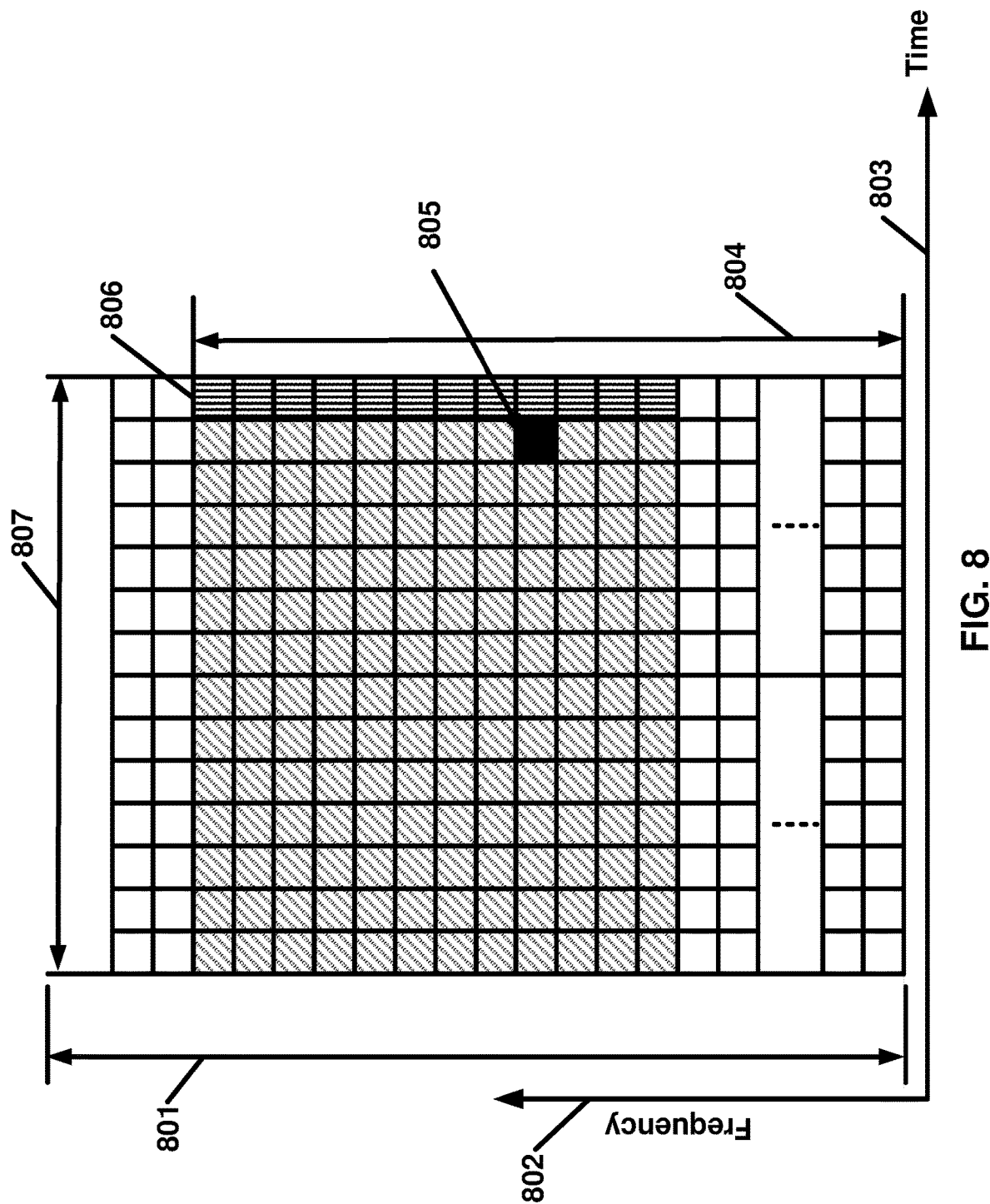
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
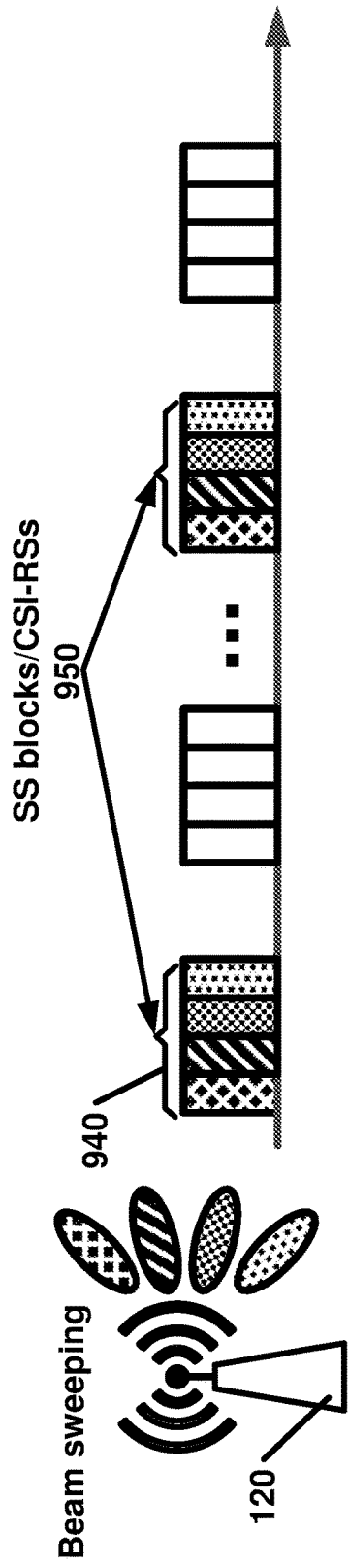
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
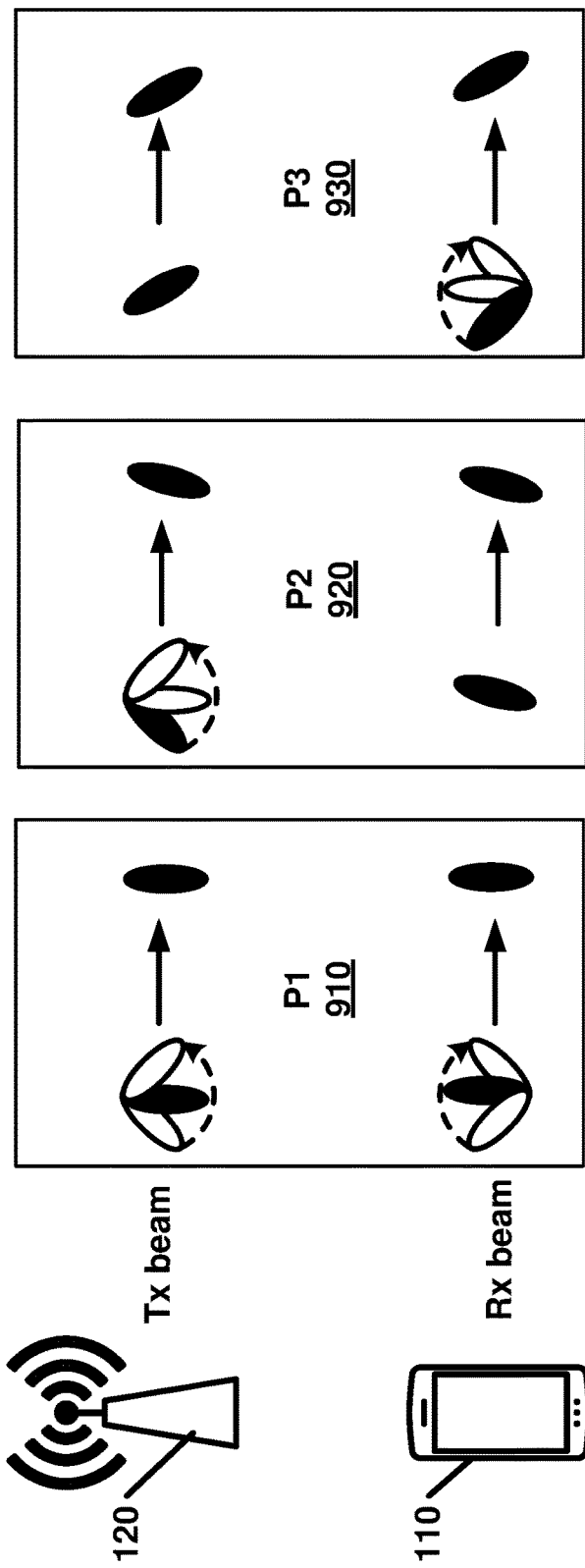
FIG. 9B is a diagram depicting an example downlink beam management procedure as per an aspect of an example embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
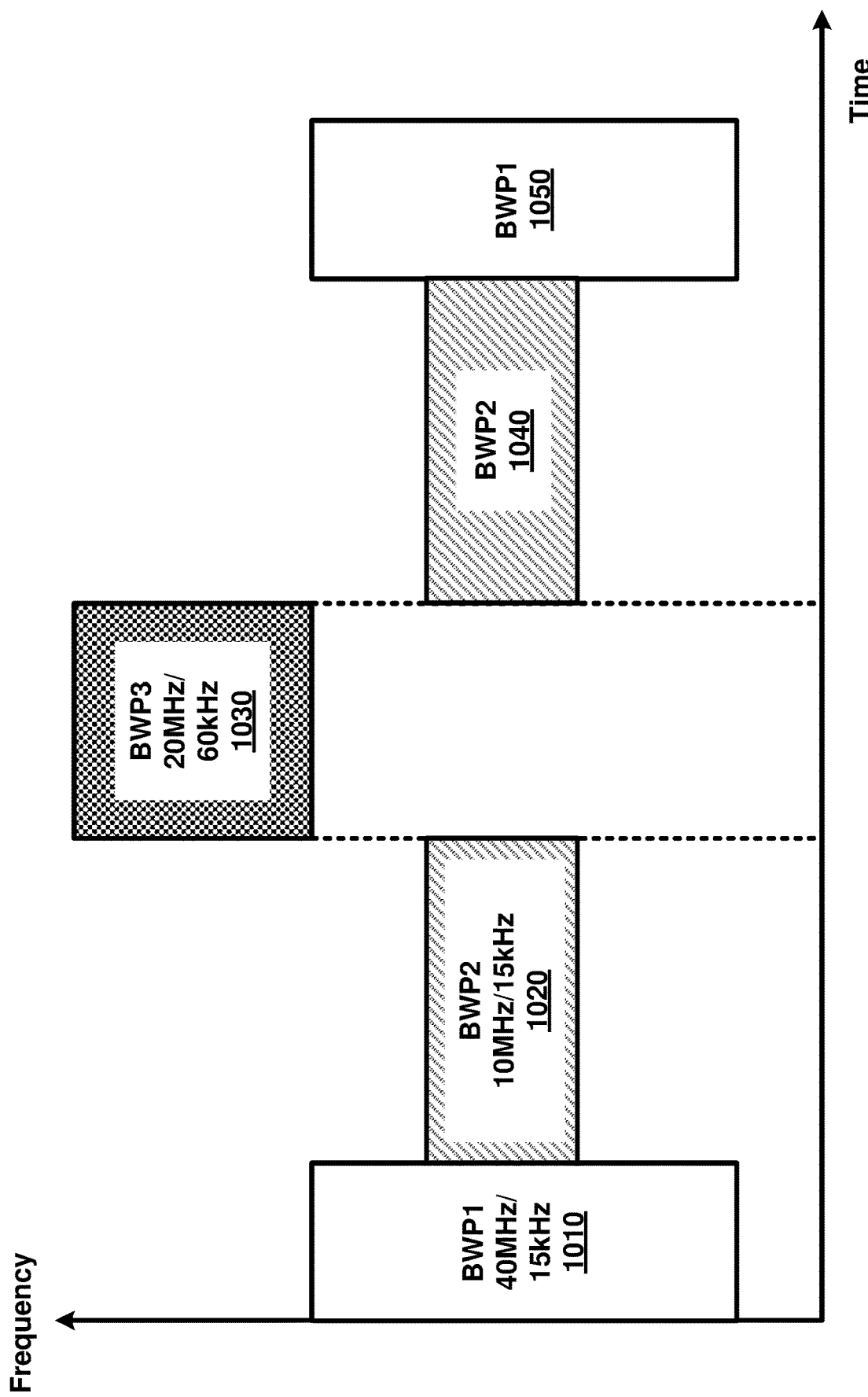
FIG. 10 is an example diagram of configured BWPs as per an aspect of an example embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
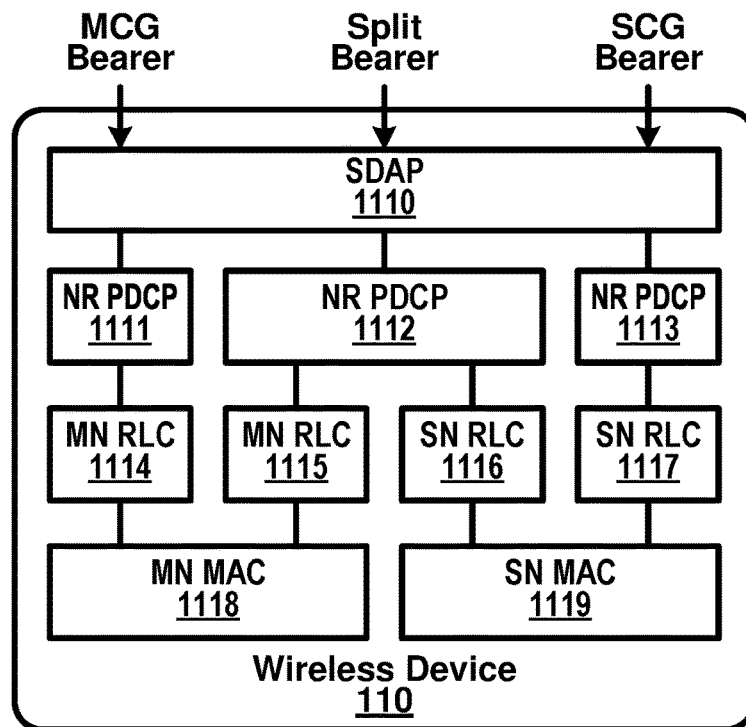
FIG. 11A and FIG. 11B are diagrams of an example multi-connectivity as per an aspect of an example embodiment of the present disclosure.
Figure 11B:
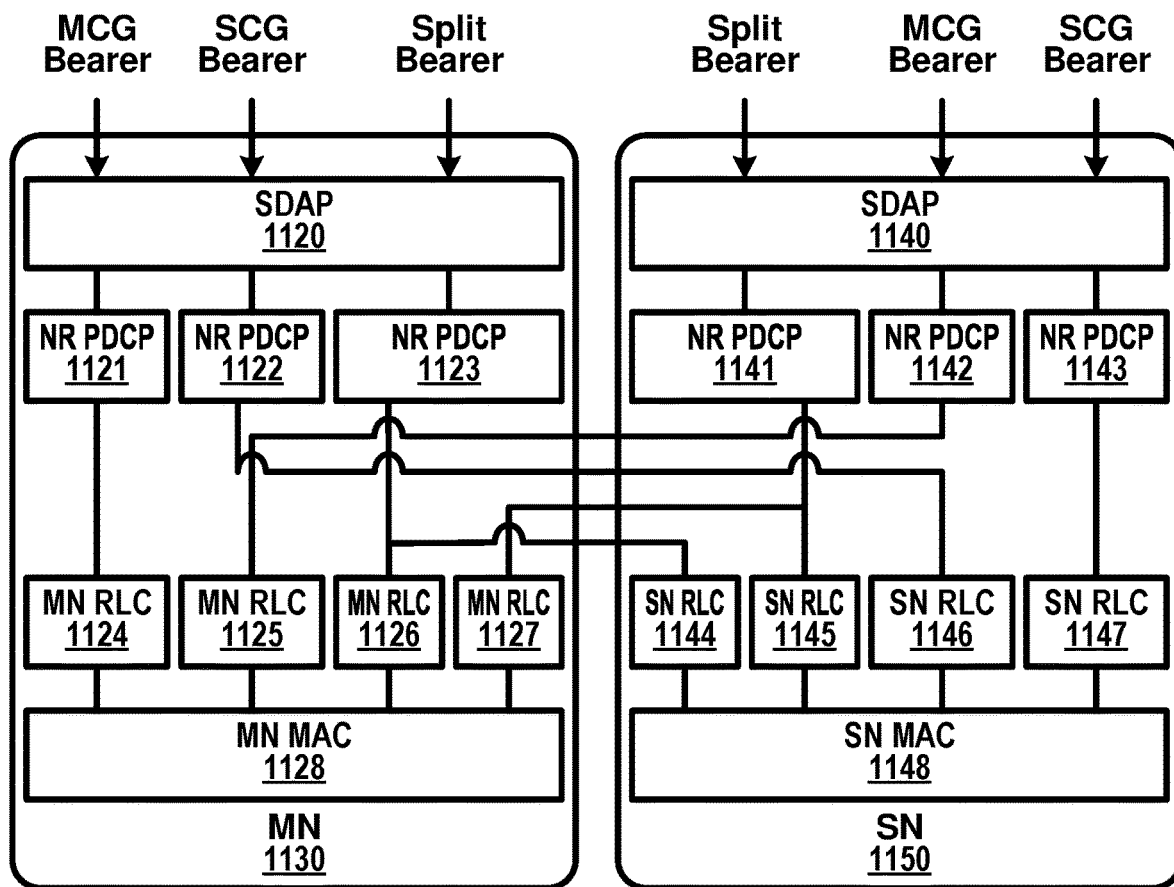

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
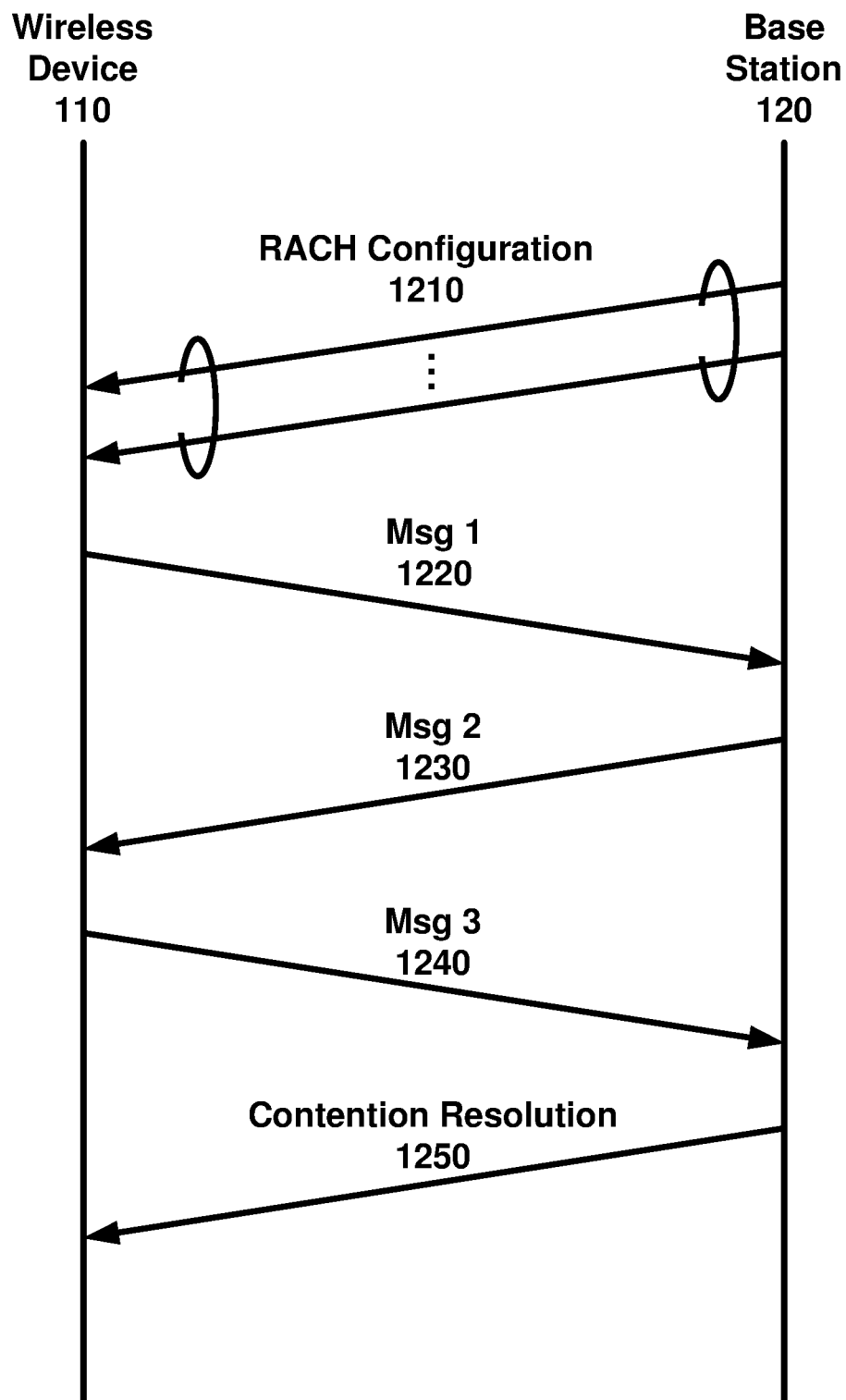
FIG. 12 is a diagram of an example random access procedure as per an aspect of an example embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
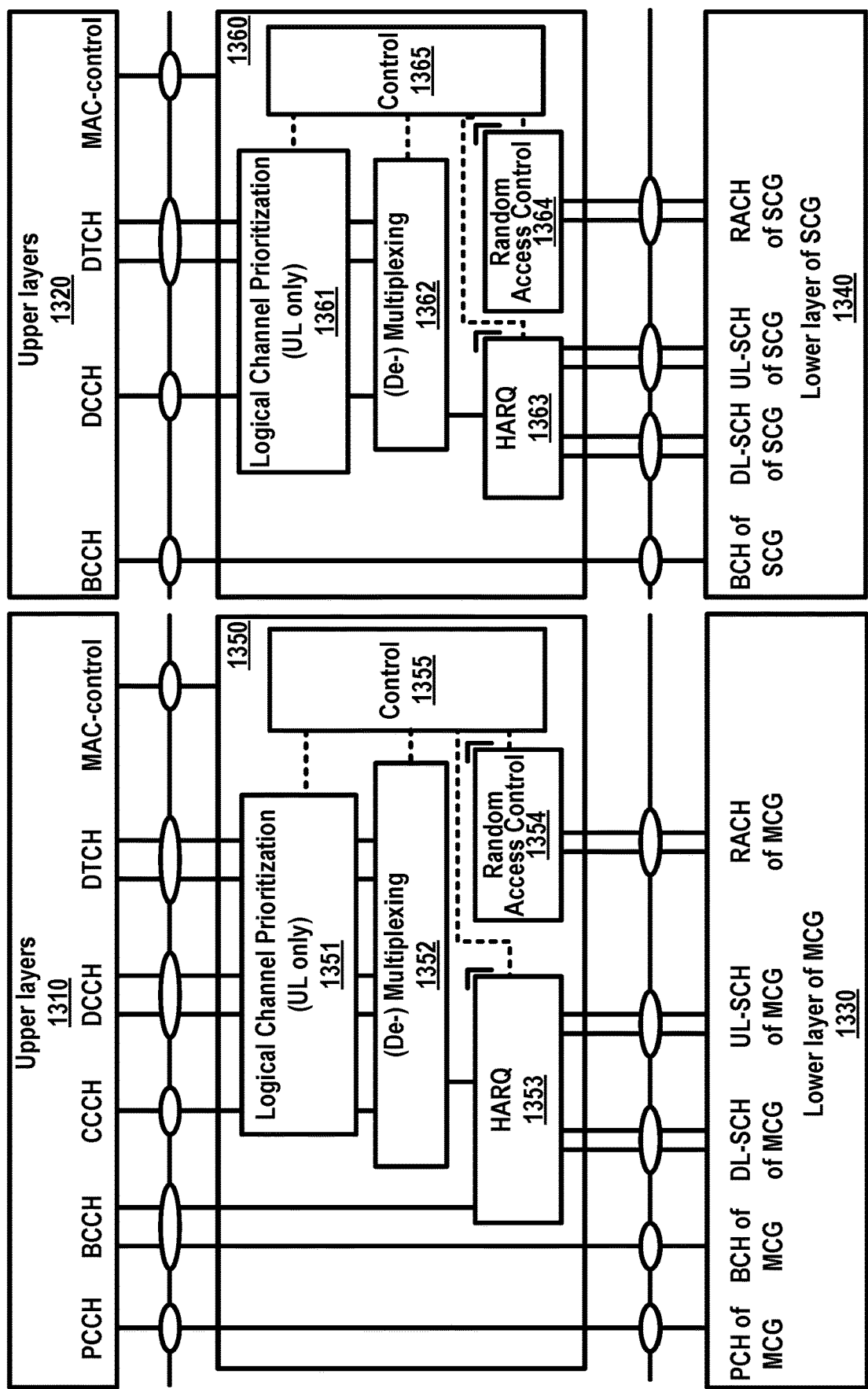
FIG. 13 is a structure of example MAC entities as per an aspect of an example embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
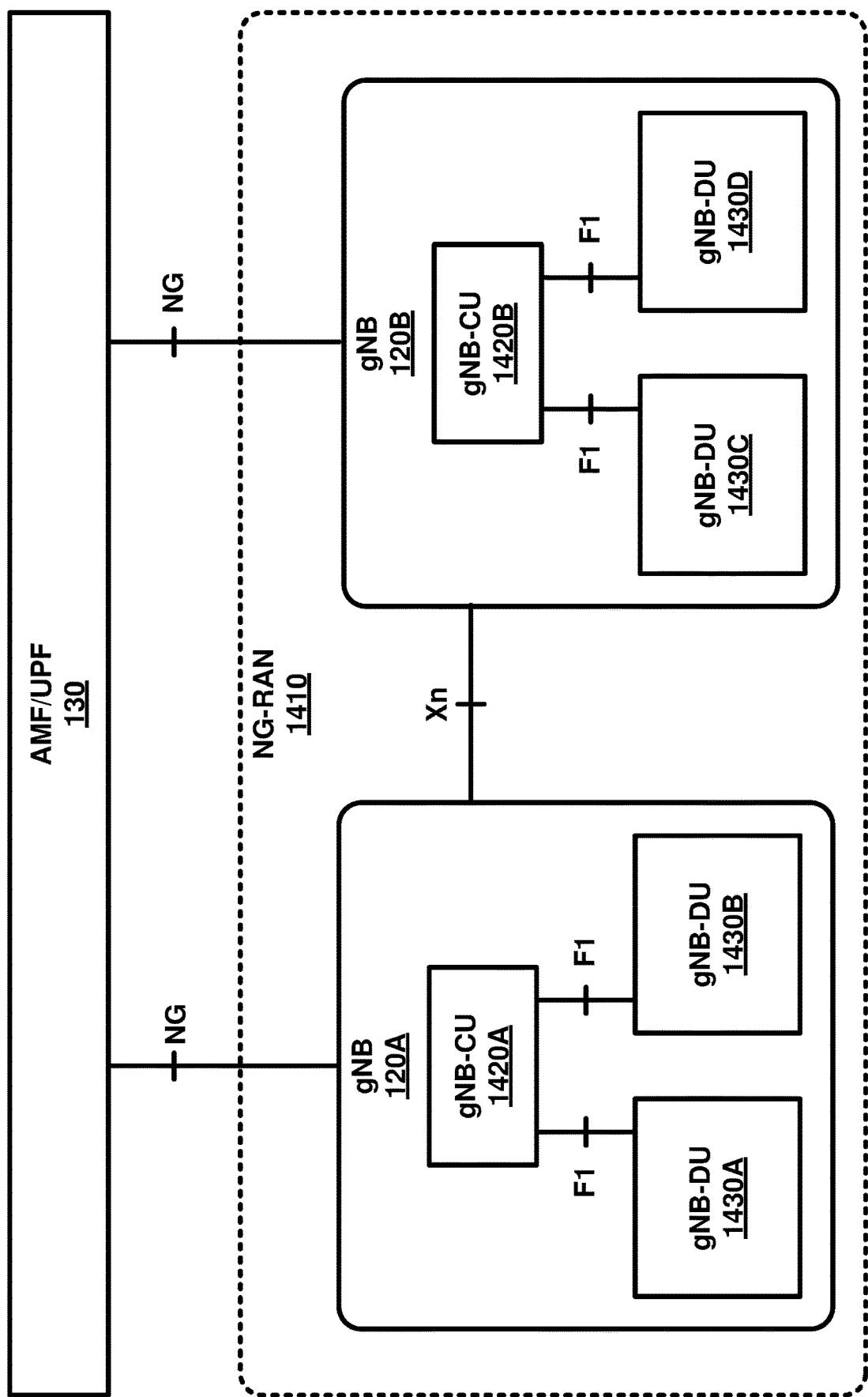
FIG. 14 is a diagram of an RAN architecture as per an aspect of an example embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
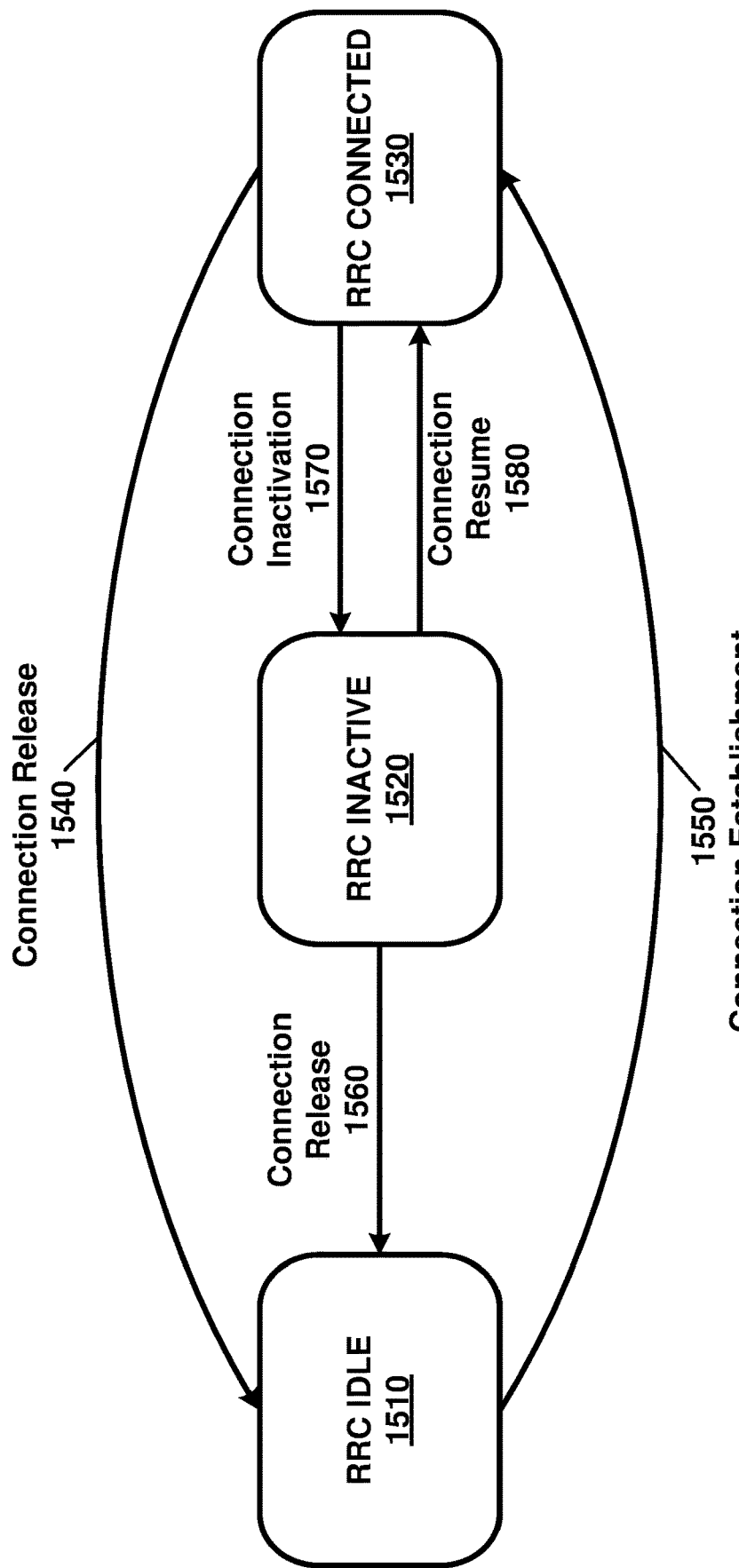
FIG. 15 is a diagram illustrating RRC states as per an aspect of an example embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A device-to-device (D2D) communication may allow a direct communication between a first wireless device and a second wireless device. The first wireless device may communicate with the second wireless device via a sidelink (SL) with the PC5 interface. A base station may assist a D2D or a sidelink operation between the first wireless device and the second wireless device. A communication between the base station and a wireless device may be done via a network communication with a user plan interface (e.g., Uu interface).

Figure 16A:
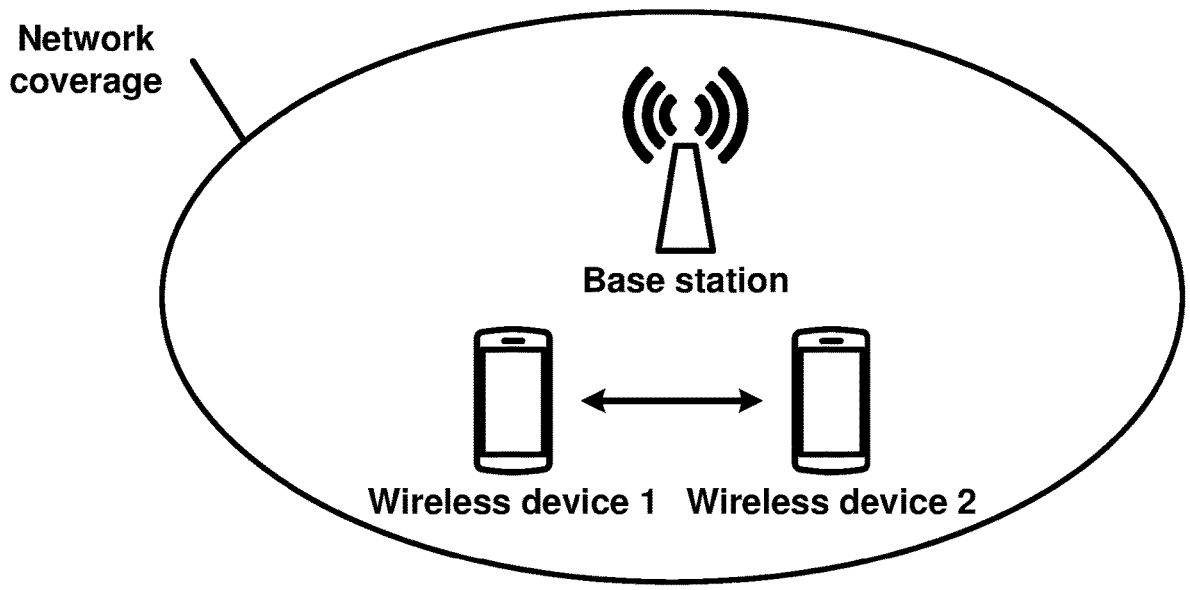
FIG. 16A and FIG. 16B are examples of an in-coverage D2D communication as per an aspect of an example embodiment of the present disclosure.
Figure 16B:
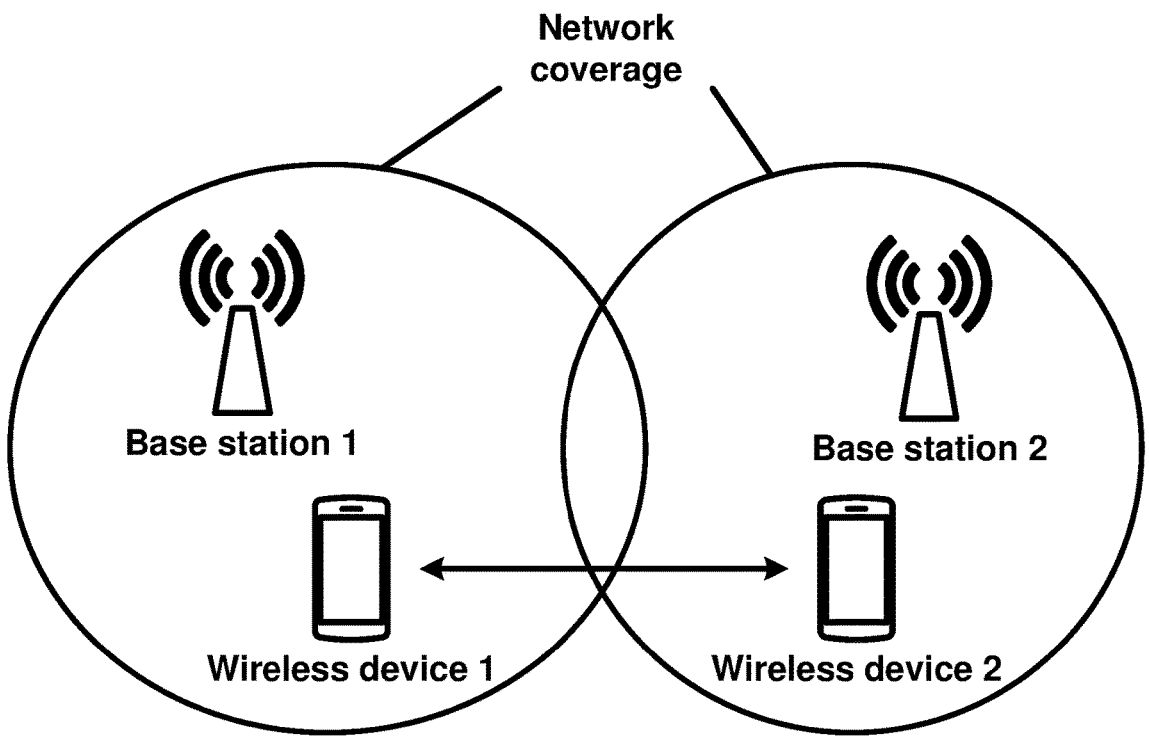

In an example, various combinations of a SL interface and Uu interfaces are considered for a D2D communication. For example, a first wireless device and a second wireless device may perform a D2D communication. The first wireless device may be connected to a first base station or not. The second wireless device may be connected to a second base station or not. FIG. 16 illustrate a few examples of various scenarios of Uu and SL interfaces. FIG. 16A and FIG. 16B illustrate examples of an in-coverage D2D communication. In the example of FIG. 16A, a first wireless device (e.g., wireless device 1 in FIG. 16A) may communicate with a second wireless device (e.g., wireless device 2 in FIG. 16A) via a sidelink. Both the first wireless device and the second wireless device may be within a coverage of a base station. In an example, the base station may communicate with the first wireless device via a first Uu link. The base station may communicate with the second wireless device via a second Uu link. In the example of FIG. 16B, a sidelink may connect a first wireless device (wireless device 1 in FIG. 16B) with a second wireless device (e.g., wireless device 2 in FIG. 16B). The first wireless device may be within a first coverage of a first base station (e.g., base station 1 in FIG. 16B). The second wireless device (e.g., wireless device 2 in FIG. 16B) may be within a second coverage of a second base station (e.g., base station 2 in FIG. 16B). In an example, the first base station may communicate with the first wireless device via a first Uu link. The second base station may communicate with the second wireless device via a second Uu link.

Figure 17A:
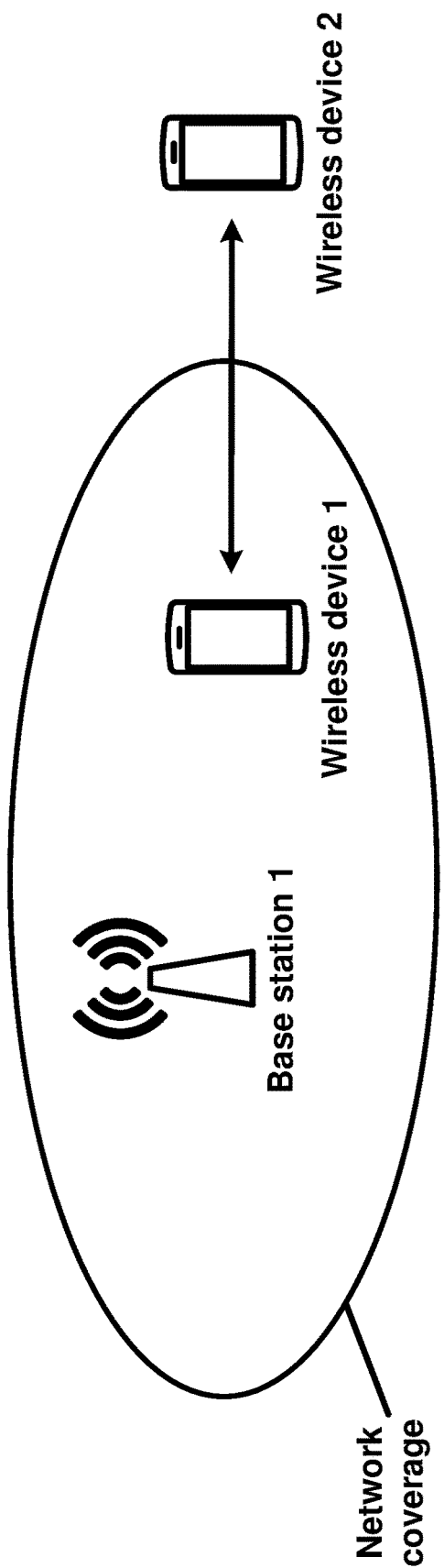
FIG. 17A and FIG. 17B are diagrams of a partial-coverage D2D communication as per aspects of an example embodiment of the present disclosure.
Figure 17B:
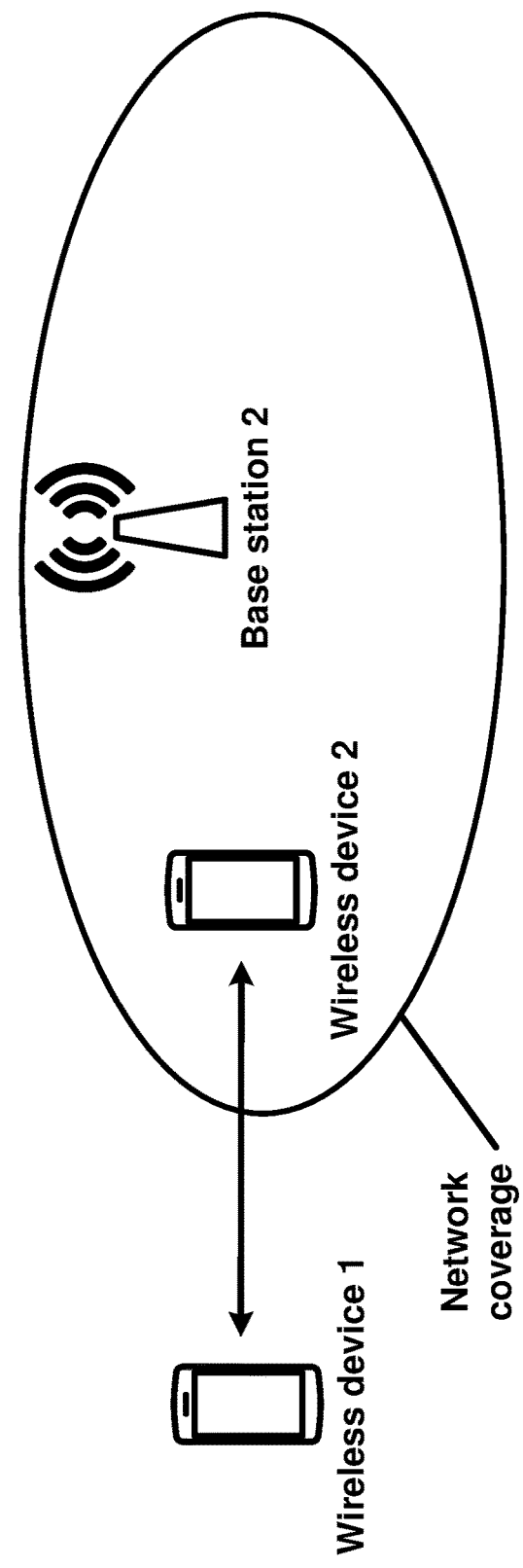

FIG. 17 illustrates an example of a partial-coverage D2D communication. A first wireless device (e.g., wireless device 1 in FIG. 17) may be within a coverage of a base station. A second wireless device (e.g., wireless device 2 in FIG. 17) may be out of the coverage of the base station. The first wireless device may communicate with the second wireless device via a sidelink. In the example of FIG. 17, the base station may be able to communicate with the first wireless device via a first Uu link. The base station may not be able to communicate with the second wireless device via a second Uu link.

Figure 18:
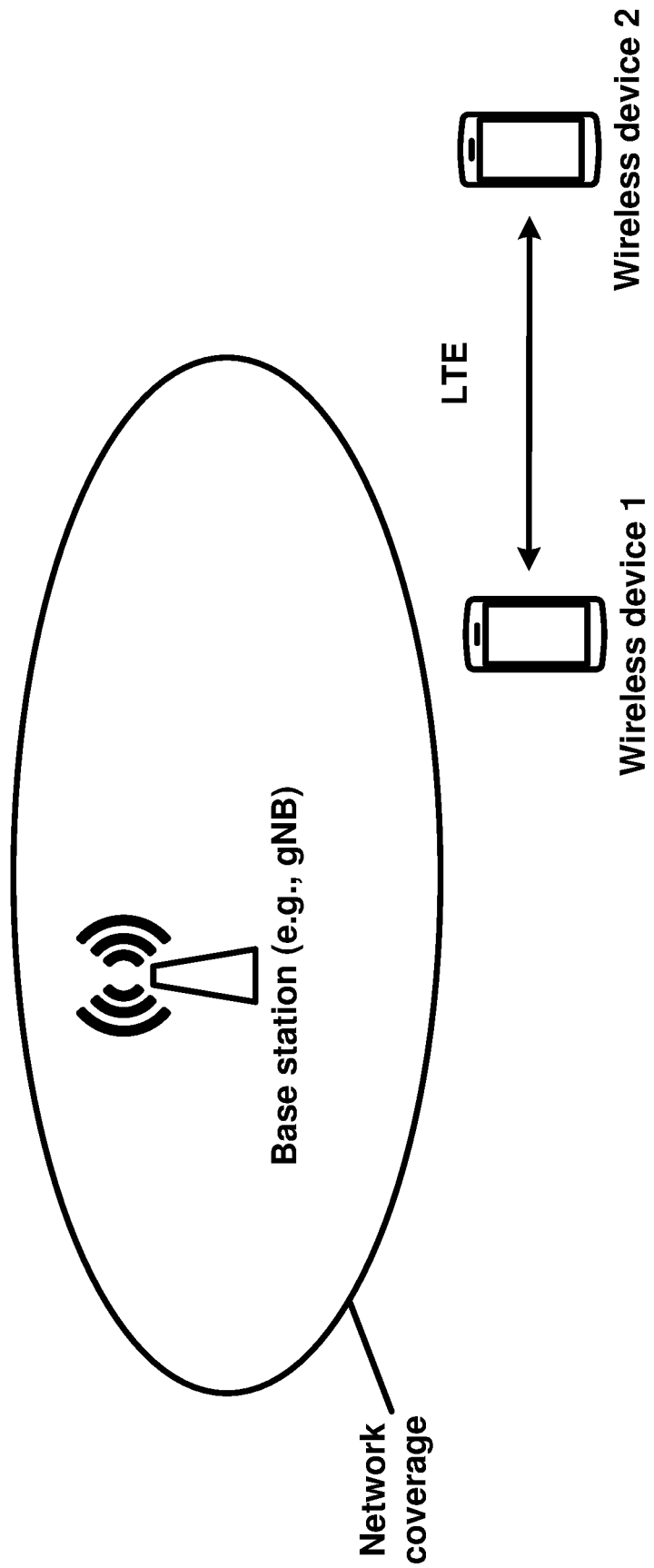
FIG. 18 is a diagram of an out-of-coverage D2D communication as per an aspect of an example embodiment of the present disclosure.

FIG. 18 illustrates an example of an out-of-coverage D2D communication. A first wireless device (e.g., wireless device 1 in FIG. 18) may communicate with a second wireless device (e.g., wireless device 2 in FIG. 18) via a sidelink. Both the first wireless device and the second wireless device may be out of a coverage of a base station. The base station may not be able to communicate with the first wireless device via a first Uu link. The base station may not be able to communicate with the second wireless device via a second Uu link.

In an example, a side-link physical discovery signal (PSDCH) may be used for a sidelink operation to provide a discovery functionality among wireless devices. A side-link physical control channel (PSSCH) may be used to transmit one or more control information related to a sidelink data transmission. A side-link physical shared channel (PSSCH) may be used to transmit a sidelink data.

In an example, a wireless device operating a sidelink operation may receive one or more resources pools via RRC configurations and/or pre-configuration. A first wireless device may select a resource unit (e.g., a resource used for a single transmission) from a resource pool. A resource pool may comprise a set of resource units. A second wireless device may receive the one or more resource pools via RRC configurations and/or pre-configuration such that the first wireless device and the second wireless device may communicate each other based on the one or more resource pools. In an example, a base station may transmit one or more RRC messages comprising parameters of one or more resource pools of sidelink operation when a wireless device is in coverage of the base station. In an example, a wireless device may be pre-configured with one or more resource pools for a sidelink operation. In an example, a first wireless device may transmit one or more messages comprising parameters of one or more resource pools for a second wireless device, in particular, when the second wireless device is in outside of a base station coverage.

Figure 19:
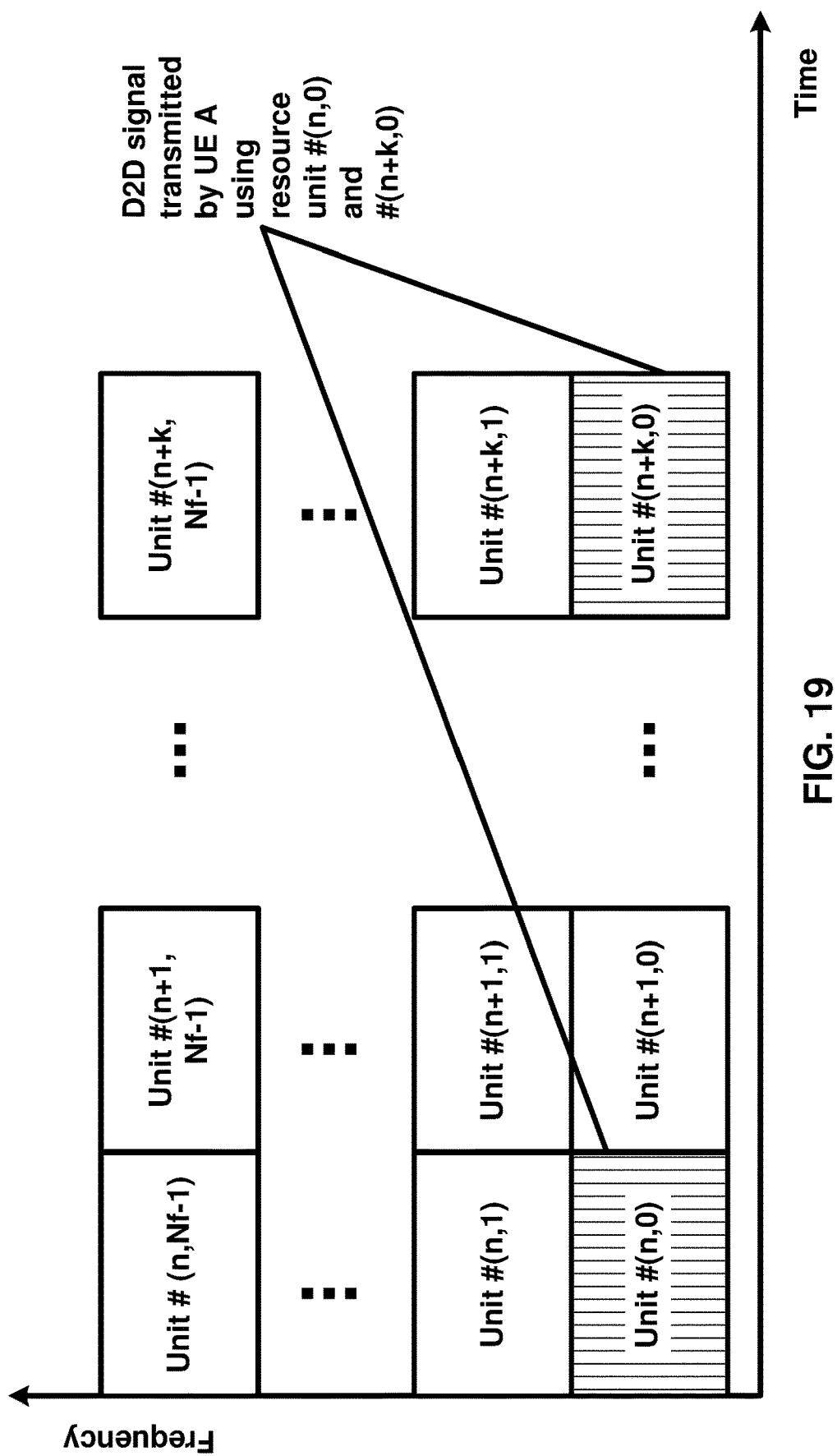
FIG. 19 illustrates a resource configuration of a sidelink as per an aspect of an example embodiment of the present disclosure.

A resource pool may comprise a plurality of resource units. One resource unit may be comprised of a group of resource blocks and a duration in time (e.g., a slot/a sub-frame/K OFDM symbols). A wireless device may select one or more resource units from a plurality of the resource units and may be able to use the selected resource unit(s) for D2D signal transmission. FIG. 19 shows an example of configuring one or more resource units. In an example, frequency resources are divided into the Nf number of resource units per a unit time resource (e.g. slot or a group of slots). A resource pool may be repeated with a period of k unit time resources and a resource pool may be configured within a bandwidth part for D2D or sidelink communication (e.g., a SL BWP). A wireless device may select a resource unit from an occasion of a resource pool and select another resource unit from another occasion of the resource pool such that a collision may be reduced and reliability of data transmission may be increased.

One or more resource pools may be present, where different resource pool may be used for a different sidelink physical channel (e.g., a first resource pool for a control channel, a second resource pool for a data channel, etc.). One or more second resource pools may be present where a resource pool may be associated with a QoS requirement or a service or a priority class. For example, the priority level for each resource pool may be configured by a base station, or the service to be supported for each resource pool may be configured differently. Alternatively, a specific resource pool may be configured to use only a specific unicast or groupcast UEs. For example, in case of the same D2D data channel or the same discovery message, the D2D data channel or the discovery signal may be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by a base station or an individual transmission UE selects an individual signal transmission resource from a pool), a signal format (e.g., number of symbols occupied by a D2D signal in a subframe, number of subframes used for transmitting a D2D signal), signal strength from a base station, strength of transmit power of a D2D UE, and the like.

A D2D communication may comprise one or more communication modes, namely mode 1, mode 2, mode 3 and mode 4. In a mode 1 communication type, a base station may transmit DCI to schedule a SL resource used for PSSCH(s). In a mode 2 communication type, a wireless device may select a resource unit from a resource pool. In the mode 2 communication type, a wireless device may transmit a PSCCH comprising sidelink control information (SCI) scheduling a PSSCH.

A wireless device may allocate/determine one or more transmission powers for one or more sidelink signals/channel and one or more uplink signals/channels based on a priority rule when the one or more sidelink signals/channels and the one or more uplink signals/channels overlap partially or fully in time domain. The wireless device may implement priority rules to scale down (adjust) or drop one or more signals/channels when a calculated transmission power exceeds the wireless device's maximum allowed transmission power. For example, the wireless device may implement priority rule to drop the one or more sidelink signals/channels or the one or more uplink signals/channels when the wireless device may not support simultaneous transmission between sidelink transmission and uplink transmission. For example, the priority rule may determine a higher priority for a first sidelink signal/channel of the one or more sidelink signals/channels a lower priority for a second uplink signal/channel of the one or more uplink signals/channels. The wireless device may adjust a transmission power or drop the second uplink signal/channel.

In existing technologies, power priority rules are implemented between a sidelink channel/signal and a priority threshold. For example, the wireless device may determine whether the sidelink channel/signal has a higher priority over uplink channel(s)/signal(s) or not based on a priority class of the sidelink channel/signal and the priority threshold. For example, when the priority class of the sidelink channel/signal has higher priority than the priority threshold, the wireless device may determine that the sidelink channel/signal has the higher priority over the uplink channel(s)/signal(s). For example, the uplink channel(s)/signals may overlap with the sidelink channel/signal in the time domain. Existing technologies may not consider one or more priorities of uplink channel(s)/signal(s). Based on the existing technologies, the wireless device may drop or adjust transmission power on ultra-reliable and low latency communication (URLLC) uplink channel(s)/signal(s) by prioritizing the sidelink channel/signal. Based on the existing technologies, the wireless device may drop or adjust transmission power on high priority sidelink channel/signal by deprioritizing the sidelink channel/signal. For example, the high priority sidelink channel/signal may support see through, car platooning applications, where a low latency and a high reliability are required. Existing technologies may degrade quality of service (QoS) experience of the wireless device.

In an example, embodiments enhance a priority rule between one or more sidelink channels/signals and one or more uplink channels/signals to improve QoS experience for various use cases of a wireless device. Enhanced priority rules take into account that a sidelink channel/signal may overlap with a first uplink channel/signal associated with a high priority/a first service. Enhanced priority rules take into account that a sidelink channel/signal may overlap with a second uplink channel/signal associated with a low priority/a second service. For example, the wireless device may determine whether a sidelink channel/signal may have a higher priority or a lower priority than an uplink channel/signal based on a priority/service associated with the uplink channel/signal. For example, when the uplink channel/signal may be associated with the low priority/the second service, the wireless device may determine that the sidelink channel/signal may have the higher priority over the uplink channel/signal based on a first priority threshold. For example, when the uplink channel/signal may be associated with the high priority/the first service, the wireless device may determine that the sidelink channel/signal may have the higher priority over the uplink channel/signal based on a second priority threshold. For example, the second priority threshold may indicate a higher priority than the first priority threshold. The wireless device may determine to prioritize the sidelink channel/signal based on a consideration of the priority/service of overlapped uplink channel/signal.

Embodiments may enhance a flexibility supporting various QoSs/use cases of sidelink and uplink operations based on configuration of a first priority threshold and a second priority threshold. For example, a sidelink channel/signal with a first priority class may be prioritized over an eMBB uplink channel/signal. The sidelink channel/signal with the first priority class may be deprioritized over an URLCC uplink channel/signal. For example, the first priority class may be associated with a V2X use cases requiring less stringent QoS than that of the URLLC. For example, a second sidelink channel/signal with a second priority class may be prioritized over an eMBB uplink channel/signal and/or an URLCC uplink/signal. For example, the second priority class may be associated with a V2X use cases requiring more stringent QoS than that of the URLLC/eMBB. Embodiments may allow flexible management/ordering of overlapping sidelink and uplink transmission. Embodiments may enhance QoS experiences of the wireless device supporting various use cases of sidelink and uplink operations.

In existing technologies, a sidelink resource may be associated with a first radio access technology (RAT, e.g., a EUTRA) or a second RAT (e.g., NR). A wireless device may be connected to a base station of the first RAT or the second RAT. In existing technologies, power priority/sharing rules are implemented between one or more sidelink channels/signals of a RAT and one or more uplink channels/signals of the RAT. For example, the power priority/sharing rule may determine transmission powers of the one or more sidelink channels/signals and the one or more uplink channels/signals when both sidelink and uplink operation based on the first RAT or both sidelink and uplink operation based on the second RAT. For example, the wireless device may operate a sidelink based on a first RAT and an uplink based on a second RAT. Existing technologies may increase complexity of the wireless device to support power sharing between the first RAT and the second RAT. For example, when the wireless device may have a faster processing for the first RAT compared to the second RAT, the wireless device may not be able to reduce or scale transmission power for one or more uplink channels/signals of the second RAT. The wireless device may reduce or scale transmission power for one or more sidelink channels/signals regardless of priority of the one or more sidelink channels/signals. Existing technologies may degrade QoS experience of the wireless device in an inter-RAT scenario for sidelink/uplink operation. Enhancements of the power priority/sharing rule in consideration of a sidelink operation based on a first RAT and an uplink operation based on a second RAT are needed.

In an example, a base station may limit an allowed total power for the uplink operation. A wireless device may determine a minimum allowed power for the sidelink operation based on an allowed power of the wireless device and the allowed total power for the uplink operation. For example, the wireless device may be configured with a single cell group. The base station may configure the allowed total power for the single cell group. The wireless device may determine transmission powers for one or more uplink channels/signals of the single cell group such that a total transmission power of the transmission powers may not exceed the allowed total power. The wireless device may allocate at least remaining power (e.g., the allowed power of the wireless device—the allowed total power for the single cell group) to the sidelink operation based on the second RAT. Embodiments may allow the minimum allowed power for the sidelink operation regardless of processing capability. Embodiments may allow efficient power sharing between the first RAT and the second RAT for the uplink/sidelink operation without requiring increases of the complexity. Embodiments may enhance QoS experience of the sidelink/uplink operation.

In existing technologies, a wireless device may determine a transmission power of a sidelink channel based on one or more power control parameters for the sidelink, a priority of the sidelink channel, and a UE allowed power. For example, the priority of the sidelink channel is higher than a threshold, the wireless device may allocate a lower power between a configured power based on the power control parameters and the UE allowed power. For example, the UE allowed power may be determined as a maximum power based on a UE power class. In existing technologies, a sidelink resource may be associated with a first radio access technology (RAT, e.g., a EUTRA) or a second RAT (e.g., NR). In an example, a wireless device may be connected to a base station based on the first RAT. When the wireless device is connected to a base station of the first RAT (e.g., LTE) while the wireless device may operate a sidelink operation based on a second RAT (e.g., NR), the wireless device may determine a transmission power of a sidelink channel based on the UE allowed power. Potential high transmission power of the sidelink channel may impact a performance of communication between the wireless device and the base station. The base station may not be aware of presence of sidelink operation or power control parameters related to a sidelink operation. This may degrade the performance of communication between the wireless device and the base station.

Figure 20:
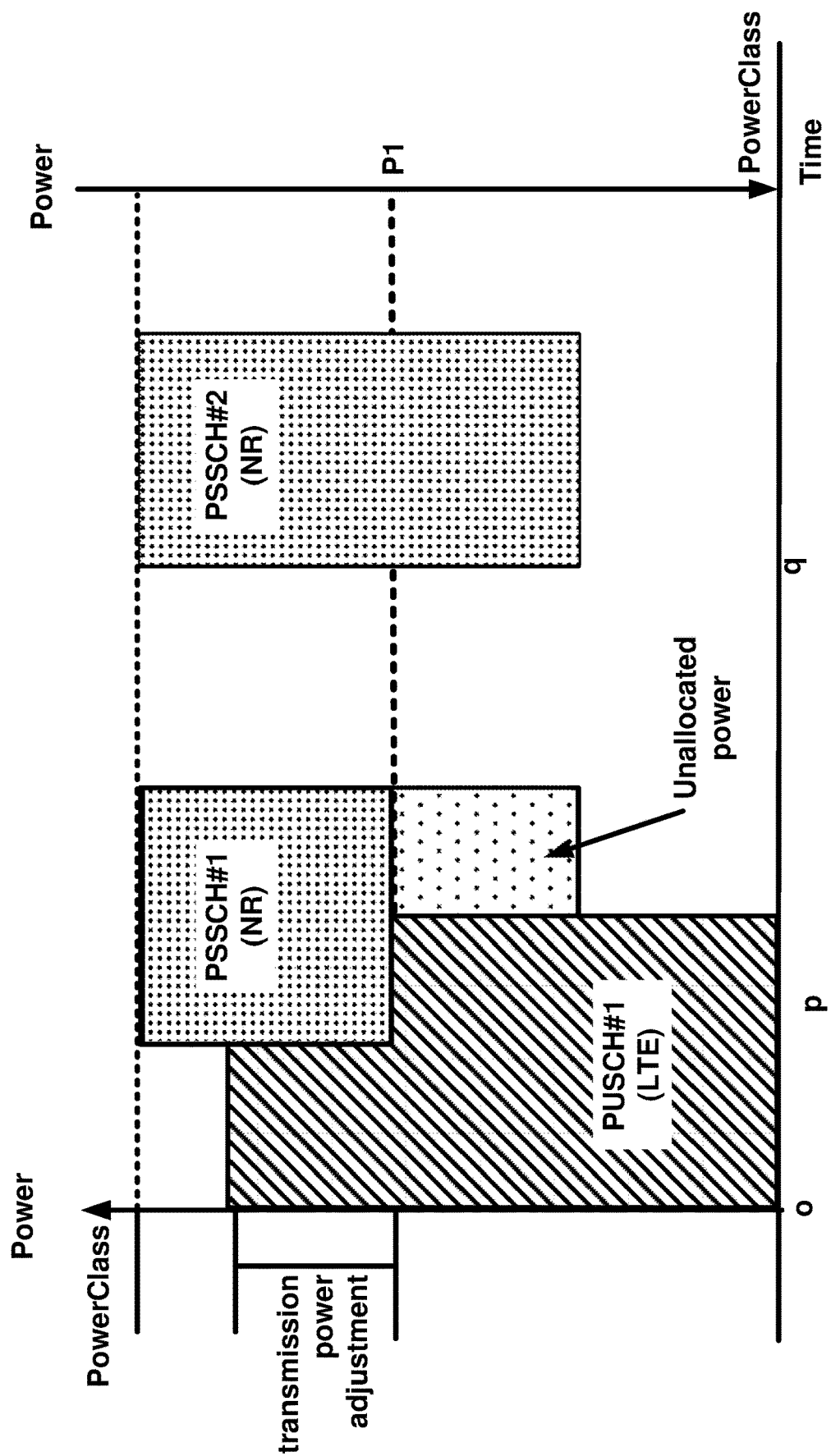
FIG. 20 an example of a sidelink power control as per an aspect of an example embodiment of the present disclosure.

In an example, a base station may transmit one or more RRC messages comprising a transmission power adjustment. The transmission power adjustment may be broadcasted via a SIB (system information block) or may be transmitted via UE-specific RRC signaling. The transmission power adjustment may be signaled per cell or may be signaled for a UE. In response to receiving a transmission power adjustment of a serving cell or for a wireless device, the wireless device may determine a transmission power of a sidelink at a time i within a range that a power scaling of one or more uplink transmissions for the cell or for the base station may not exceed the transmission power adjustment. FIG. 20 illustrates an example. For example, a wireless device is connected to a first base station of LTE and is configured with a transmission power adjustment. In response to determining a transmission power at a time p for a sidelink channel, a wireless device applies the configured transmission power adjustment. The wireless device may be allowed to reduce a power on one or more uplink channels for the base station up to the configured power adjustment.

The wireless device may allocate the transmission power of the PSSCH #1 up to P1 which is the maximum power within the allowed transmission power adaptation of the LTE based on the configured transmission power adjustment. The wireless device may allocate a configured transmission power on PSSCH #2 at a time q as there is no transmission in Uu interface. With a transmission power adjustment parameter, a base station may limit power scaling on a first RAT when a wireless device may operate a sidelink operation based on a second RAT.

Example embodiments allow a base station to control a power adjustment level on a Uu interface from one or more sidelink operation that may not be known to the base station. Efficient power sharing may allow reduced performance degradation of a communication between the base station and a wireless device. When a wireless device may not provide a capability of dynamic power sharing across different RATs, example embodiments allow base station(s) to control efficient power sharing across multiple RATs of communications via Uu and SL interfaces.

In an example, a radio access technology of a sidelink operation may be determined based on a resource pool where a sidelink channel is transmitted. For example, a wireless device may operate a sidelink operation based on a LTE RAT when one or more resource pools provided by the LTE RAT are used for the sidelink operation. For example, a wireless device may operate a sidelink operation based on a NR RAT when one or more resource pools provide by the NR are used for the sidelink operation. In an example, a RAT of a sidelink operation may be determined based on a frequency and/or frequency band where the sidelink operation is performed. For example, a band (e.g., LTE band 47 5855-5925 MHz, one or more LTE bands) of the sidelink operation is considered as a LTE RAT. A band (e.g., one or more NR bands) of the sidelink operation is considered as a NR RAT. In an example, a RAT of a sidelink operation may be determined based on a base station that may transmit a control information to allocate resources and/or communicate to assist the sidelink operation with a wireless device. For example, a first wireless device and a second wireless device may operate without involving one or more base stations as shown in FIG. 18, the first wireless device and the second wireless device may determine a RAT of the sidelink operation based on the resource pool.

For example, a first wireless device that is connected to a first base station based on a NR may communicate with a second wireless device that is connected a second base station based on a LTE. In the example, the RAT of the connected base station may determine the RAT of a sidelink operation. In that case, one or more resources pools based on LTE may be considered as a sidelink operation with a NR for the first wireless device. In the example, the wireless device may consider the RAT of a sidelink based on a RAT of one or more resource pools used regardless of an associated base station.

In an example, a RAT of a sidelink operation may be determined based on a RAT used for a sidelink channel transmission. If LTE is used for a sidelink channel transmission, the sidelink operation is considered to be associated with LTE. If NR is used for used for a sidelink channel transmission, the sidelink operation is considered to be associated with NR.

In an example, a RAT of a sidelink operation or a sidelink channel may be determined based on a first RAT used in a corresponding sidelink control information (SCI) transmission (e.g., via PSCCH). The SCI may schedule one or more PSSCHs, and the first RAT used in the SCI transmission may be used to determine the RAT of the one or more PSSCHs. For example, when a base station may assist and/or transmit one or more SCIs via PDCCH to manage sidelink resource(s), the first RAT used in the one or more SCIs/PDCCH(s) may be used to determine the RAT of the sidelink PSSCH(s). For example, when a base station may not manage sidelink resource(s), a first RAT used in a SCI transmission by the wireless device may be used to determine the RAT of PSSCHs/PSCCHs of a sidelink operation associated with one or more resource pools of the sidelink operation.

In determining a power of a sidelink channel, when a base station may transmit one or more sidelink control information to manage one or more sidelink resources, the base station may be able to adjust transmission powers of a wireless device regardless whether the wireless device uses a same RAT in a SL channel to that of Uu channel. In that scenario, the wireless device may share the power between SL and Uu even though the RATs of the SL and Uu channels are different. When the base station may not manage the one or more sidelink resources, the base station may not adaptively control transmission powers of the wireless device. In that scenario, the wireless device may split the power between SL and Uu based on a RAT used in a SL channel and Uu channel. The wireless device may determine a RAT for a sidelink channel for a power determination procedure based on a RAT used in a control channel (e.g., PSCCH for the first case/SL channel, PDCCH for the second case/Uu channel) which allows efficient power sharing between Uu and SL operations in a multi-RAT/inter-RAT scenario.

Figure 21B:
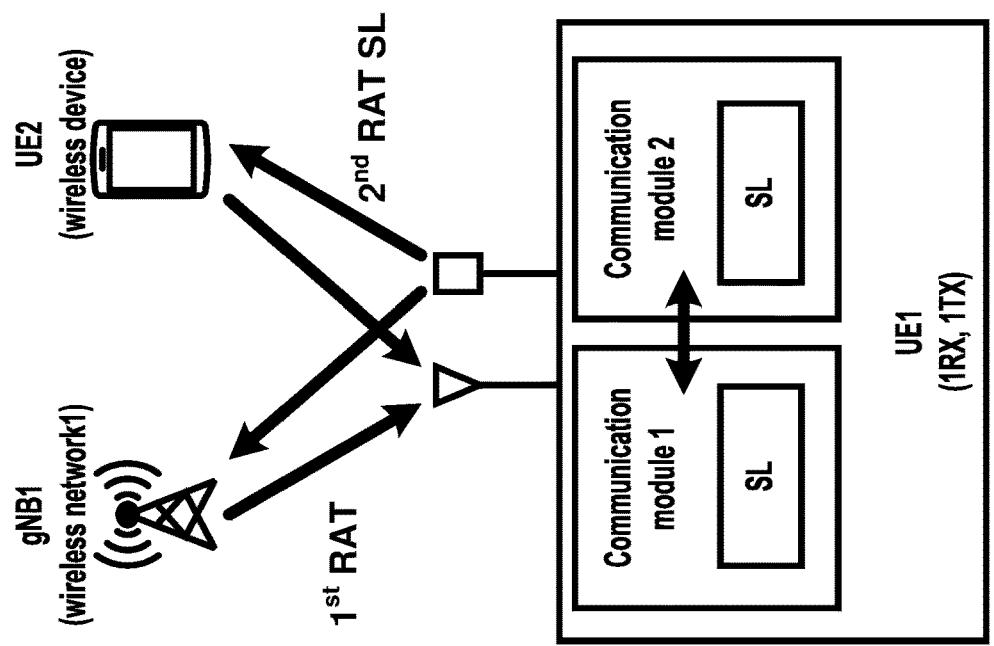
FIG. 21B illustrates a UE implementation option as per an aspect of an example embodiment of the present disclosure.
Figure 21A:
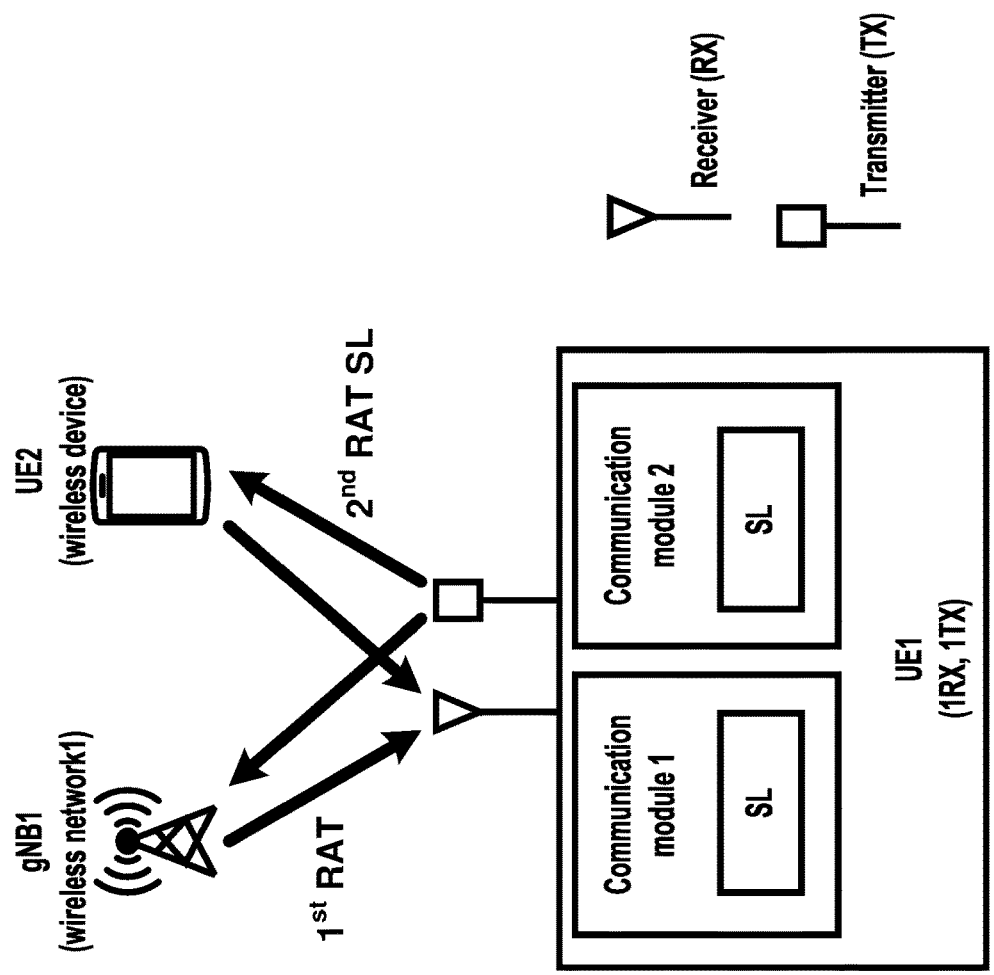
FIG. 21A illustrates a UE implementation option as per an aspect of an example embodiment of the present disclosure.

In an example, a wireless device may have one or more implementation to support one or more sidelink operation and communication to one or more base stations. In an example, a wireless device may not support a dynamic power sharing between a first RAT communication module and a second RAT communication module. FIG. 21 illustrates an example of different UE implementation assuming a single TX and a single RX radio modules. For example, FIG. 21A illustrates an example implementation where a communication module 1 (e.g., a module supporting a first RAT, e.g., LTE) and a communication module 2 (e.g., a module supporting a second RAT, e.g., NR) may not interact in real time. The example implementation may not support a dynamic power sharing between two RATs among one or more uplink transmissions via either Uu interface and/or PC5/SL interface. The example implementation may require a semi-static power split between two RATs. FIG. 21B illustrates an example implementation where a wireless device may support a dynamic power sharing across multiple RATs. In the example, a communication module 1 and communication module 2 may support a real-time coordination. The example implementation shown in FIG. 21B may allow a dynamic power sharing across two RATs via Uu and/or SL/PC5 interfaces.

Figure 22B:
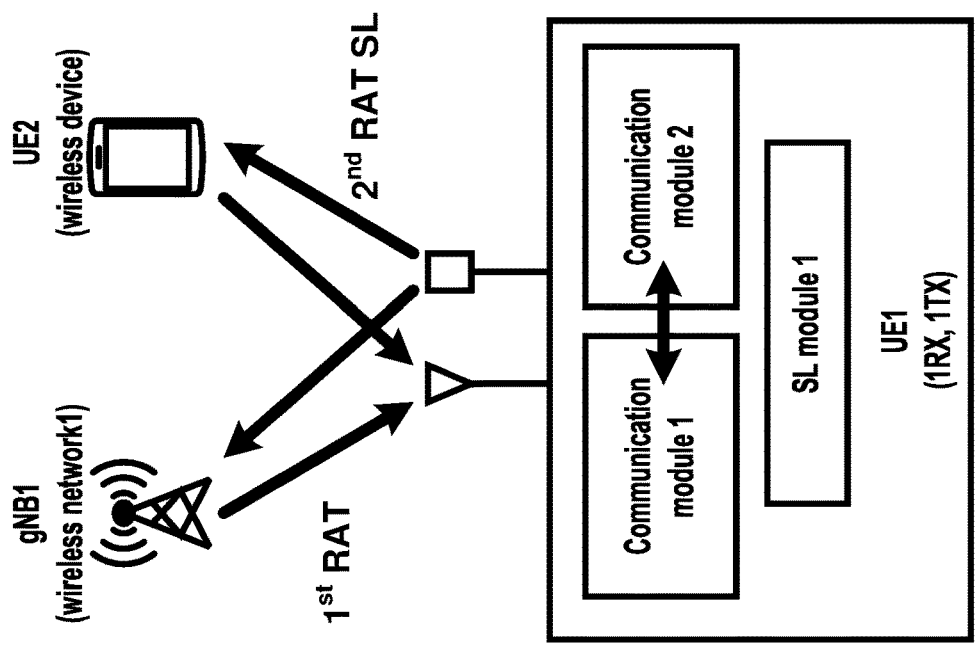
FIG. 22B illustrates a UE implementation option as per an aspect of an example embodiment of the present disclosure.
Figure 22A:
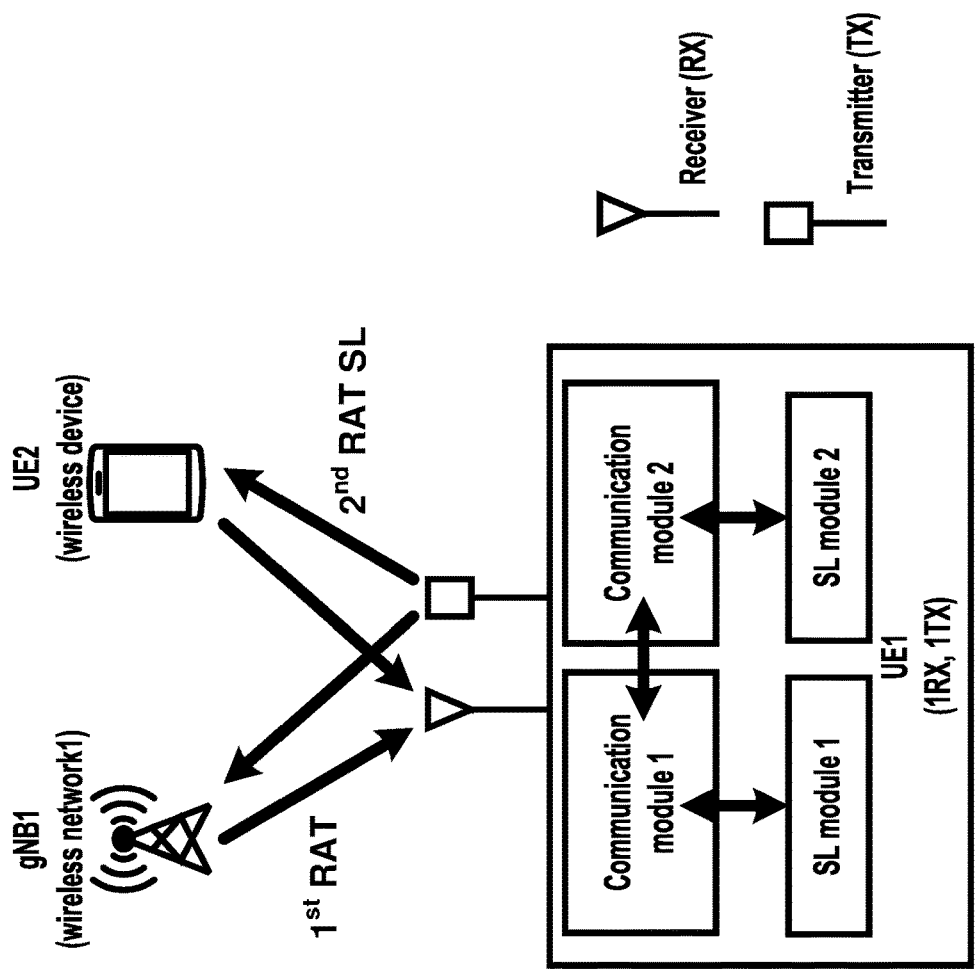
FIG. 22A illustrates a UE implementation option as per an aspect of an example embodiment of the present disclosure.

In an example, a communication module supporting a sidelink operation may be independent from a communication module supporting a communication between a base station and a wireless device. FIG. 22 illustrates an example. FIG. 22A illustrates an example where a first communication module supporting SL (e.g., SL module 1), which may support a first RAT (e.g., LTE), and a second communication module supporting SL (e.g., SL module 2), which may support a second RAT (e.g., NR), may not be able to coordinate in real-time. In the example, communication modules supporting Uu interface, based on a single RAT and/or based on a plurality of RATs, may coordinate in real-time. A wireless device based on FIG. 22A may not support a dynamic power sharing between a sidelink operation. In the example, a wireless device may not support a dynamic power sharing across a first SL based on a first RAT and a second SL/Uu based on a second RAT (and vice versa). When a wireless device may support both SL operations, a time-domain split or a semi-static power split may be needed. FIG. 22 illustrates an example implementation where a wireless device may have a SL communication module (e.g., SL module 1) which may support a first RAT as well as a second RAT. A wireless device based on FIG. 22B example may not support a dynamic power sharing between PC5/SL and Uu interfaces with a lack of real-time coordination between Uu communication modules and SL communication module(s).

A power sharing mechanism across multiple RATs and/or across Uu and SL/PC5 interfaces may be determined in consideration of various UE implementation choices. For example, when a wireless device does not support a dynamic power sharing across different RATs (e.g., FIG. 21A), the wireless device may determine a power based on a first power threshold for a first RAT and a second power threshold for a second RAT. With the implementation choice, a first base station using a first RAT may dynamically transmit a control signaling to schedule one or more sidelink resources for control/data transmissions where the one or more sidelink first resources are based on the first RAT. A second base station using a second RAT may dynamically transmit a control signaling to schedule one or more sidelink resources for control/data transmissions where the one or more second sidelink resources are based on the second RAT.

In an example, a wireless device may determine a power of a sidelink differently in a different scenario without a dynamic power sharing capability across multiple RATs. For example, a first wireless device and a second wireless device are connected to a first base station based on a first RAT (e.g., FIG. 16A). The first wireless device and the second wireless device may operate a SL operation based on the first RAT. In the example, the first wireless device may not need to split a power across different RATs. The wireless device may apply a UE allowed power in determining transmission powers of one or more sidelink channels. In an example, a first wireless device and a second wireless device are connected to a first base station based on a first RAT (e.g., FIG. 16A). The first wireless device and the second wireless device may operate a SL operation based on a second RAT. In the example, the first wireless device may need to split a power across different RATs. The first base station may configure a first power threshold applied for the first RAT and a second power threshold applied for the second RAT. The first base station may not be aware a presence of a sidelink operation based on the second RAT. The first wireless device may transmit messages to inform the first base station about intention/the presence of the sidelink operation. The wireless device may transmit a desired power level used in the sidelink operation based on the second RAT. In response to receiving the presence of the sidelink operation, the first base station may configure a priority class used for a sidelink operation, or one or more priority classes for one or more resource pools or a priority class threshold used in a power determination. In response to receiving the information, the first base station may transmit one or more RRC messages comprising a second power threshold used in the SL operation. The second power threshold may be used to limit potential performance degradation on Uu interface due to a SL communication by the wireless device. In an example, the first wireless device may perform the sidelink operation based on the second RAT when one or more conditions are met. The first wireless device may perform a sidelink transmission with reducing impacts on Uu transmissions. For example, the one or more conditions may comprise: in a time duration where a sidelink channel transmission based on the second RAT, the first wireless device is not scheduled with any uplink as the time duration has been indicated as a downlink or a flexible; or a sum of a power threshold for the first RAT and a configured power of the sidelink channel is smaller than the UE allowed power; wherein the power threshold for the first RAT may be determined based on a power threshold per each cell and/or one or more power threshold configurations.

In an example, when a wireless device may not support a dynamic power sharing across multiple RATs, the wireless device may split powers semi-statically across the RATs. When a first wireless device is connected to a first base station based on a first RAT and the first wireless device may operate a SL with a second wireless device based on the first RAT or a second RAT (e.g., FIG. 16B), example embodiments for the scenario of FIG. 16A may be applied. Example embodiments are applied to a scenario of FIG. 17A and FIG. 17B, where a first wireless device (e.g., wireless device 1 in FIG. 17A) and a second wireless device (e.g., wireless device 2 in FIG. 17B) may apply the example embodiments.

Figure 23:
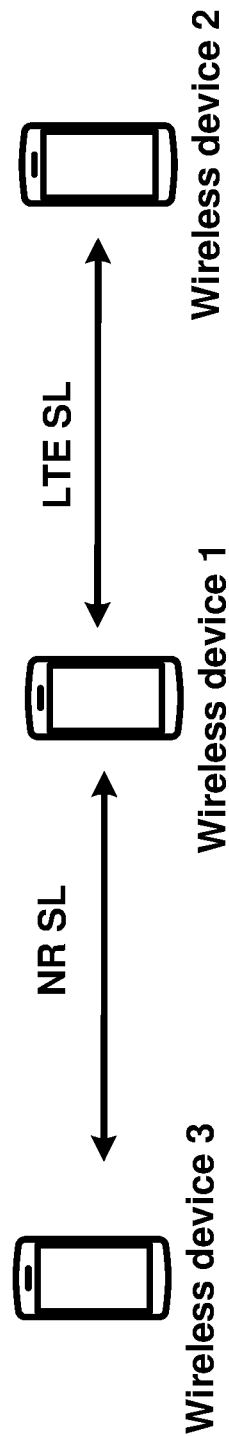
FIG. 23 illustrates a scenario of a sidelink communication as per an aspect of an example embodiment of the present disclosure.

In an example, a first wireless device may operate a first sidelink operation based on a first RAT with a second wireless device. The first wireless device may operate a second sidelink operation based on a second RAT with a third wireless device. FIG. 23 illustrates an example. The first wireless device may or may not be connected to a base station (e.g., gNB). When the first wireless device may not support a dynamic power sharing across multiple RATs, the first wireless device may determine whether a sum of one or more configured powers on one or more sidelink channels at a time exceeds a UE allowed power. The first wireless device may utilize a transmission power threshold configured/indicated for an each resource pool. In response to observing one or more potential time instances where the sum power may exceed the UE allowed power, the first wireless device may select a resource pool based on a priority class or a QoS level configured in the resource pool. The first wireless device may select a highest priority class resource pool, and then use the UE allowed power on a RAT associated with the highest priority class resource pool. A resource pool may be configured with a first power threshold and a second power threshold. The first wireless device may apply the first power threshold in response to detecting one or more time instances where the sum power may exceed the UE allowed power. The first wireless device may apply the second power threshold in other cases.

Figure 24:
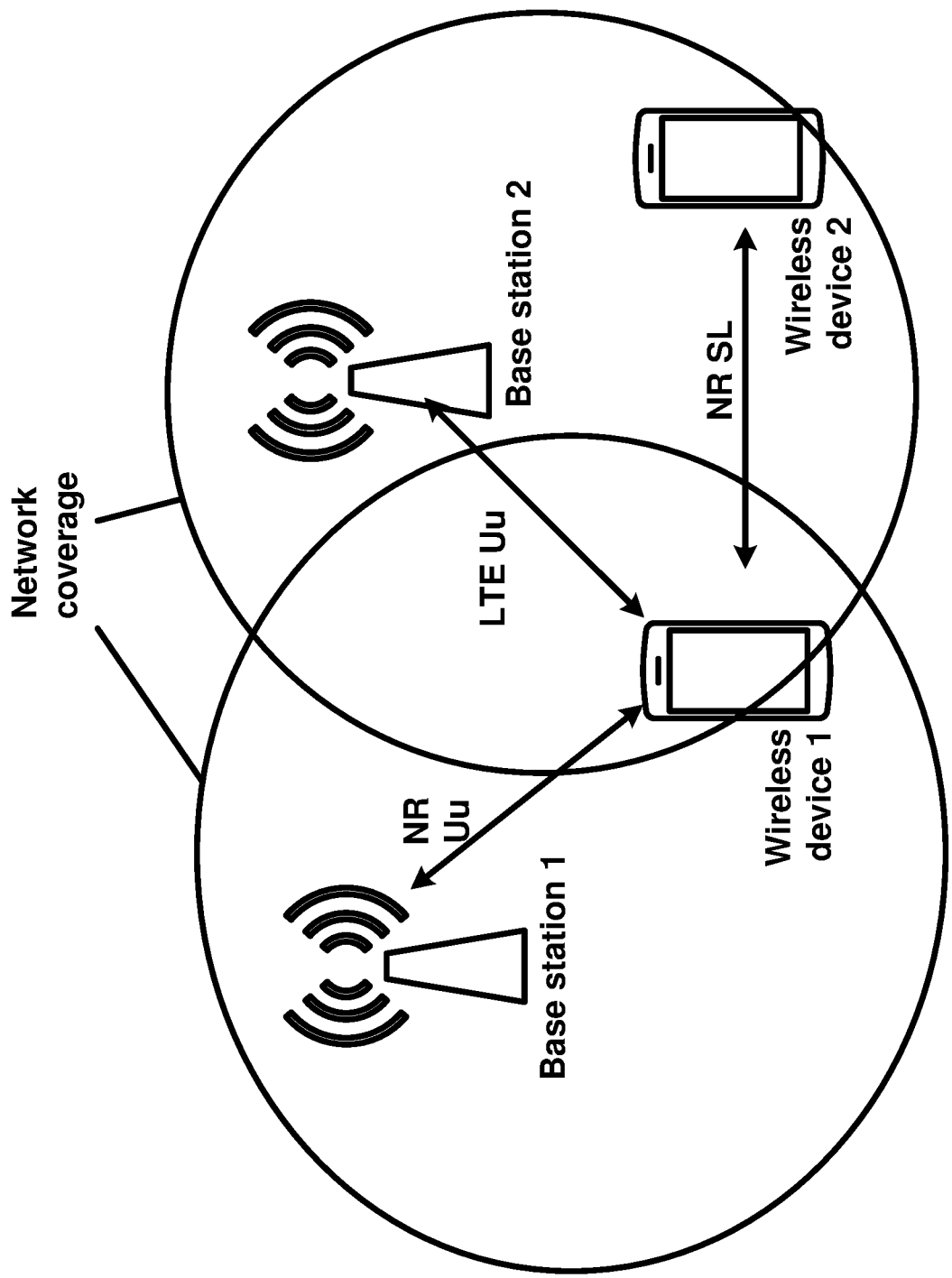
FIG. 24 illustrates a scenario of a dual connectivity with a sidelink operation as per an aspect of an example embodiment of the present disclosure.

In an example, a wireless device may be configured with a dual connectivity across multiple RATs. FIG. 24 illustrates an example. A first wireless device (e.g., wireless device 1) is connected to a first base station (e.g., base station 1) based on a first RAT (e.g., NR) as a first cell group and is connected to a second base station (e.g., base station 2) based on a second RAT (e.g., LTE) as a second cell group. The first wireless device may operate SL with a second wireless device (e.g., wireless device 2) using the first RAT based (e.g., NR based) sidelink operation. When a wireless device does not support a dynamic power sharing in a multi-RAT DC scenario, the wireless device may share a power in a time-domain manner (e.g., use up to a UE allowed power for the first RAT at a first time and use up to the UE allowed power for the second RAT at a second time) or split a first transmission power threshold and a second transmission power threshold where the sum of the first transmission power threshold and the second transmission power threshold does not exceed the UE maximum/allowed power. The first transmission power threshold is used as a threshold used in the first cell group where a sum of transmission powers on one or more uplink channels to the first base station at a time does not exceed the first transmission power threshold. The second transmission power threshold is used for the second cell group similarly. In response to receiving the first transmission power threshold and the second transmission power threshold, the first wireless device may apply the first transmission power threshold for one or more uplink channels based on the first RAT regardless of whether uplink channels are via Uu or SL/PC5 interface. The first wireless device may apply the second transmission power threshold as a threshold for one or more uplink channels based on the second RAT regardless of the interface.

In an example, a first base station and/or a second base station may transmit RRC messages comprising/indicating a first SL power threshold for a sidelink operation based on the first RAT. The first base station and/or the second base station may transmit RRC messages comprising/indicating a second SL power threshold for a sidelink operation based on the second RAT. When a wireless device receives the first SL power threshold, the wireless device may determine a transmission power of a sidelink channel based on a configured power of the sidelink channel, the first SL power threshold, a threshold associated with a resource pool that the sidelink channel uses, a UE allowed power, etc. For example, the transmission power of the sidelink channel may be a lowest value among {the configured power of the sidelink channel, the first SL power threshold, the threshold, the UE allowed power}. When the wireless device is configured with the first transmission power threshold for the first cell group, the wireless device may determine a transmission power of a sidelink channel based on a configured power of the sidelink channel, the first SL power threshold, a threshold associated with a resource pool that the sidelink channel uses, a UE allowed power, the first transmission power threshold, etc. For example, the transmission power of the sidelink channel may be a lowest value among {the configured power of the sidelink channel, the first SL power threshold, the threshold, the UE allowed power, the first transmission power threshold}. A similar mechanism may be applied for the second RAT case.

Figure 25:
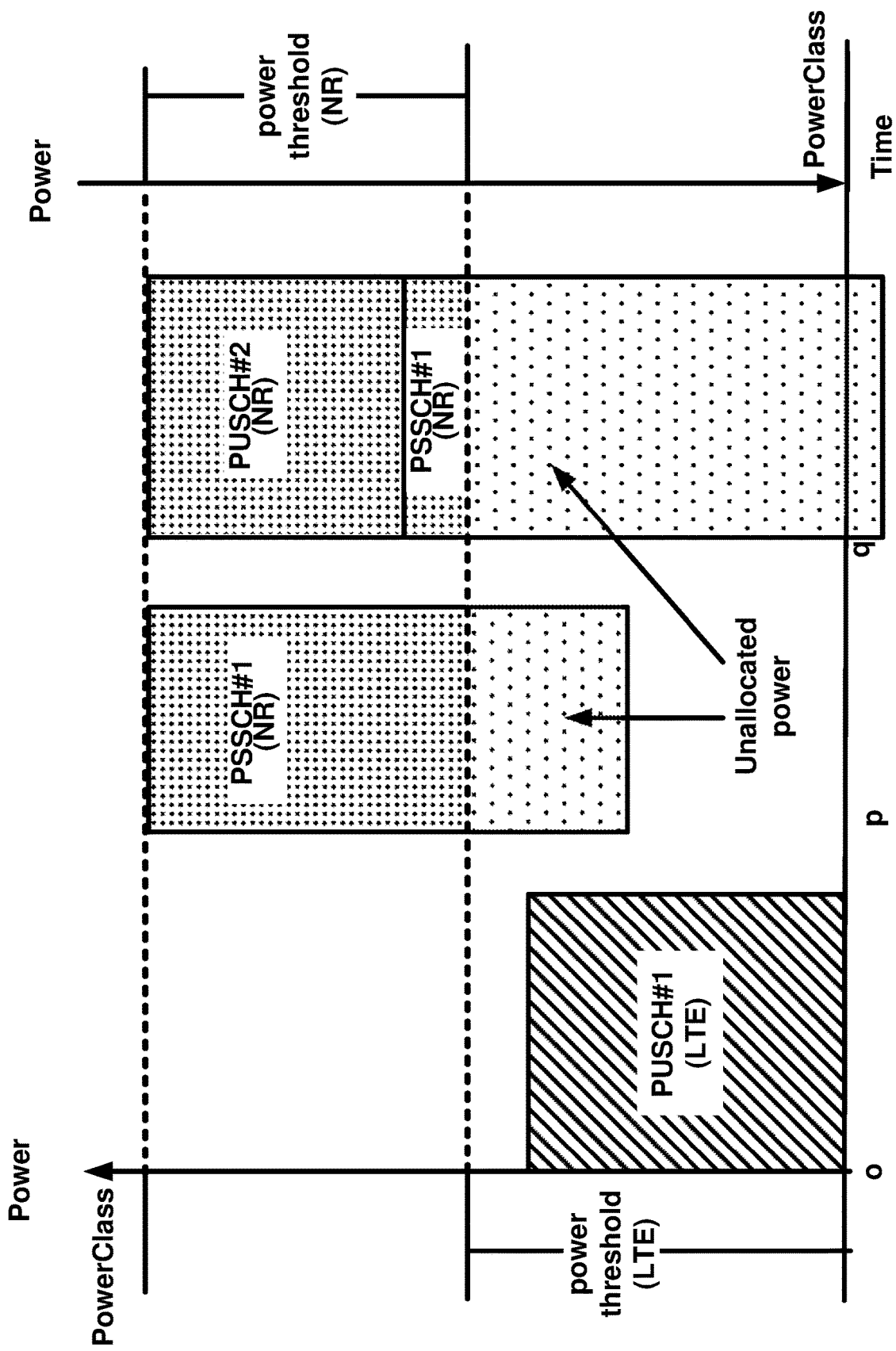
FIG. 25 is illustration of power sharing as per an aspect of an example embodiment of the present disclosure.

FIG. 25 illustrates a semi-static power split between a first cell group and a second cell group of an inter-RAT dual connectivity scenario. A first base station and/or a second base station may transmit one or more RRC messages comprising configuration parameters of a first transmission power threshold (e.g., a power threshold used for a first cell group, e.g., power threshold (LTE)) and a second transmission power threshold (e.g., a power threshold used for a second cell group, e.g., power threshold (NR)). In the example, the wireless device may be associated with the first cell group based on LTE and the second cell group based on NR. The wireless device may operate a sidelink operation based on NR. A sum of the first transmission power threshold and the second transmission power threshold may not exceed a UE allowed power (e.g., a maximum/allowed power determined based on PowerClass). In the example, the wireless device may not support a dynamic power sharing among LTE and NR. The wireless device allocates a configured power on PUSCH #1 for the first cell (e.g., LTE) at a time o. The wireless device allocates a power up to the second transmission power threshold (e.g., power threshold (NR)) at a time p to a sidelink channel (e.g., PSSCH #1). The wireless device allocates a configured power to a second PUSCH for the second cell group (e.g., PUSCH #2) at a time q. The wireless device allocates additional power up to the second transmission power threshold to a second sidelink channel (e.g., PSSCH #2) at the time q. A priority class of the sidelink channel may be lower than that of the second PUSCH.

When the wireless device may be associated with a dual connectivity, the wireless device may be configured with a first allowed total transmission power for a first cell group and a second allowed total transmission power for a second cell group. The wireless device may be associated with a first base station operating on a first RAT for the first cell group. The wireless device may be associated with a second base station operating on a second RAT for the second cell group. The wireless device may operate a sidelink operation based on the second RAT. The wireless device may determine transmission powers of one or more uplink transmissions for the second cell group and/or one or more sidelink transmission based on the second RAT based on the second allowed total transmission power of the second cell group. When the wireless device may operate the sidelink based on the first RAT, the wireless device may apply the first allowed transmission power of the first cell to determine one or more transmission powers for one or more sidelink channels/signals.

In an example, a base station may configure a power threshold for a sidelink operation or an allowed power for a sidelink operation. The base station may configure an allowed total transmission power for a first cell group. The first cell group may operate based on a first RAT. The sidelink operation may be performed based on the first RAT. The base station may configure the allowed power for the sidelink operation where the allowed power for the sidelink operation may be lower than the allowed total transmission power of the first cell group. A wireless device may support dynamic power sharing between an uplink operation and a sidelink operation based on the first RAT. The wireless device may allocate one or more transmission powers to one or more sidelink channels/signals. A sum of the one or more transmission powers may be lower than or equal to the allowed power for the sidelink operation. The wireless device may allocate one or more second transmission powers to one or more uplink channels/signals of the first cell group. A sum of the one or more transmission powers and the one or more second transmission powers may be lower than or equal to the allowed total transmission power of the first cell group. In an example, a wireless device may not support dynamic power sharing between an uplink operation and a sidelink operation based on the first RAT. The wireless device may determine one or more transmission powers of one or more uplink channels/signals based on the allowed total transmission power of the first cell group. The wireless device may determine one or more transmission powers of the one or more sidelink channels/signals based on the allowed power for the sidelink transmission. A sum of the allowed total transmission power of the first cell group and the allowed power for the sidelink transmission may be lower than or equal to an allowed power of the wireless device.

In an example, a wireless device may be connected to a first RAT (e.g., LTE) base station. The wireless device may operate a sidelink operation based on a second RAT (e.g., NR). The wireless device may not support a dynamic power sharing between the first RAT and the second RAT. In an example, the first RAT base station may transmit one or more RRC messages comprising parameters indicating a reference DL/UL configuration for one or more cells configured to the wireless device based on the first RAT. The wireless device may communicate with the base station using the one or more cells via Uu interface. The wireless device may consider that the first RAT base station may not schedule a uplink in one or more downlink subframes/slots/symbols based on the reference DL/UL configuration. The wireless device may allocate powers up to a UE allowed power (e.g., a UE maximum power based on UE power class) to one or more sidelink channels in the one or more downlink subframes/slots/symbols. In other subframes/slots/symbols, the wireless device may reserve powers up to a largest power that may be allocated to one or more Uu uplink transmissions to the first RAT/the first RAT base station based on one or more power control related parameters.

Figure 26:
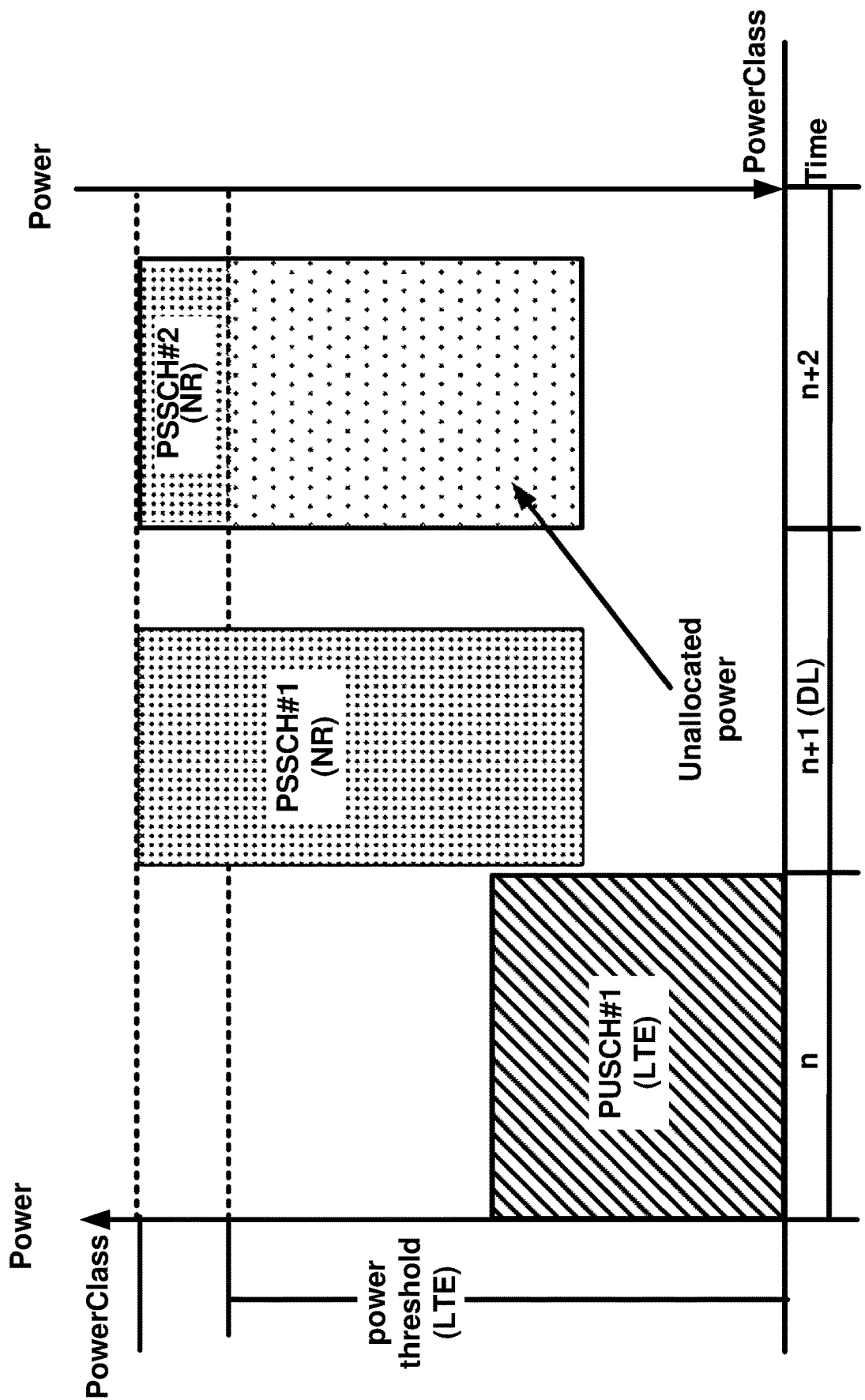
FIG. 26 is illustration of power sharing as per an aspect of an example embodiment of the present disclosure.

FIG. 26 illustrates an example. A wireless device may be connected to a first base station (e.g., eNB of LTE) with a single serving cell. The first base station may configure a power threshold of the single serving cell (e.g., power threshold (LTE)). The wireless device may allocate transmission powers up to the power threshold for the first base station in any uplink slots/subframes/symbols. The wireless device may allocate a configured power to a first PUSCH to the first base station at a slot/subframe n. The wireless device may allocate a configured power (that may be larger than a remaining power (the allowed power—the power threshold (LTE)) of a first sidelink PUSCH (PSSCH #1) in a slot/subframe n+1 as the slot/subframe n+1 is indicated as a downlink for the LTE. The wireless device may allocate a power up to {the UE allowed power—the power threshold} at a slot/subframe n+2 regardless of actual transmission of LTE. The wireless device may limit transmission power for the sidelink operation such that a sum of allocated power for one or more sidelink channels/signals and the power threshold may not exceed the UE allowed power at least when the wireless device may not support a dynamic power sharing between a first RAT and a second RAT. For example, the single serving cell may operate based on the first RAT. For example, the sidelink may operate based on the second RAT.

In response to configuration of the power threshold is a same as a UE allowed power, a wireless device may not transmit any sidelink channel in uplink slots/subframes/symbols based on the reference DL/UL configuration. The wireless device may drop one or more sidelink transmission in the uplink slots/subframes/symbols when the wireless device may not support dynamic power sharing between the first RAT and the second RAT or the wireless device may have faster processing time on the second RAT compared to that of the first RAT. When a wireless device may not receive any configuration on a reference DL/UL configuration, the wireless device may apply a DL/UL configuration indicated by a SIB and/or a UE-specific signaling. The wireless device may assume all subframes/slots are uplink or flexible when no DL/UL configuration information is available. When the wireless device may operate a first sidelink based on the first RAT, the wireless device may share a power allowed for the first RAT between uplink channels via Uu and SL/PC5 interface.

Figure 27:
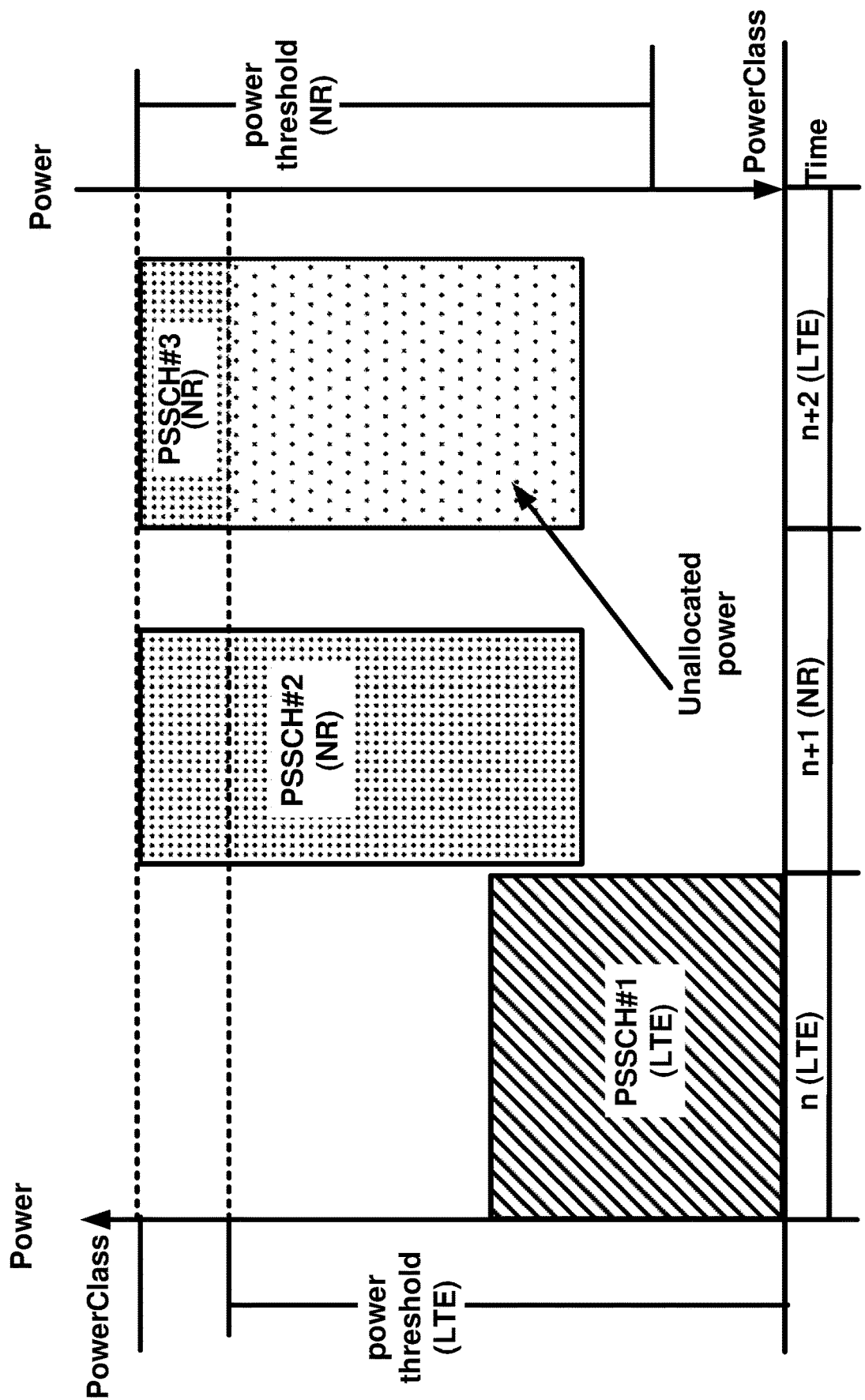
FIG. 27 is illustration of power sharing as per an aspect of an example embodiment of the present disclosure.

In an example, a wireless device may receive one or more RRC configurations or pre-configuration comprising a first set of time durations and a second set of time durations. The wireless device may prioritize a first RAT during the first set of time durations. The wireless device may prioritize a second RAT during the second set of time durations. FIG. 27 illustrates an example. For example, a wireless device may receive a first set of time durations including slot n and slot n+2. The wireless device may receive a second set of time durations including slot n+1. The wireless device may prioritize the first RAT (e.g., LTE) in the slot n and slot n+2. In the slot n+2, the wireless device may not allocate a power beyond a potential remaining power from the first RAT to avoid any collision with potential uplink transmissions for the first RAT. In the slot n+1, the wireless device allocates a power a second PSSCH (PSSCH #2) up to a threshold (power threshold (NR)) for a second RAT.

A wireless device may be scheduled with one or more sidelink transmission and one or more uplink transmissions, wherein the one or more sidelink transmissions and the one or more uplink transmissions may overlap in a time domain. The wireless device may not support simultaneous transmission between the one or more sidelink transmission and the one or more uplink transmissions. The wireless device may have a power limited wherein the wireless device may not have sufficient power to allocate up to configured transmission powers of the one or more sidelink transmissions and the one or more uplink transmissions. The wireless device may determine whether to prioritize the one or more sidelink transmissions or the one or more uplink transmissions based on a priority threshold configured for a sidelink operation. The wireless device may transmit the prioritized transmission(s) and drop unprioritized transmission(s) when the wireless device may not support the simultaneous transmission. The wireless device may allocate power first to the prioritized transmission(s) and then unprioritized transmission(s) when the wireless device may support the simultaneous transmission and may be power limited. For example, the wireless device may determine a priority of the one or more sidelink transmissions based on one or more priority values associated with the one or more sidelink transmissions. For example, a priority of a sidelink transmission may be determined based on a resource pool for the sidelink transmission. For example, the priority of the sidelink transmission maybe determined based on a logical channel (LCH) of a data carried over the sidelink transmission. For example, the priority of the sidelink transmission may be determined based on a sidelink control information (SCI) or based on a downlink control information (SCI) scheduling resource(s) for the sidelink transmission.

Based on the one or more priority values associated with the one or more sidelink transmission, the wireless device may determine a priority of the one or more sidelink transmission. For example, the wireless device may determine a highest priority value among the one or more priority values as the priority. For example, the wireless device may determine a lowest priority value among the one or more priority values as the priority. For example, the wireless device may determine an average priority value among the one or more priority values as the priority. The wireless device may compare/determine the priority of the one or more sidelink transmissions with the priority threshold. In response to the priority being higher than the priority threshold (e.g., a higher priority), the wireless device may prioritize the one or more sidelink transmissions. In response to the priority being equal to or lower than the priority threshold (e.g., a lower priority or equal priority to the priority threshold), the wireless device may prioritize the one or more uplink transmissions.

In recent technologies, uplink transmissions may have diverse quality of service (QoS) requirements. For example, a first uplink transmission may be associated with a ultra-reliable and low latency communication (URLLC). A second uplink transmission may be associated with an enhanced mobile broadband (eMBB). When a high priority value is configured for the priority threshold, the wireless device may prioritize an uplink transmission over a sidelink transmission in most cases. For example, the wireless device may prioritize an eMBB uplink transmission over a sidelink transmission (e.g., for see through, platooning use cases) with a first priority value (e.g., the first priority value is lower than the priority threshold). When a low priority value is configured for the priority threshold, the wireless device may prioritize a sidelink transmission over an uplink transmission in most cases. For example, the wireless device may prioritize a regular sidelink transmission (e.g., for situation aware messages) over an URLLC uplink transmission.

When a wireless device may support a dynamic power sharing between a first RAT and a second RAT for communications via Uu and PC5/SL interfaces, the wireless device may determine a transmission power on a sidelink channel based on at least a configured power of the sidelink channel, a priority class of the sidelink channel, and/or one or more uplink channels via Uu interfaces. In an example, the one or more uplink channels may overlap with the sidelink channel in a time domain. For example, the one or more uplink channels may be scheduled via one or more uplink carriers that may overlap with a sidelink carrier of the sidelink channel in a frequency domain or may not overlap in the frequency domain. The wireless device may support simultaneous transmission of a sidelink transmission and an uplink transmission in a time domain. The wireless device may allocate a transmission power based on a UE maximum/allowed power for the sidelink transmission and the uplink transmission when overlap. The wireless device may not support simultaneous transmission of the sidelink transmission and the uplink transmission in the time domain. When the wireless device may not support the simultaneous transmission, the wireless device may select the sidelink transmission or the uplink transmission based on a priority or an order between two transmissions. The wireless device may determine an order among a plurality of transmissions based on embodiments. Based on a capability (e.g., simultaneous transmission is supported between the sidelink and the uplink transmission or not), the wireless device may select either the sidelink or the uplink transmission or may distribute/allocate the UE maximum/allowed power to the plurality of transmissions based on the order. For example, the wireless device may determine the order of the plurality of the transmissions based on a priority rule specified in the specification.

In an example, a base station may configure a plurality of priority thresholds for a sidelink operation. For example, the plurality of priority thresholds may comprise a first priority threshold and a second priority threshold. A wireless device may determine a priority threshold of the plurality of the priority thresholds for a sidelink transmission based on a service priority or a service type of an uplink transmission, wherein the sidelink transmission and the uplink transmission may overlap in a time domain. For example, the wireless device may determine the priority threshold when the wireless device may not support simultaneous transmission between the sidelink transmission and the uplink transmission. For example, the wireless device may determine the priority threshold when the wireless device may be a power limited such that a sum of configured power for the sidelink transmission and the uplink transmission may exceed the wireless device's allowed/maximum power. The wireless device may determine the priority based on the service priority or the service type of the uplink transmission. For example, when the uplink transmission is associated with URLLC, the wireless device may determine the priority value associated with the URLLC (e.g., the second priority threshold). For example, when the uplink transmission is associated with eMBB, the wireless device may determine the priority value associated with the eMBB (e.g., the first priority threshold). Based on the service priority/ type of the uplink transmission, the wireless device may determine different priority threshold values to determine an order between the sidelink transmission and the uplink transmission. The base station may configure the plurality of threshold values such that the wireless device may prioritize high QoS traffic of sidelink transmission over less high QoS traffic of uplink transmission while prioritize eMBB uplink over low QoS traffic of sidelink transmission. The base station may configure the plurality of threshold values such that the wireless device may prioritize URLLC uplink over sidelink transmission while prioritizing sidelink transmission over eMBB uplink. Embodiments may allow flexible management/ordering of overlapping sidelink and uplink transmission. Embodiments may enhance QoS experiences of the wireless device.

Figure 28:
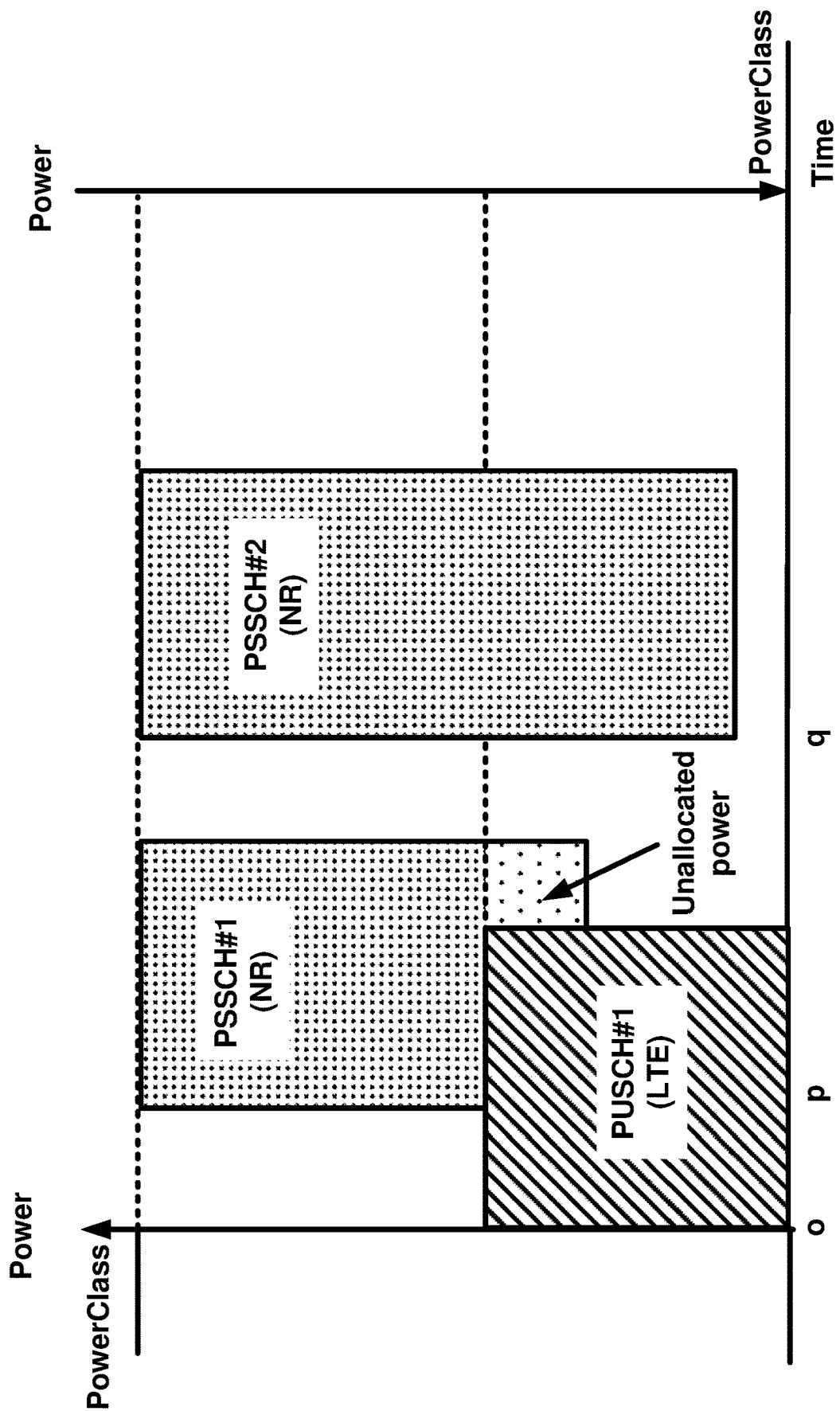
FIG. 28 is illustration of power sharing as per an aspect of an example embodiment of the present disclosure.

For example, based on a scenario of FIG. 16A, a first wireless device (e.g., wireless device 1) may be connected to a first base station using a first RAT. The first wireless device may operate a sidelink operation with a second wireless device (e.g., wireless device 2) based on a second RAT. For example, the first wireless device may be configured with a serving cell on a first frequency. The first wireless device may perform the sidelink operation in a second frequency. The first base station may not broadcast information about sidelink resource pools/parameters of the sidelink operation on the second frequency as the sidelink resource pools are not managed by the first RAT. In response to not receiving information about the second frequency sidelink configurations/parameters, the wireless device may apply one or more parameters that are preconfigured for the second frequency. The wireless device may operate a sidelink based on out-of-coverage operation. The first base station may not be aware a presence of the sidelink operation at the second frequency by the first wireless device. The first wireless device may operate a sidelink on the second frequency without reducing performance/throughput of communication between the first base station and the first wireless device. FIG. 28 illustrates an example. A wireless device is connected to an LTE. The wireless device operates a SL using NR. At a time o, the wireless device allocates a configured power to a first PUSCH (e.g., PUSCH #1). At a time p, the wireless device allocates a power up to {a UE allowed power—the configured power to the first PSSCH (e.g., PSSCH #1)} to avoid any impact or reduce performance of the first PUSCH. The wireless device allocates up to a configured power of a second PSSCH (e.g., PSSCH #2) at a time q.

In an example, a wireless device may be connected to a second RAT (e.g., NR) using a second base station. The wireless device may operate a SL using a first RAT (e.g., LTE). The wireless device may be connected to a PCell on a first frequency. The wireless device may operate a SL on a second frequency. The second base station may broadcast one or more parameters on the SL operation on the second frequency via SIBs and/or RRC messages on the first frequency. The second base station may transmit one or more RRC messages comprising parameters of a first power threshold, a second power threshold, and a priority class threshold. The wireless device may apply the first power threshold for a sidelink transmission associated with a resource pool where a priority class of the resource pool is smaller than or equal to the priority class threshold. The wireless device may apply the second power threshold for a sidelink transmission associated with a resource pool where a priority class of the resource pool is larger than the priority class threshold. The second base station may adjust potential impact from a sidelink operation on Uu operation by configuring a different priority class and/or power threshold value(s). A similar mechanism may be also applied to a sidelink operation based on the second RAT.

Figure 29:
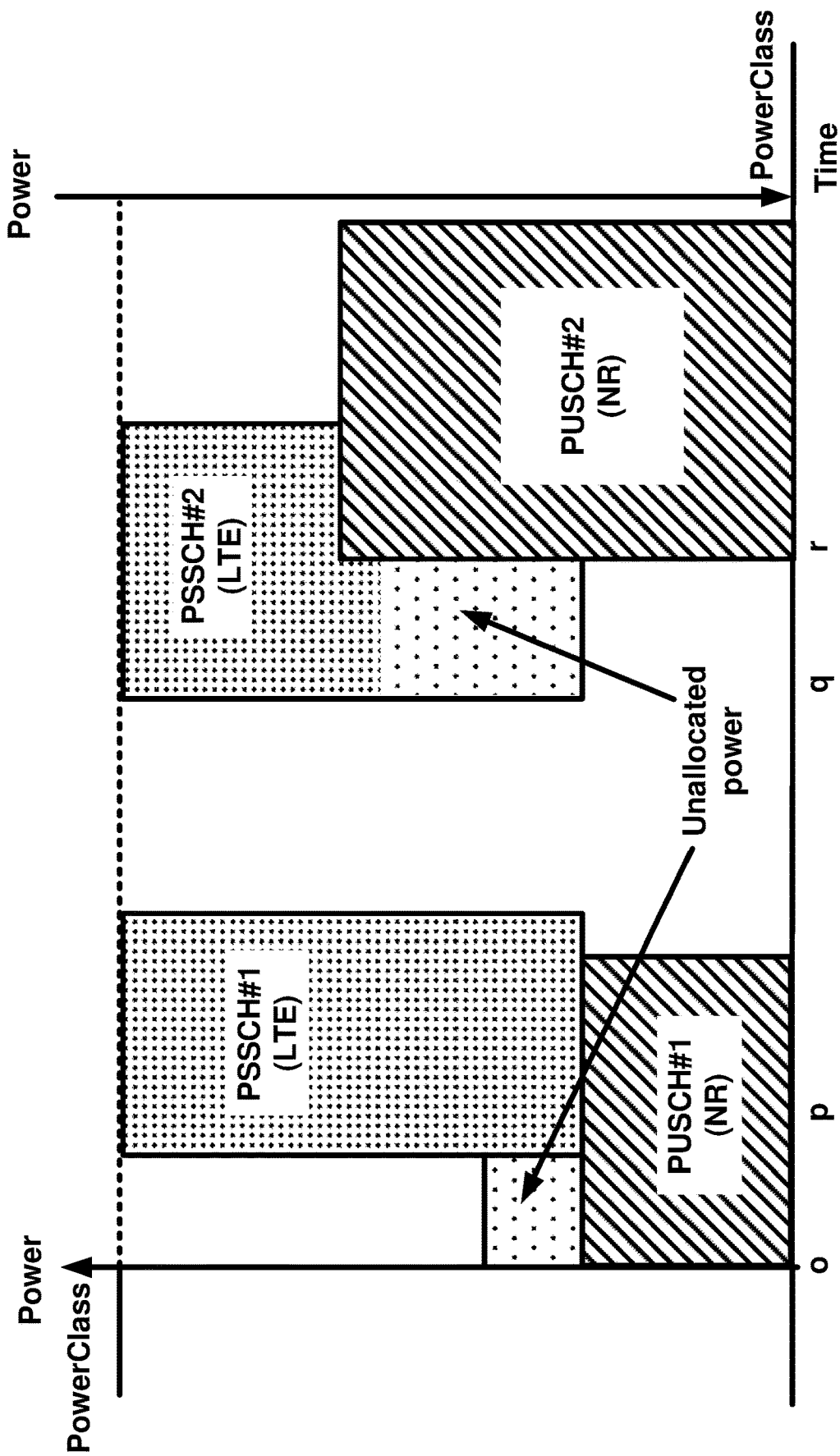
FIG. 29 is illustration of power sharing as per an aspect of an example embodiment of the present disclosure.

FIG. 29 illustrates an example. A wireless device may be connected to a second base station based on a second RAT (e.g., NR). The wireless device may operate a SL using a first RAT. The second base station may transmit one or more RRC messages comprising a plurality of configuration parameters of the sidelink operation. The one or more RRC messages may comprise a first SL power threshold (e.g., 1st power) and a second SL power threshold (e.g., 2nd power), and a priority class threshold. The one or more RRC messages may comprise the priority class threshold (e.g., a first priority class threshold) for a sidelink resource pool. The one or more RRC messages may comprise a second priority class threshold. The one or more RRC messages may further comprise the second priority class threshold (e.g., a first priority class threshold) for the sidelink resource pool. In response to receiving a single priority class threshold (e.g., the first priority class threshold) for a first sidelink resource pool, a wireless device may determine a sidelink channel, via the first sidelink resource pool, may have higher priority over a Uu channel when a priority class of the first sidelink resource pool associated with the sidelink channel is higher than the single priority class threshold (e.g., the first priority class threshold). The wireless device may determine the sidelink channel, via the first sidelink resource pool, may have higher priority over Uu channel when the priority class of the sidelink channel is higher than the single priority class threshold. In response to receiving a first priority class threshold and a second priority class threshold for a second sidelink resource pool, a wireless device may determine that a second sidelink, via the second sidelink resource pool, may have a higher priority over a Uu channel, wherein the sidelink transmission may be overlapped with the Uu channel in time domain: when a priority of the Uu channel is a low priority or associated with a eMBB or indicated as a normal data class, the priority class of the second sidelink channel is higher than the first priority class threshold; or when a priority of the Uu channel is a high priority or associated with a URLLC or indicated as a URLLC data class, the priority class of the second sidelink channel is higher than the second priority class threshold.

For example, when the wireless device may have one or more sidelink signals/channels, the wireless device may select for the determining, as the second sidelink channel, a sidelink signal/channel with a highest (or lowest) priority (e.g., a smallest (or largest) priority value) among the one or more sidelink signals/channels. For example, when the wireless device may have one or more uplink signals/channels, the wireless device may select for the determining, as the Uu channel, a uplink signal/channel with a higher (or lower) priority (e.g., priority index=1 (or priority index=0)) among the one or more uplink signals/channels. The wireless device may apply a priority rule above between the determined/selected uplink signal/channel and the determined/selected sidelink signal/channel. For example, the wireless device may select a highest uplink channel/signal of one or more uplink channels/signals, overlapping with a sidelink channel/signal, to determine whether to apply the first priority class threshold or the second priority class threshold for the sidelink channel/signal.

In an example, the priority class of the sidelink channel may be higher than the first or the second priority class threshold, in response to a priority value of the priority class of the sidelink channel may be smaller (or larger) than the first or the second priority class threshold respectively. For example, the priority class of the sidelink channel is higher than the first or the second priority class threshold, in response to the priority class of the sidelink channel has higher priority than a priority class corresponding to the first or the second priority class threshold. A mapping between a priority class to a priority (or a priority value) may be configured by a base station.

In an example, when a wireless device may have one or more uplink transmissions overlapping with a sidelink transmission, the wireless device may determine an uplink transmission of the one or more uplink transmissions wherein the uplink transmission may be associated with URLLC (or eMBB) or associated with a high (or a low) priority. In an example, when a wireless device may have one or more sidelink transmissions overlapping with an uplink transmission, the wireless device may determine the sidelink transmission of the one or more sidelink transmissions, wherein the sidelink transmission may have a lowest priority (or a highest priority) among the one or more sidelink transmissions.

In an example, a sidelink channel may comprise at least one of a PSSCH, a PSCCH, a PSFCH (a physical sidelink feedback channel), a PSBCH (a physical sidelink broadcast channel), and/or sidelink synchronization signals. A wireless device may determine a priority class of the sidelink channel based on a priority of sidelink information/signal carried in the sidelink channel. For example, the wireless device may determine the priority of the sidelink channel of the PSFCH based on a priority level indicated via a SCI scheduling one or more PSSCHs and/or via a second SCI indicating one or more resources for the PSFCH. A base station may configure a priority class/value for a sidelink channel/signal. For example, the base station may configure the priority class for the sidelink synchronization signals and/or the PSBCH and/or the PSFCH and/or the PSSCH and/or the PSCCH.

In a resource pool configuration, a wireless device may receive parameters comprising a power threshold and a priority class. The wireless device may apply a default power threshold (e.g., a first UE allowed power, a UE allowed power, a UE maximum power, a maximum power based on a UE power class) when the wireless device may not receive parameters of the power threshold explicitly. The wireless device may apply a default priority class (e.g., a lowest priority class among one or more defined priority classes, a lower priority class that a priority class of a eMBB, a same priority class to a IoT service, etc.) when the wireless device may not receive parameters of the priority class explicitly. The wireless device may receive parameters comprising a power threshold and a priority class for a resource pool used for one or more control channels (e.g., PSCCH). The configured parameters may be used to determine a priority class and/or a power threshold used for one or more sidelink data scheduled based on the one or more control channels using the resource pool.

In handling a priority between a first sidelink channel and a second Uu uplink channel, the wireless device may determine a priority class associated with the first sidelink channel. The wireless device may use a priority class of a resource pool which the first sidelink channel uses or a priority class of a resource pool used for a control channel scheduling the first sidelink channel. For example, the wireless device may use a priority value associated with a logical channel of sidelink data carried over the first sidelink channel. For example, the wireless device may use a priority value indicated in a sidelink control information (SCI) scheduling a resource for transmission of the first sidelink channel. For example, a priority class may be represented as a low and a high priority. For example, a priority class may be represented as a priority value, wherein the priority value may be in a range of [0, . . . , N] (e.g., N=1, N=8, N=9). For example, a priority class may be represented as a priority wherein the priority is associated with a service among a plurality of services. For example, the plurality of services may comprise an eMBB, an URLLC, an IoT, a MTC, and/or the like. In an example, a wireless device may be configured with a first priority class. The wireless device may be configured with a second power priority class. For example, the first priority class threshold may be mapped to a priority class of a Uu uplink channel associated with an eMBB service. For example, the second priority class threshold may be mapped to a priority class (e.g., a high priority, a priority=1) of a Uu uplink channel associated with a URLLC service. The wireless device may use the first priority class as a priority class of a Uu uplink channel for an eMBB (or Uu uplink channel associated with a low priority) in determining powers of multiple uplink transmissions. The wireless device may use the second priority class as a priority class of a Uu uplink channel for an URLLC (or Uu uplink channel associated with a high priority) in determining powers of multiple uplink transmissions. In an example, a wireless device may use a first priority class threshold and a second priority class threshold in determining a power priority between a sidelink channel and a Uu eMBB channel and between the sidelink channel and a Uu URLLC channel respectively.

The wireless device may determine that the sidelink channel has a higher priority over the Uu channel in response to a priority class of the sidelink channel is higher than a determined priority class threshold based on a priority class of the Uu channel. For example, the wireless device may determine that the sidelink has a lower priority over the Uu channel otherwise (e.g., the priority class of the sidelink channel is lower than or equal to the determined priority class threshold). The wireless device may allocate powers, within an allowed power of the wireless device, from a highest priority channel to a lowest priority channel among one or more transmissions of channels via SL and/or Uu interfaces. FIG. 29 illustrates an example of embodiments. The wireless device may receive configuration parameters from a base station. The configuration parameters may comprise, for a sidelink resource pool, a first priority class threshold and a second priority class threshold. The configuration parameters may further comprise a first SL power threshold that is applied to a sidelink/SL channel with lower priority class than the first priority class threshold, in response to an overlapping uplink channel/signal may be associated with a low priority or a first service or a first priority. with the configuration parameters may further comprise a second SL power threshold. For example, the wireless device may apply the second SL power threshold for a SL channel with higher priority class than the first priority class threshold but lower than the second priority class threshold. For example, the wireless device may apply the second SL power threshold for a SL channel with higher priority class than the second priority class threshold.

The wireless device may be scheduled with a first PUSCH (PUSCH #1) of a low priority (e.g., eMBB PUSCH) at a time o and a second PUSCH (PUSCH #2) of a high priority (e.g., URLLC PUSCH) at a time r. The wireless device may have a first PSSCH (PSSCH #1) with a higher priority than the first priority class threshold (e.g., the first PSSCH has higher priority than the eMBB PUSCH) and have a second PSSCH (PSSCH #2) with a lower priority than the second priority class threshold. The wireless device may prioritize the first PSSCH (e.g., PSSCH #1) over the first PUSCH. The wireless device allocates a configured power to the first PSSCH at a time p. The wireless device prioritizes the second PUSCH over the second PSSCH at a time r. The wireless device allocates a configured power of the second PUSCH at the time r. At a time q, the wireless device may allocate up to the first SL power threshold to the first PSSCH. In an example, a wireless device may apply a first SL power threshold to a SL channel with a priority class higher than a first priority class threshold. The wireless device may apply a second SL power threshold to a SL channel with a priority class higher than a second priority class threshold. Based on one or more priority class threshold values and/or based on one or more SL power threshold values, the base station may reduce impacts from a SL operation on Uu interface.

In an example, the wireless device may support a simultaneous transmission between one or more uplink signals/channels and one or more sidelink signals/channels based on a capability. When the wireless device may support the simultaneous transmission, the wireless device may allocate an allowed power of the wireless device across the one or more uplink signals/channels and the one or more sidelink signals/channels. The wireless device may determine and allocate a transmission power starting from a highest priority transmission based on a power priority rule. For example, the wireless device may determine a sum of allocated power of one or more transmission powers of one or more second transmissions, wherein the one or more second transmissions are determined based on the power priority rule. The sum of allocated power may be smaller than or equal to the allowed power of the wireless device. For a transmission, when a sum of allocated powers comprising a configured transmission power of the transmission becomes larger than the allowed power of the wireless device, the wireless device may drop or reduce the transmission power of the transmission. The wireless device may reduce or drop powers from the lowest priority channels until a sum of allocated powers may be equal to or lower than the allowed power of the wireless device.

In an example, the wireless device may be associated with a dual connectivity. The wireless device may determine an allowed transmission power of a cell group. The wireless device may perform a power priority rule for one or more sidelink/uplink transmissions for the cell group, wherein a sum of transmission powers of the one or more sidelink/uplink transmissions may be lower than or equal to an allowed total transmission power of the cell group.

Figure 30:
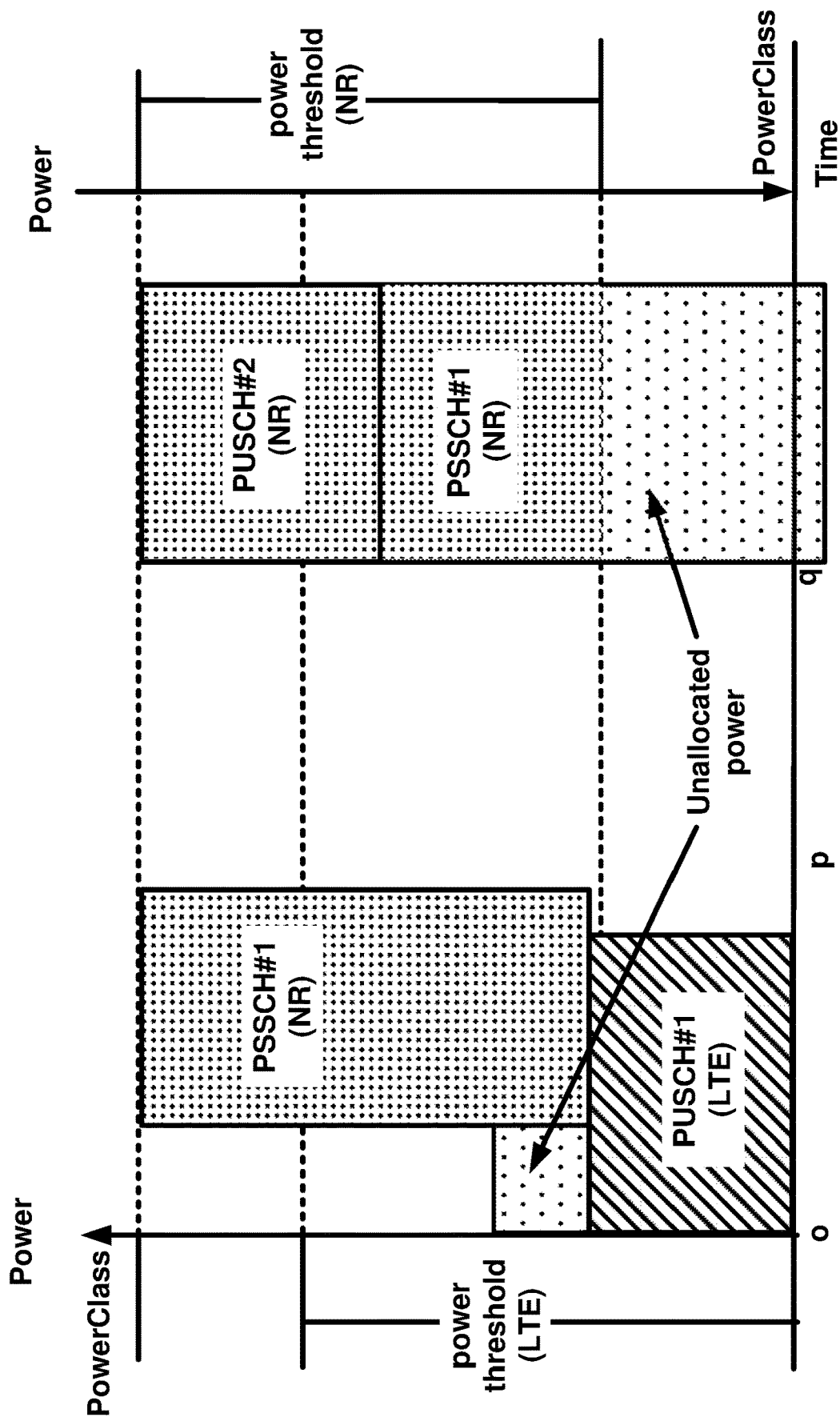
FIG. 30 is illustration of power sharing as per an aspect of an example embodiment of the present disclosure.

FIG. 30 illustrates a power sharing in a dual connectivity scenario. A wireless device may be connected to a first base station and a second base station. The wireless device may receive one or more RRC messages comprising a plurality of cells grouped into a plurality of cell groups. The wireless device may communicate with the first base station via a first cell group. The wireless device may communicate with the second base station via a second cell group. The wireless device may receive one or more RRC messages comprising a first transmission power threshold for the first cell group (e.g., power threshold (LTE)) and a second transmission power threshold for the second cell group (e.g., power threshold (NR)). The wireless device determines a transmission power of a uplink channel either via Uu or SL at least based on a configured power of the uplink channel and the first transmission power threshold in response to the uplink channel is for the first RAT. The wireless device determines a transmission power of a uplink channel either via Uu or SL at least based on a configured power of the uplink channel and the second transmission power threshold in response to the uplink channel is for the second RAT.

Figure 31:
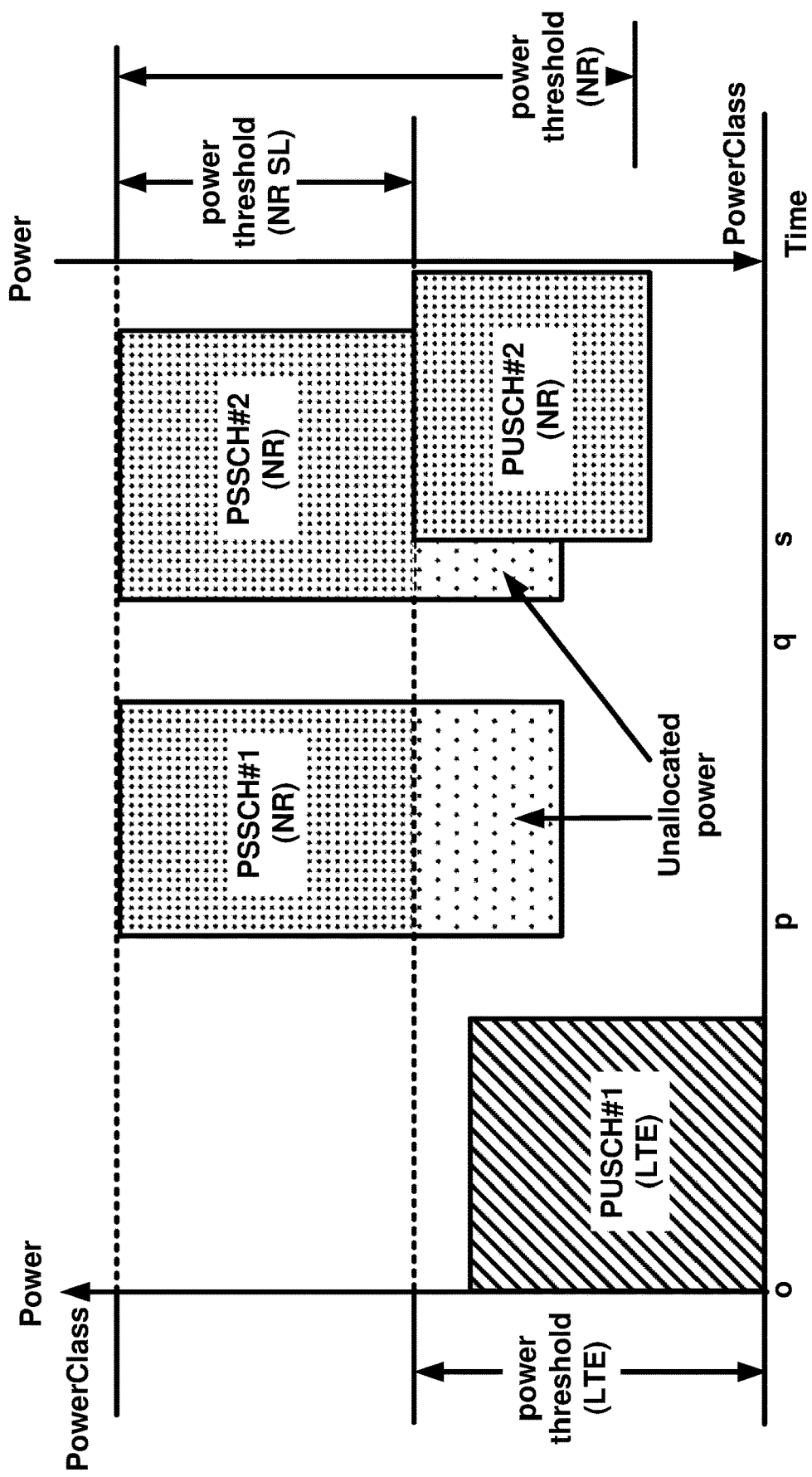
FIG. 31 is illustration of power sharing as per an aspect of an example embodiment of the present disclosure.

When a wireless device may implement an architecture option of FIG. 22A (e.g., a wireless device may not support a dynamic power sharing of a first RAT SL and a second RAT Uu, and vice versa), a semi-static power sharing between a first RAT Uu and a second RAT SL (or vice versa) may be needed. A first base station and/or a second base station may configure a first transmission power threshold used for the first RAT Uu operation or a second transmission power threshold used for the second RAT SL operation. FIG. 31 illustrates an example. A wireless device may be connected to a first base station based on a first RAT and a second base station based on a second RAT. The first base station may configure one or more cells forming a first cell group to the wireless device. The second base station may configure one or more cells forming a second cell group to the wireless device. In response to activating a sidelink operation based on the second RAT, the first base station and/or the second base station may configure a first transmission power threshold and/or a second transmission power threshold between the first RAT Uu and the second RAT SL communication. For example, the first transmission power threshold is a power threshold for the first RAT (e.g., power threshold (LTE)). The second transmission power threshold is a power threshold for the second RAT SL operation (e.g., power threshold (NR SL)). A sum of the first transmission power threshold and the second transmission power threshold may not exceed a UE allowed power. The wireless device may allocate powers on one or more uplink channels to the first base station up to the first transmission power threshold. The wireless device may allocate powers on one or more sidelink channels based on the second RAT up to the second transmission power threshold. The wireless device may allocate up to transmission power threshold of NR (where a sum of a transmission power threshold of LTE and a transmission power threshold of NR may exceed the UE allowed power). The wireless device may perform a dynamic power sharing between Uu uplink channels to the first base station and Uu uplink channels to the second base station. The wireless device allocates a configured power to a first PUSCH at a time o. The wireless device allocates a power up to the second power threshold (power threshold (NR SL)) to a first PSSCH at a time p and at a time q. The wireless device may allocate a configured power to a second PUSCH (e.g., PUSCH #2) at a time based on a dynamic power sharing between the first RAT and the second RAT Uu communication.

When a wireless device may support an architecture option of FIG. 22B, the wireless device may need to share a power semi-statically between Uu and SL regardless of a RAT. A base station may configure a transmission power threshold used for SL operation if the wireless device supports the architecture option. The wireless device may allocate powers up to the configured transmission power threshold for one or more SL channels. The wireless device may allocate powers up to a remained power (e.g., a UE allowed power—the configured transmission power threshold for SL) for one or more Uu channels. The remained power may be determined based on a UE allowed power and the configured power threshold (e.g., a UE allowed power—the configured transmission power threshold for SL). The base station may additionally configure a transmission power threshold for Uu operation where a sum of two thresholds for Uu and SL may not exceed the UE allowed power.

In an example, a wireless device may be connected with a first base station on a frequency band B1. The first base station may configure a first cell group on the frequency band B1. The wireless device may be connected with a second base station including a frequency band B2. The second base station may configure a second cell group including one or more cells operating on one or more frequencies. The wireless device may provide an active UL cell on a first frequency of the band B1. The wireless device may operate a SL in a frequency band B2. The wireless device may operate on a second frequency of the band B2. In some combinations of the first frequency and the second frequency (e.g., band 1A and 77A), a first UL transmission from the first frequency and a second UL transmission from the second frequency may degrade performance of the wireless device reception in a third frequency. The wireless device may activate one UL frequency between the first frequency and the second frequency when such an issue arises. In an example, the first base station or the second base station may not be aware of a presence of a sidelink operation. The first base station or the second base station may transmit one or more DCIs scheduling one or more uplink transmissions on the first frequency, where the wireless device may have one or more sidelink transmissions on the second frequency at a same time. In an example, a wireless device may determine whether the wireless device may transmit one or more sidelink transmissions in a resource unit of a second frequency when one or more conditions are met. The one or more sidelink transmissions in the resource unit may not degrade performance of the wireless device reception (e.g., a wireless device is activated with one or more bands that may not cause severe interference issues with simultaneous uplink transmissions from a plurality of uplink frequencies). When the wireless device is activated with a combination of bands with a potential interference issue with simultaneous uplink transmissions from a plurality of uplink frequencies: the second frequency may not be one of impacting uplink frequencies; the first base station or the second base station may transmit one or more RRC messages and/or DCIs allowing/scheduling uplink transmissions via Uu interface where a time duration of the uplink transmissions overlap with the transmission duration of the one or more sidelink transmissions. The transmission of the one or more sidelink transmissions may not lead simultaneous uplink transmissions from the plurality of uplink frequencies (e.g., no scheduled uplink in the first frequency); and/or the first base station or the second base station may transmit one or more RRC messages and/or DCIs allowing the one or more sidelink transmissions at the occasion.

A wireless device may drop one or more sidelink transmissions in response to a case where the one or more sidelink transmission may lead an issue of reception quality degradation of the wireless device in one or more of downlink frequencies from one or more base stations with simultaneous uplink transmissions from a plurality of uplink frequencies. A base station may configure a set of time durations where a wireless device is allowed to transmit one or more uplink transmissions via Uu and/or SL interfaces on a frequency. In response to receiving the configuration of the set of time durations, a wireless device may transmit one or more transmissions including UL transmissions and/or SL transmissions during the configured set of time durations on the frequency. A base station may configure a set of time durations where a wireless device is allowed to transmit one or more uplink transmissions via SL interfaces on a frequency. In response to receiving the configuration of the set of time durations, a wireless device may transmit one or more SL transmissions during the configured set of time durations on the frequency.

In an example, a wireless device may support a first UE allowed power in one or more first frequencies/bands. The wireless device may support a second UE allowed power in one or more second frequencies/bands. In the example, the wireless device may indicate a second UE power class when the second UE allowed power may be larger than the first UE allowed power. A wireless device may indicate a first UE power class when the wireless device may support the first allowed power in one or more frequencies/bands. In an example, a wireless device may support the second UE allowed power in one or more frequencies/bands for sidelink operations such as vehicle to vehicle operation. When the wireless device may support the second UE power class, and support the second UE allowed power in the one or more frequencies/bands for sidelink operations, the wireless device may determine a transmission power of a sidelink transmission based on a configured power of the sidelink transmission and the second UE allowed power. The wireless device may not consider powers on one or more UL transmissions via Uu interface occurring at a same time duration.

In an example, a wireless device may support a second UE allowed power in one or more frequencies/bands to support better coverage of Uu operation (e.g., a dual connectivity). When a resource pool is configured in one of the one or more frequencies, a wireless device may expect a SL power threshold in configuration parameters of the resource pool. In response to receiving a SL power threshold which is larger than a first UE allowed power, the wireless device may apply the second UE allowed power in determining powers for sidelink channels based on the resource pool. In other cases (e.g., the SL power threshold is no larger than the first UE allowed power, or no SL power threshold configuration), the wireless device may apply the first UE allowed power in determining powers for sidelink channels based on the resource pool. For example, the first UE allowed power is a maximum power based on a regular UE power class (e.g., 23 dBm). For example, the second UE allowed power is a maximum power based on a high power UE class (e.g., 26 dBm). A wireless device may apply a higher power threshold to a sidelink resource pool based on an explicit configuration from a base station or based on a pre-configuration. The wireless device may apply a lower power threshold based on the first UE allowed power otherwise.

A wireless device may receive one or more RRC messages comprising parameters of one or more resource pool configurations. The wireless device may be preconfigured with one or more second resource pool configurations. A resource pool may be used for reception of one or more first PSSCHs and/or may be used for transmission of one or more second PSSCHs. The wireless device may receive one or more second RRC messages comprising parameters of one or more control resource pool configurations. A control resource pool may be used for reception of one or more first PSCCHs and/or may be used for transmission of one or more second PSCCHs. A control resource pool may be configured with a transmission mode (e.g., mode 1, mode 2). The wireless device may receive one or more third RRC messages comprising parameters of one or more discovery resource pool configurations. A discovery resource pool may be used for reception of one or more first PDSCHs (physical sidelink discovery channels) and/or may be used for transmission of one or more second PDSCHs.

In a resource pool configuration, a wireless device may receive parameters comprising a power threshold and a priority class. The wireless device may apply a default power threshold (e.g., a first UE allowed power, a UE allowed power, a UE maximum power, a maximum power based on a UE power class) when the wireless device may not receive parameters of the power threshold explicitly. The wireless device may apply a default priority class (e.g., a lowest priority class among one or more defined priority classes, a lower priority class that a priority class of a eMBB, a same priority class to a IoT service, etc.) when the wireless device may not receive parameters of the priority class explicitly. The wireless device may receive parameters comprising a power threshold and a priority class for a resource pool used for one or more control channels (e.g., PSCCH). The configured parameters may be used to determine a priority class and/or a power threshold used for one or more sidelink data scheduled based on the one or more control channels using the resource pool.

In handling a priority between a first sidelink channel and a second Uu uplink channel, the wireless device may determine a priority class associated with the first sidelink channel. The wireless device may use a priority class of a resource pool which the first sidelink channel uses or a priority class of a resource pool used for a control channel scheduling the first sidelink channel. In an example, a wireless device may be configured with a first priority class. The wireless device may be configured with a second power priority class. For example, the first priority class threshold may be mapped to a priority class of a Uu uplink channel associated with an eMBB service. For example, the second priority class threshold may be mapped to a priority class of a Uu uplink channel associated with a URLLC service. The wireless device may use the first priority class as a priority class of a Uu uplink channel for an eMBB (or Uu uplink channel associated with a low priority) in determining powers of multiple uplink transmissions. The wireless device may use the second priority class as a priority class of a Uu uplink channel for an URLLC (or Uu uplink channel associated with a high priority) in determining powers of multiple uplink transmissions. In an example, a wireless device may use a first priority class threshold and a second priority class threshold in determining a priority between a Uu eMBB channel and a Uu URLLC channel.

In an example, a wireless device may prioritize a sidelink channel that has a highest priority class among one or more sidelink channels at a time. The wireless device may allocate powers from a highest ordered/priority sidelink channel to a lowest ordered/priority sidelink channel. When the wireless device may have one or more Uu uplink channels at the time, the wireless device may determine an order of the one or more Uu uplink channels based on a rule (e.g., PRACH is prioritized over PUSCH). The wireless device may interleave the one or more sidelink channels and the one or more Uu uplink channels based on an ordering rule. For example, the wireless device may use a priority class associated with a channel in the ordering. One or more sidelink channels with higher priority class than a priority class assigned for a URLLC traffic or a high priority Uu traffic may be ordered first. One or more Uu channels associated with a URLLC or a high priority may be ordered next. One or more sidelink channels with a higher priority class than a priority class assigned for a eMBB traffic or a low priority Uu traffic may be ordered next. One or more Uu channels associated with an eMBB or a low priority may be ordered next. One or more remained sidelink channels with a lower priority class than the priority class assigned for an eMBB traffic or a low traffic may be ordered in last. The wireless device may assign a power from a highest ordered/priority channel to a lowest ordered/priority channel. When a sum of allocated powers is larger than a total transmission power threshold, the wireless device may reduce or drop powers from the lowest priority channels until a sum of allocated powers may be equal to the total transmission power.

For example, the wireless device may use a priority class associated with a channel in the ordering. For one or more sidelink channels with higher priority class than a second priority class threshold, the wireless device may first allocate configured powers of the one or more sidelink channels. Next, the wireless device may allocate powers on one or more Uu channels associated with URLLC or a high priority. Next, the wireless device may allocate powers on one or more sidelink channels with higher priority class than a first priority class threshold (but lower than the second priority class). Next, the wireless device may allocate powers on one or more Uu channels associated with eMBB or a low priority. Next, the wireless device may allocate powers on one or more sidelink channels with lower priority class than a first priority class threshold. When a sum of allocated powers is larger than a total transmission power threshold, the wireless device may reduce or drop powers from the lowest priority channels until a sum of allocated powers may be equal to the total transmission power.

The wireless device may determine powers of uplink channels for a cell group. The total transmission power may be determined based on a power threshold configured for the cell group or a UE allowed power (when the power threshold is not configured for the cell). The wireless device may determine a sidelink channel belong to a first cell group when a RAT of the sidelink channel is same as a RAT used in the first cell group. The RAT of the sidelink channel is determined based on a RAT used in a sidelink control information (SCI) or a PDCCH scheduling a SCI (a control channel) transmitted by a base station if the sidelink resources are controlled by the network using one or more SCIs. The RAT of the sidelink channel is determined based on a RAT used in a sidelink control information (SCI) or a PSCCH (a control channel) transmitted by the wireless device if the sidelink resources are not controlled by the network. The wireless device may determine one or more Uu channels for the cell group in power determination with the one or more sidelink channels.

A wireless device may receive one or more RRC messages comprising a SL power threshold. In response to receiving the SL power threshold, the wireless device may determine powers of one or more sidelink channels based on configured powers of the one or more sidelink channels and the SL power threshold. The wireless device may not consider one or more Uu channels in power determination of sidelink channels.

A wireless device may receive a priority class of a PSSCH from a corresponding SCI or PSCCH. In response to receiving the priority class from the SCI, the received priority class may override a priority class associated with a resource pool used for the PSSCH/PSCCH.

In an example, if a wireless device may receive a UE-specific RRC messages, the wireless device may apply one or more parameters configured by the UE-specific RRC messages over parameters that are pre-configured or configured for a sidelink operation or parameters configured by one or more SIBs.

A wireless device may perform a sidelink operation using a EUTRA (e.g., LTE) radio access technology (RAT) and/or a sidelink operation using a NR radio access technology. In an example, a wireless device may perform a sidelink operation based on a first radio access technology (RAT). A base station may transmit one or more radio resource control messages comprising configuration parameters of cells that are grouped into a plurality of cell groups. The plurality of cell groups may comprise a first cell group for communication via a first base station. The plurality of cell groups may comprise a second cell group for communication via a second base station. The first cell group may use a first RAT (e.g., LTE) and the second cell group may use a second RAT. In an example, a wireless device may operate a sidelink in a first RAT and may be connected to a base station using a second RAT at the same time. In an example, a wireless device may operate a sidelink in a first RAT and may be connected to a first base station using a second RAT and be connected to a second base station using the first RAT. Based on various implementation of a wireless device supporting multiple RATs with a shared power, example embodiments allow an enhanced power control mechanism for efficient power sharing among sidelink operation and communication to the base station(s).

In an example, a wireless device may operate a sidelink with a first RAT. The wireless device may be associated with a first cell group based on the first RAT and a second cell group based on a second RAT. In an example, a wireless device may not allow a dynamic power sharing among different RATs or between a first cell group with a first RAT and a second cell group with a second RAT. The wireless device may need to split a UE allowed power between a first power for the first RAT and a second power for the second RAT. The wireless device may share the first power between a sidelink operation based on the first RAT and communication to a first base station using the first RAT. The wireless device may determine a transmission power of a sidelink channel based on one or more power control parameters, a UE allowed power, the first power (e.g., a transmission power threshold of a CG/a RAT), and/or a threshold configured for the sidelink channel. In an example, a wireless device may operate a sidelink with a first RAT. The wireless device may be connected to a base station with a second RAT. The wireless device may determine a transmission power of the sidelink channel based on a power sharing mechanism between the first RAT and the second RAT. In an example, a wireless device may allocate uplink power greater than zero to the first RAT when a corresponding slot or subframe of the second RAT is a downlink (e.g., as the wireless device will not be scheduled with any uplink for the second RAT in a given time, the wireless device may allocate power to the first RAT). Example embodiments define a power sharing rule among multiple RATs, with and without sidelink operation in each RAT, and with and without communication to a base station in each RAT. Example embodiments allow efficient power sharing for coexisting sidelink and communication to base station(s) across a plurality of RATs.

Figure 32:
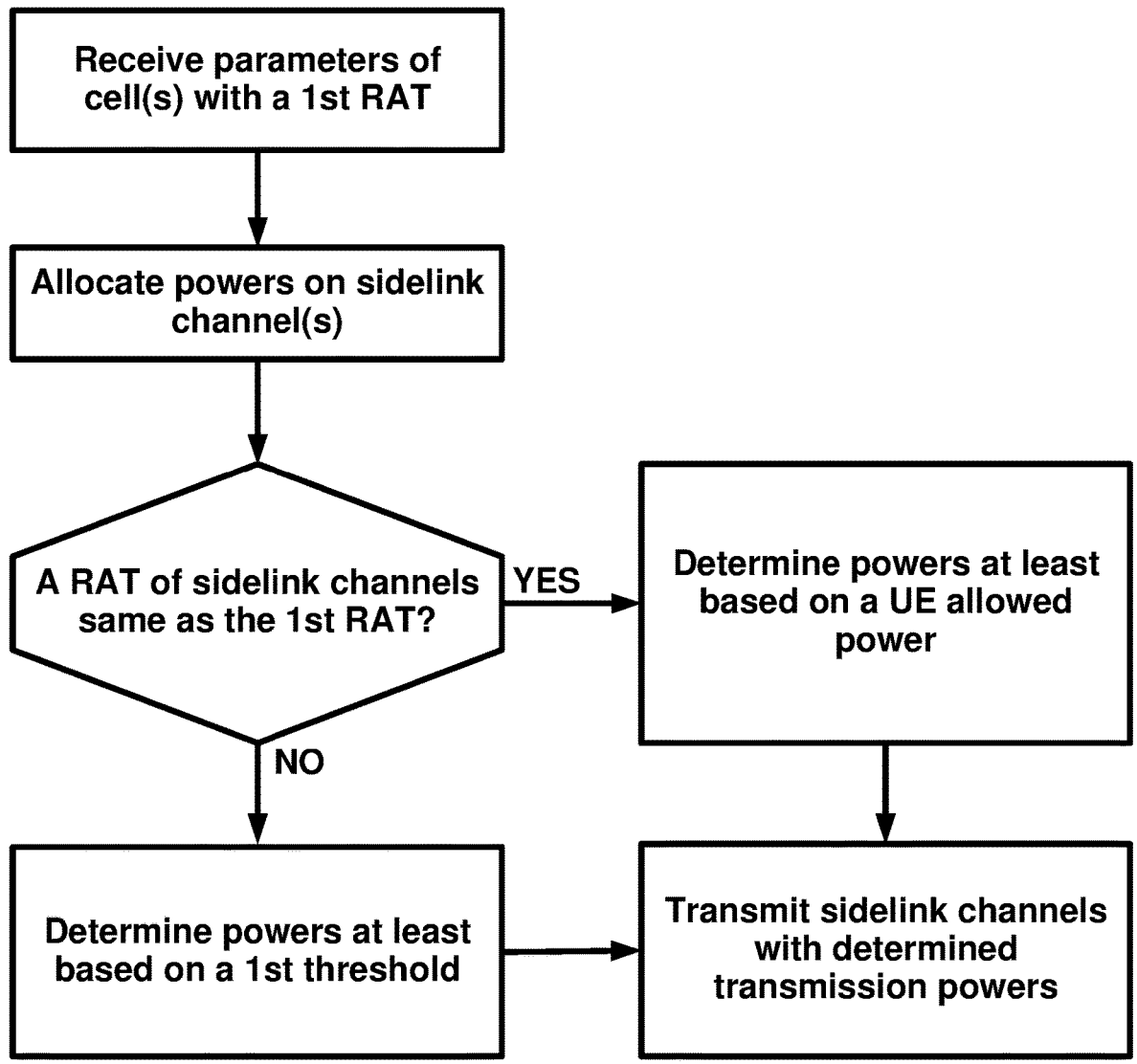
FIG. 32 is a flow diagram of an aspect of an example embodiment of the present disclosure.
Figure 33:
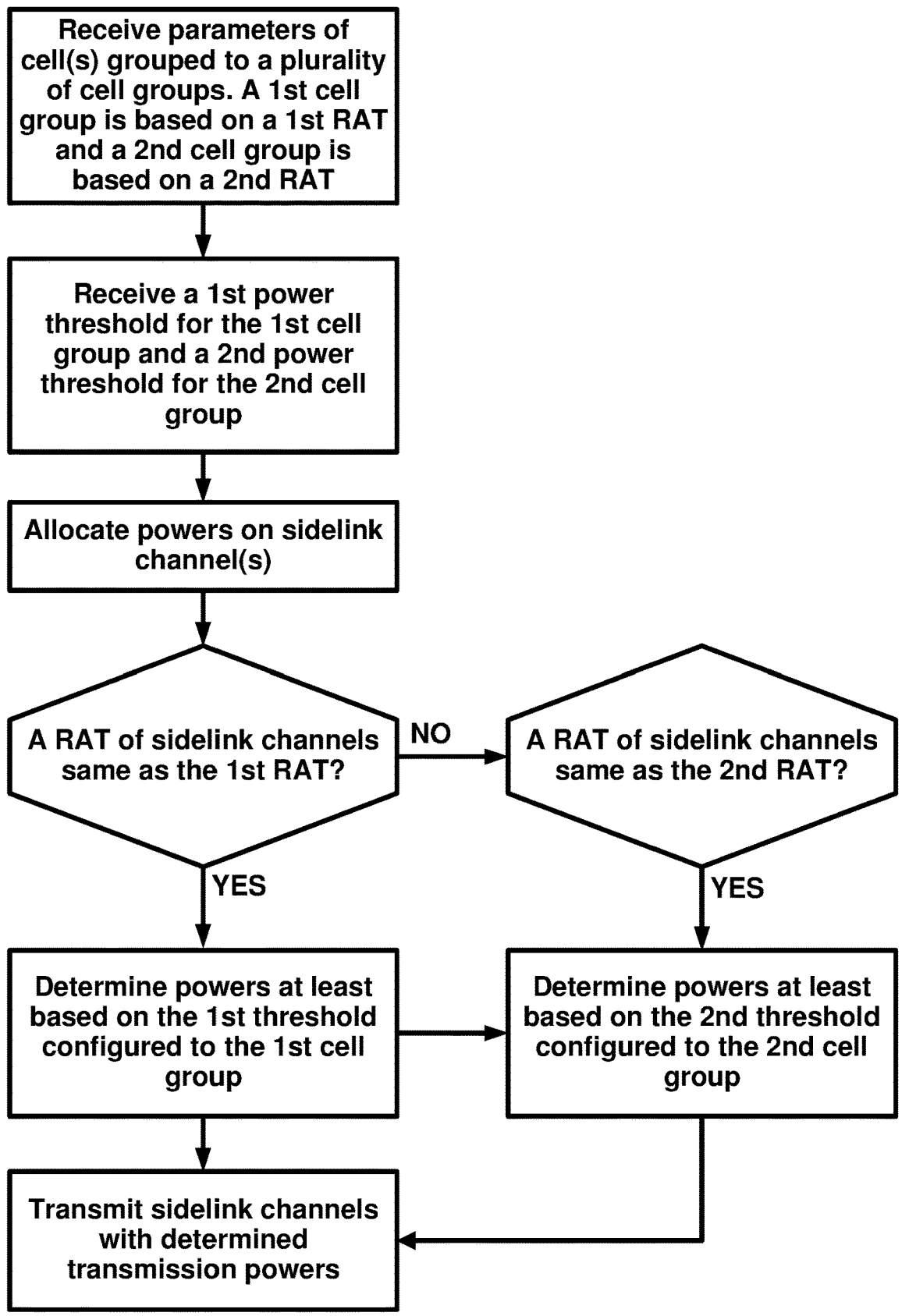
FIG. 33 is a flow diagram of an aspect of an example embodiment of the present disclosure. 1

FIG. 32 illustrates a flow chart. A wireless device may receive radio resource control messages comprising parameters of one or more cells with a first radio access technology. The wireless may determine a transmission power of a sidelink channel based on a RAT of the sidelink. In response to a same RAT to the first RAT, the wireless device may apply a UE allowed power in power determination of the sidelink channel. In response to a different RAT to the first RAT, the wireless device may apply another power threshold.

FIG. 32 illustrates a flow chart. A wireless device may be configured with a dual connectivity scenario where a first cell group is based on a first RAT and a second cell group is based on a second RAT. The wireless device may receive one or more RRC messages comprising a first power threshold used for the first cell group. The one or more RRC messages may comprise a second power threshold used for the second cell group. The wireless device may determine a transmission power of a sidelink based on the first threshold in response to a RAT of the sidelink is same to the first RAT. The wireless device may determine a transmission power of a sidelink based on the second threshold in response to a RAT of the sidelink is same to the second RAT.

A wireless device may receive one or more radio resource control (RRC) messages. The one or more RRC messages may comprise configuration parameters of one or more cells operating with a first radio access technology. The wireless device may receive one or more second RRC messages. The second RRC messages may indicate a first transmission power threshold of the first radio access technology. In response to a second radio access technology is different to the first radio access technology, the wireless device may determine a second d power threshold of the second ratio access technology based on the first transmission power threshold. The wireless device may determine a transmission power of a sidelink channel of the second radio access technology based on the second power transmission threshold. The wireless device may transmit the sidelink channel with the transmission power.

The radio access technology for the sidelink channel may be based on LTE or NR. The radio access technology of the first sidelink may be determined based on a resource pool configuration used for the first sidelink channel. The radio access technology of the first sidelink may be determined based on a used radio access technology for a sidelink control information scheduling the first sidelink channel. The sidelink control information may be transmitted via a PDCCH when it is transmitted by a base station with the first radio access technology. The sidelink control information may be transmitted via a PSCCH when transmitted by the wireless device via the second radio access technology.

The wireless device may receive one or more second messages. The one or more second RRC messages may comprise configuration parameters of a plurality of cells grouped into a plurality of cell groups. The one or more second RRC messages may comprise parameters of a first cell group transmission power threshold used for a first cell group and a second cell group transmission power threshold for a second cell group. The plurality of cell groups comprises: a first cell group of the one or more cells for communication via a first base station with the first radio access technology; and a second cell group for communication via a second base station with a third radio access technology.

In the example, the radio access technology for the first sidelink channel may be determined based on a used radio access technology for the first sidelink channel. The wireless device may determine the second power transmission threshold of the second radio access technology based on the first cell group transmission power threshold in response to the second radio access technology of the sidelink channel is a same to the first radio access technology. The wireless device may determine the second power transmission threshold of the second radio access technology based on the second cell group transmission power threshold in response to the second radio access technology of the sidelink channel is the same to the second radio access technology. The wireless device may determine the transmission power of the first sidelink channel being smaller than or equal to the first cell group power transmission power threshold. The wireless device may determine the transmission power of the first sidelink channel being smaller than or equal to the second cell group power transmission power threshold.

The wireless device may transmit one or more second RRC messages comprising information on one or more sidelink resource configurations of potential sidelink operation using the second radio access technology. The second radio access technology may be different from the first radio access technology. The one or more second RRC messages comprise a UE capability indication. The UE capability indication comprises whether or not the wireless device supports a dynamic power sharing between the first radio access technology and the second radio access technology. A base station of the one or more cell cells may transmit one or more third RRC messages indicating a third transmission power threshold of a sidelink operation using the second radio access technology, in response to the UE capability indication. The third power threshold is a UE allowed power in response to the UE capability indication indicates that the wireless device supports a dynamic power sharing. The third power threshold is smaller than a UE allowed power in response to the UE capability indication indicates that the wireless device does not support a dynamic power sharing. The wireless device may determine the transmission power of a sidelink channel based on the third transmission power threshold.

A wireless device may receive one or more radio resource control (RRC) messages. The one or more RRC messages may comprise configuration parameters of a plurality of cells that are grouped into a plurality of cell groups. The one or more RRC messages may comprise a first transmission power threshold for a first cell group. The one or more RRC messages may comprise a second transmission power threshold for a first cell group. The plurality of cell groups may comprise the first cell group for communication via a first base station with a first radio access technology. The plurality of cell groups may comprise the second cell group for communication via a second base station with a second radio access technology. The wireless device may determine a RAT of a sidelink channel based on a first RAT of corresponding sidelink control information scheduling the sidelink channel. The wireless device may determine a transmission power of the sidelink channel based on the first threshold in response to the RAT of the sidelink is same to the first RAT. The wireless device may determine a transmission power of the sidelink channel based on the second threshold in response to the RAT of the sidelink is same to the second RAT. The wireless device may transmit the sidelink channel with the transmission power.

A wireless device may receive one or more radio resource control (RRC) messages. The one or more RRC messages may comprise configuration parameters of one or more cells operating with a first radio access technology. The wireless device may transmit one or more second RRC messages comprising information on one or more sidelink resource configurations of potential sidelink operation using a second radio access technology. The wireless device may receive one or more third RRC messages. The second RRC messages may indicate a first transmission power threshold of a sidelink operation using the second radio access technology. The wireless device may determine a transmission power of a sidelink channel based on the first transmission power threshold. The wireless device may transmit the sidelink channel with the transmission power.

A wireless device may receive one or more radio resource control (RRC) messages. The one or more RRC messages may comprise configuration parameters of one or more cells operating with a first radio access technology. The wireless device may determine a RAT of a sidelink channel based on a first RAT of corresponding sidelink control information scheduling the sidelink channel. The wireless device may determine a transmission power of the sidelink channel based on the first threshold in response to the RAT of the sidelink is same to the first RAT. The wireless device may determine a transmission power of the sidelink channel based on the second threshold in response to the RAT of the sidelink is same to the second RAT. The wireless device may transmit the sidelink channel with the transmission power.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 34 is a flow diagram as per an aspect of an example embodiment of the present disclosure. At 3410, a wireless device may receive one or more radio resource control (RRC) messages. The one or more RRC messages may comprise sidelink priority for a sidelink transmission via a sidelink resource pool, a 1st priority threshold for the sidelink resource pool, and a 2nd priority threshold for the sidelink resource pool. At 3420, the wireless device may determine whether a configured uplink transmission, that is overlapped with the sidelink transmission in time domain, may be associated with a first priority class or a second priority class. For example, the first priority class may be a low priority. The second priority may be a high priority. At 3430, the wireless device may determine that the sidelink priority may be higher than a priority corresponding to the first priority threshold in response to the configured uplink transmission being associated with the first priority class. At 3440, the wireless device may determine that the sidelink priority may be higher than a priority corresponding to the second priority threshold in response to the configured uplink transmission being associated with the second priority class. At 3450, the wireless device may transmit, based on the determining, the sidelink transmission overlapping with a configured uplink transmission.

According to an example embodiment, the second priority may indicate the configured uplink transmission may be associated with a first service. For example, the first service may be an ultra-reliable low latency communication (URLLC). For example, the second priority class is higher than the first priority class. According to an example embodiment, the wireless device may determine a transmission power for the sidelink transmission in response to the sidelink priority being higher than one of the first priority threshold or the second priority threshold. The wireless device may select the first priority threshold or the second priority threshold based on a priority class of the configured uplink transmission. According to an example embodiment, the wireless device may reduce a configured transmission power for the sidelink transmission in response to the sidelink priority being lower than or equal to one of the first priority threshold or the second priority threshold. The wireless device may select the first priority threshold or the second priority threshold based on a priority class of the configured uplink transmission.

According to an example embodiment, the one or more RRC messages may further indicate a first power threshold and a second power threshold for the sidelink resource pool. For example, the wireless device may limit a maximum transmission power of a second sidelink transmission equal to or lower than the first power threshold in response to a second sidelink priority of the second sidelink transmission is lower than or equal to the first priority threshold. For example, the wireless device may limit a maximum transmission power of a second sidelink transmission equal to or lower than the second power threshold in response to a second priority of the second sidelink transmission is lower than or equal to the second priority threshold.

According to an example embodiment, the wireless device may determine the sidelink priority of the sidelink transmission based on the sidelink resource pool. For example, the sidelink transmission may be scheduled via one or more resources of the sidelink resource pool. According to an example embodiment, the wireless device may determine the sidelink priority of the sidelink transmission based on a sidelink control information indicating one or more resources for the sidelink transmission.

In an example, a wireless device may receive one or more messages. The one or more messages may indicate a plurality of priority thresholds for a sidelink operation. The wireless device may trigger a sidelink transmission, with a priority value, overlapping in time with a configured uplink transmission. The wireless device may select a first priority threshold of the plurality of priority thresholds based on a service priority of the configured uplink transmission. The wireless device may determine to transmit the sidelink transmission based on the priority value; and the first priority threshold. Based on the determining, the wireless device may transmit the sidelink transmission.

Figure 35:
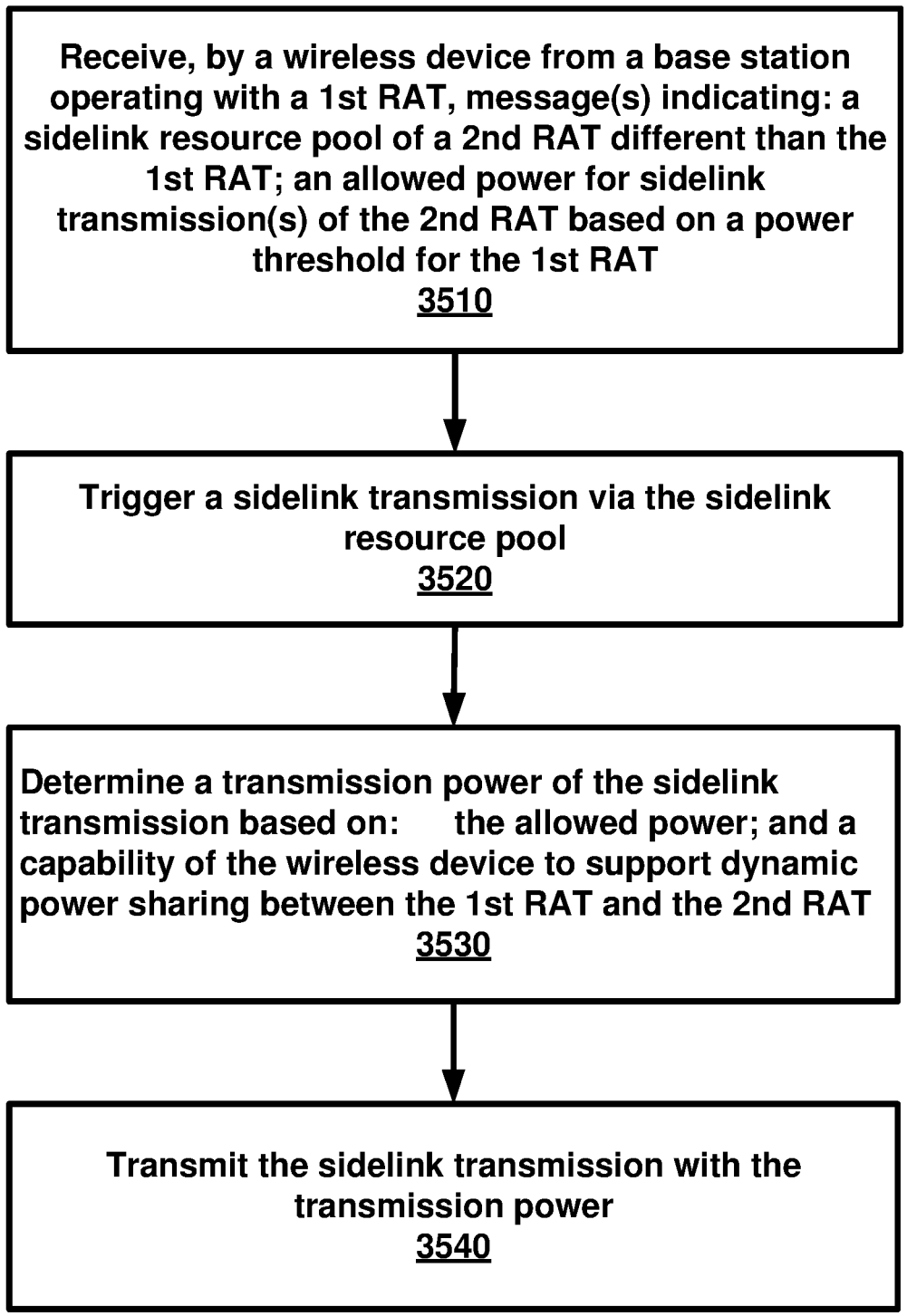
FIG. 35 is a flow diagram of an aspect of an example embodiment of the present disclosure.

FIG. 35 is a flow diagram as per an aspect of an example embodiment of the present disclosure. At 3510, a wireless device may receive, from a base station operating with a first radio access technology (RAT), one or more radio resource control (RRC) messages. The one or more RRC messages may indicate a sidelink resource pool of a second RAT different than the first RAT; an allowed power for one or more sidelink transmissions of the second RAT based on a power threshold for the first RAT. At 3520, the wireless device may trigger a sidelink transmission via the sidelink resource pool. At 3530, the wireless device may determine a transmission power of the sidelink transmission based on: the allowed power; and a capability of the wireless device to support dynamic power sharing between the first RAT and the second RAT. At 3540, the wireless device may transmit the sidelink transmission with the transmission power.

According to an example embodiment, the wireless device may determine the allowed power for the one or more sidelink transmissions of the second RAT based on an allowed maximum power of the wireless device and the power threshold for the first RAT. For example, the allowed power for the one or more sidelink transmissions may be a remaining power of the allowed maximum power of the wireless device subtracted by the power threshold for the first RAT. According to an example embodiment, the wireless device may reduce transmission power for one or more uplink transmissions for the first RAT, in response to a sum of configured transmission power of the one or more uplink transmissions being higher than the power threshold. For example, the transmission power of the sidelink transmission may be at least up to the allowed power, in response to a configured transmission power of the sidelink transmission being higher than the allowed power. According to an example embodiment, the wireless device may determine the transmission power of the sidelink transmission based on the allowed power for the sidelink transmission when the wireless device may not support dynamic power sharing between the first RAT and the second RAT. For example, the transmission power may be lower than or equal to the allowed power. According to an example embodiment, the wireless device may determine the transmission power of the sidelink transmission based on an allowed maximum power of the wireless device and a sum of power allocated to one or more uplink transmissions of the first RAT when the wireless device may support dynamic power sharing between the first RAT and the second RAT.

According to an example embodiment, the one or more RRC messages may further indicate a reference TDD downlink and uplink configuration applied for one or more serving cells of the first base station. For example, the wireless device may determine the transmission power of the sidelink transmission based on an allowed maximum transmission power of the wireless device. For example, the sidelink transmission may fully overlap with a downlink slot indicated by the reference downlink and uplink configuration. For example, an allowed maximum transmission power of the wireless device is determined based on a power class of the wireless device.

According to an example embodiment, the wireless device may determine the transmission power of the sidelink transmission based on an allowed transmission power of the wireless device on a first frequency band comprising the frequency. For example, the allowed transmission power may be larger than a second allowed transmission power of the wireless device on one or more second frequency bands. For example, a first power class of the wireless device on the frequency band of the second RAT may be different from a second power of the wireless device on the one or more second frequency bands.

According to an example embodiment, the wireless device may not support simultaneous transmission of one or more uplink transmission in a first frequency of a first serving cell and one or more sidelink transmission on the frequency. For example, the wireless device may determine whether to transmit or drop for a second sidelink transmission via the sidelink resource pool overlapping with an uplink transmission via the first serving cell based on a first priority of the second sidelink transmission and a second priority of the uplink transmission. The wireless device may report a capability whether the wireless device supports simultaneous transmission between the first frequency and the frequency for uplink and sidelink operation.

According to an example embodiment, the first RAT is long term evolution (LTE) or a new radio (NR). For example, the second RAT is the NR or the LTE. The base station may transmit a downlink control information (DCI), based on the first RAT, indicating one or more sidelink resources for the sidelink transmission via the sidelink resource pool. The wireless device may transmit, to a second wireless device, a sidelink control information, based on the second RAT, indicating one or more second resources for the sidelink transmission. The wireless device may determine the one or more second resources based on the one or more resources indicated by the DCI. According to an example embodiment, the wireless device may receive one or more second RRC messages. The one or more second RRC messages may comprise configuration parameters of a plurality of cells grouped into a plurality of cell groups, and a first cell group transmission power threshold used for a first cell group and a second cell group transmission power threshold for a second cell group. For example, the plurality of cell groups may comprise a first cell group of the one or more cells for communication via a first base station with the first RAT and a second cell group for communication via a second base station with the second RAT. For example, the wireless device may determine the transmission power of the sidelink transmission based on the second cell group transmission power and the allowed power.

In an example, a wireless device may receive one or more radio resource control (RRC) messages. The one or more RRC messages may comprise configuration parameters of one or more cells operating with a first radio access technology. The wireless device may receive one or more second RRC messages comprising information on one or more sidelink resource configurations of potential sidelink operation using a second radio access technology. The wireless device may receive one or more third RRC messages indicating a first transmission power threshold of a sidelink operation using the second radio access technology. The wireless device may determine a transmission power of a sidelink channel based on the first transmission power threshold. The wireless device may transmit the sidelink channel with the transmission power.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A wireless device comprising:
one or more processors; and
memory storing instructions that, when executed by the one or more processors, cause the wireless device to:
determine whether a sidelink transmission has higher priority than an uplink transmission based on comparing:
a priority value of the sidelink transmission to a first priority threshold for ultra reliable low latency (URLLC) uplink transmissions in response to the uplink transmission being URLLC; and
the priority value of the sidelink transmission to a second priority threshold for non-URLLC uplink transmissions in response to the uplink transmission being non-URLLC; and
based on the determining, transmit at least one of the sidelink transmission or the uplink transmission.

2. The wireless device of claim 1, wherein the instructions further cause the wireless device to receive one or more radio resource control (RRC) configuration parameters comprising:
the first priority threshold; and
the second priority threshold.

3. The wireless device of claim 1, wherein:
the first priority threshold is for prioritization of sidelink transmissions and URLLC uplink transmissions; and
the second priority threshold is for prioritization of the sidelink transmissions and non-URLLC uplink transmissions.

4. The wireless device of claim 1, wherein the sidelink transmission overlaps with the uplink transmission in time.

5. The wireless device of claim 1, wherein the instructions further cause the wireless device to transmit the uplink transmission and the sidelink transmission.

6. The wireless device of claim 5, wherein the instructions further cause the wireless device to reduce a transmission power of the uplink transmission or the sidelink transmission so that a total transmission power of the uplink transmission and the sidelink transmission does not exceed a total transmission power threshold.

7. The wireless device of claim 6, wherein:
the transmission power of the uplink transmission is reduced based on determining that the sidelink transmission has higher priority than the uplink transmission; and
the transmission power of the sidelink transmission is reduced based on determining that the uplink transmission has higher priority than the sidelink transmission.

8. A method comprising:
determining, by a wireless device, whether a sidelink transmission has higher priority than an uplink transmission based on comparing:
a priority value of the sidelink transmission to a first priority threshold for ultra reliable low latency (URLLC) uplink transmissions in response to the uplink transmission being URLLC; and
the priority value of the sidelink transmission to a second priority threshold for non-URLLC uplink transmissions in response to the uplink transmission being non-URLLC; and
based on the determining, transmitting at least one of the sidelink transmission or the uplink transmission.

9. The method of claim 8, further comprising receiving one or more radio resource control (RRC) configuration parameters comprising:
the first priority threshold; and
the second priority threshold.

10. The method of claim 8, wherein:
the first priority threshold is for prioritization of sidelink transmissions and URLLC uplink transmissions; and
the second priority threshold is for prioritization of the sidelink transmissions and non-URLLC uplink transmissions.

11. The method of claim 8, wherein the sidelink transmission overlaps with the uplink transmission in time.

12. The method of claim 8, further comprising transmitting the uplink transmission and the sidelink transmission.

13. The method of claim 12, further comprising reducing a transmission power of the uplink transmission or the sidelink transmission so that a total transmission power of the uplink transmission and the sidelink transmission does not exceed a total transmission power threshold.

14. The method of claim 13, wherein:
the transmission power of the uplink transmission is reduced based on determining that the sidelink transmission has higher priority than the uplink transmission; and
the transmission power of the sidelink transmission is reduced based on determining that the uplink transmission has higher priority than the sidelink transmission.

15. A non-transitory computer-readable medium comprising instructions that, when executed by one or more processors of a wireless device, cause the wireless device to:
determine whether a sidelink transmission has higher priority than an uplink transmission based on comparing:
a priority value of the sidelink transmission to a first priority threshold for ultra reliable low latency (URLLC) uplink transmissions in response to the uplink transmission being URLLC; and
the priority value of the sidelink transmission to a second priority threshold for non-URLLC uplink transmissions in response to the uplink transmission being non-URLLC; and
based on the determining, transmit at least one of the sidelink transmission or the uplink transmission.

16. The non-transitory computer-readable medium of claim 15, wherein the instructions further cause the wireless device to receive one or more radio resource control (RRC) configuration parameters comprising:
the first priority threshold; and
the second priority threshold.

17. The non-transitory computer-readable medium of claim 15, wherein:
the first priority threshold is for prioritization of sidelink transmissions and URLLC uplink transmissions; and
the second priority threshold is for prioritization of the sidelink transmissions and non-URLLC uplink transmissions.

18. The non-transitory computer-readable medium of claim 15, wherein:
the sidelink transmission overlaps with the uplink transmission in time; and the instructions further cause the wireless device to transmit the uplink transmission and the sidelink transmission.

19. The non-transitory computer-readable medium of claim 18, wherein the instructions further cause the wireless device to reduce a transmission power of the uplink transmission or the sidelink transmission so that a total transmission power of the uplink transmission and the sidelink transmission does not exceed a total transmission power threshold.

20. The non-transitory computer-readable medium of claim 19, wherein:
   the transmission power of the uplink transmission is reduced based on determining that the sidelink transmission has higher priority than the uplink transmission; and
   the transmission power of the sidelink transmission is reduced based on determining that the uplink transmission has higher priority than the sidelink transmission.

* * * * *